United States Patent
Lu et al.

(10) Patent No.: US 9,083,656 B2
(45) Date of Patent: Jul. 14, 2015

(54) SERVICE COMMUNICATION METHOD AND SYSTEM FOR ACCESS NETWORK APPARATUS

(75) Inventors: Dorian Lu, Shanghai (CN); Carl Yang, Beijing (CN)

(73) Assignee: BEIJING QIANTANG NETWORK TECHNOLOGY COMPANY, LTD., Beijing (CN)

( * ) Notice: Subject to any disclaimer, the term of this patent is extended or adjusted under 35 U.S.C. 154(b) by 281 days.

(21) Appl. No.: 13/814,718

(22) PCT Filed: Aug. 4, 2011

(86) PCT No.: PCT/CN2011/078009
§ 371 (c)(1),
(2), (4) Date: Apr. 17, 2013

(87) PCT Pub. No.: WO2012/016536
PCT Pub. Date: Feb. 9, 2012

(65) Prior Publication Data
US 2013/0201987 A1 Aug. 8, 2013

(30) Foreign Application Priority Data
Aug. 6, 2010 (CN) .......................... 2010 1 0248243

(51) Int. Cl.
*H04L 12/28* (2006.01)
*H04L 12/741* (2013.01)

(52) U.S. Cl.
CPC ............ *H04L 45/74* (2013.01); *H04L 12/2856* (2013.01); *H04L 12/2869* (2013.01)

(58) Field of Classification Search
None
See application file for complete search history.

(56) References Cited

U.S. PATENT DOCUMENTS 6,426,947 B1 * 7/2002 Banker et al. ................. 370/254
(Continued)

FOREIGN PATENT DOCUMENTS

CN 1553683 A 12/2004
(Continued)

OTHER PUBLICATIONS

International Search Report mailed Nov. 3, 2011, PCT Application No. PCT/CN2011/078009, 4 pages.
Office Action for counterpart Chinese application 201010248243.9.

*Primary Examiner* — Chi H Pham
*Assistant Examiner* — Shick Hom
(74) *Attorney, Agent, or Firm* — Kilpatrick Townsend & Stockton LLP

(57) ABSTRACT

A service communication method for an access network apparatus. The access network apparatus comprises a source terminal and a target terminal both connected to the same access switch. The method comprises: a node server, according to a request of a current service, notifying the access switch connected to both the source terminal and the target terminal to set a downlink port of the access switch, to which a data packet of the current service is directed, in an internal data packet address table thereof; the source terminal sending an uplink data packet of the current service; and after receiving the data packet, the access switch directing the data packet to the corresponding downlink port according to the setting of the internal data packet address table thereof, and transmitting the data packet to the target terminal through the downlink port. The present invention can effectively save the bandwidth and routing resources, ensure a steady and smooth transmission path, avoid delay of multimedia services, satisfy national information security requirements, and save hardware resources, thereby ensuring network transmission quality.

17 Claims, 6 Drawing Sheets

(56) References Cited

U.S. PATENT DOCUMENTS

| | | | |
|---|---|---|---|
| 6,850,529 B1* | 2/2005 | Wong | 370/401 |
| 7,720,069 B2 | 5/2010 | Yang | |
| 7,782,854 B2 | 8/2010 | Sakata | |
| 2007/0286208 A1 | 12/2007 | Kanada et al. | |
| 2010/0135307 A1* | 6/2010 | Nakagawa | 370/395.53 |

FOREIGN PATENT DOCUMENTS

| | | |
|---|---|---|
| CN | 1592259 A | 3/2005 |
| CN | 1612538 A | 5/2005 |
| CN | 101917492 A | 12/2010 |
| EP | 0891061 A2 | 1/1999 |

* cited by examiner

SERVICE COMMUNICATION METHOD AND SYSTEM FOR ACCESS NETWORK APPARATUS

This application is a U.S. National Stage of International Application No. PCT/CN20111078009, filed on Aug. 4, 2011, which claims priority to Chinese Application No. 20101024243.9, filed on Aug. 6, 2010, all of which are incorporated herein by reference in their entireties.

FIELD

The present invention relates to the technical field of novel networks, and in particular, to a service communication method for an access network device, a service communication system for an access network device, a node server and an access switch.

BACKGROUND

Novel networks (including Internet) enable the exchange of information and other information resources between different individuals and organizations. Generally, a network concerns the technologies of path, transmission, signaling and network management, etc. Such technologies have been widely set forth in various documents among which *Telecommunications Convergence* (McGraw-Hill, 2000) by Steven Shepherd, *The Essential Guide to Telecommunications*, Third Edition (Prentice Hall PRT, 2001) by Annabel Z. Dodd, or *Communications Systems and Networks*, Second Edition (M&T Books, 2000) by Ray Horak gives an overview of the technologies. The progression in such technologies obtained in the past has fully built up the speed and quality of information transmission and lowered the cost thereof.

The path technology for connecting a terminal to a wide area transmission network (for example, a local area loop of a terminal apparatus and the network edge) has been developed from a modem of 14.4, 28.8 and 56 K to technologies including ISDN, T1, cable modem, DSL, Ethernet and wireless connection.

At present, transmission technologies used in a wide area network include: synchronous optical network (SONET), Dense Wavelength Division Multiplexing (DWDM), Frame Relay, Asynchronous Transmission Mode (ATM) and Resilient Packet Ring (RPR).

Among all the different signaling technologies (for example, protocols and methods for establishing, maintaining and terminating a communication in a network), Internet Protocol (IP) is applied most widely. In fact, almost all the communication and network specialists consider that an IP-based network (for example, Internet) that integrates audio (thr example, telephone), video and data networks is an inevitable trend. Just as described by an author: there's one thing that is clear, that is, an IP-based train that integrates various networks has drawn out of the station, some passengers are eager in this trip, and others are pulled forward with reluctance and cry, scream, struggle and list all sorts of defects of IP; however, in spite of all the defects thereof, IP has been adopted as a industry standard, and no other technology, except for IP, has such a large potentiality and development space. (Abstracted from IP Convergence: *Building the Future*, by Susan Breidenbach, *Network World*, Aug. 10, 1998).

With the explosive increment of Internet services, the application range thereof has been extended to each field and each industry in the society. In the view point of telecommunication industry, more and more traditional telecommunication services employ IP for transmission, i.e., so-called Everything Over IP. The framework of the current telecommunication network will gradually turn from circuit switching and the networking technology thereof to a new framework based on packet switching, in particular, IP; and services over telecommunication network will turn from telephone service to data service.

TCP/IP Network Protocol

TCP/IP (Transmission Control Protocol/Internet Protocol) is a protocol most widely applied over the world at present, and the prevalence thereof is closely related to the impetuous development of Internet. Originally, TCP/IP is designed for the prototype of Internet, ARPANET, for providing a full set of protocols that are convenient and practical and can be applied on various networks. It is proved by facts that TCP/IP has accomplished its tasks, it makes network interconnection easy, and it enables more and more networks to participate in the network interconnection, thereby becoming a de facto standard of Internet.

Application Layer: application layer is a general term for all applications that users face. On this layer, there exist a lot of protocols from the TCP/IP protocol family to support different applications, and the implementation of many familiar Internet-based applications cannot be separated from these protocols. For example, HTTP protocol used in World Wide Web (WWW) access, FTP protocol used in file transmission, SMTP used in email sending, DNS protocol used in domain name resolution, Telnet protocol used in remote logon and so on all belong to TCP/IP on the application layer; for users, patterned operating interfaces constructed by software are seen, but in fact, the above protocols are operated in the background.

Transmission Layer: the function of this layer is mainly to provide communication between applications, and on this layer, protocols from the TCP/IP protocol family include TCP and UDP.

Network Layer: network layer is a very crucial layer in the TCP/IP protocol family, which mainly defines the format of IP address, thereby data of different application types can be transmitted on the Internet smoothly, and IP protocol is a network layer protocol.

Network Interface Layer: this is the lowest layer of TCP/IP software, which is responsible for receiving an IP packet and sending it via a network, or receiving a physical frame from a network, extracting an IP datagram and delivering it to an IP layer.

How does IP implement network interconnection? Network systems and devices manufactured by various manufacturers, for example, Ethernet and packet switching network, etc., cannot intercommunicate with each other, the main reason is that the formats of the basic units (technically referred to as "frames") of data transmitted by them are different. In fact, IP protocol is a set of protocol software consisted of software programs, and it unitedly converts various different "frames" into the format of "IP packet", such conversion is a most important feature of Internet, i.e., a feature of "openness", which makes all computers able to realize intercommunication on the Internet.

Then, what is "data packet"? And what feature does it have? Data packet is also a form of packet switching, that is, data to be transmitted are segmented into "packets" and then transmitted out. However, it belongs to "connectionless type", that is, each "packet" is transmitted out as an "independent message", so it is called "data packet". Thus, before communication starts, no circuit needs to be connected first, and respective packets will not necessarily be transmitted via one and the same route, so it is called "connectionless type", Such a feature is very important, and in the case of text information transmission, it greatly improves the robustness and security of the network.

Each data packet has two parts, header and message. Header contains necessary contents such as destination address, etc., so that each data packet can correctly reach its destination via different routes. At the destination, the data packets recombine and restore to the data sent originally. This requires that IP has the functions of packet packaging and assembling.

During the practical transmission process, a data packet also needs to change the data packet length according to the packet size specified by the network it passes, the maximum length of an IP data packet may reach 65535 bytes.

Quality of Service (QoS) is a main problem of IP Internet. Through the ages, countless research reports try to solve this problem; however, if we arrange the main milestones of QoS in time order, it will be readily seen that this is a helpless history in which QoS of Internet continuously lowers its requirements and continuously fails. From "Inte Serv" (1990) to "Diff Serv" (1997) and then to "Lightload" (2001), the summation of various partial QoS improving solutions that seem effective is still far from the target of network-wide QoS. QoS seems nearby, but in fact it's too far away to reach.

At the early stage of IP Internet, video application has become a target of network service, for example, MBone. Due to the lack of an effective QoS, no video communication service with a commercial value can be developed in a long term, which weakens the profit-earning capacity of IP Internet. Therefore, it has a great commercial value to solve the quality problem of network transmission. The quality problem of network transmission specifically appears as packet loss and error code. Computer files are not sensitive to errors in transmission; so long as there exists a TCP retransmission mechanism, a computer may consider the network as usable even if a great part of data packets are lost during the transmission process. However, if packet loss rate and error code rate are higher than $1/1{,}000$, the quality of video and audio will be lowered for synchronous video. Empirical data tells us that high-quality video communication even requires that packet loss and error code should be lower than $1/100{,}000$. Test data from the current network environment show that most packet loss occurs inside a router, and error codes generated during optical fiber transmission may almost be neglected.

Why can't "Inte Serv" succeed?

"Inte Serv" is established on the basis of reserved independent stream resources by employing Resource Reservation SetupProtocol (RSVP). In large-scale network environment, if a part of bandwidth resources can be reserved between two video terminals, it may be specially used by the video service; however, although this sounds good, it is impracticable in fact.

Firstly, this solution requires network-wide device reconstruction, which equals to reestablishing the network, and it is almost impossible in practical operation.

Next, even if network-wide reconstruction is implemented, for example, a bandwidth of 2 Mbps is kept for a 2 Mbps video service in each switch, can QoS problem be solved? The answer is No.

The so-called 2 Mbps bandwidth of RSVP is only considered macroscopically, if data in one second is sent in the first half second centralizedly, a problem will arise and periodic burst flow will be formed. Because the core concept of IP Internet is "Best Efforts", at each network node, the switch always tries its best to forward data at the highest speed. After a video stream passes multiple levels of switches, it will be certain that flow distribution becomes non-uniform. When multiple non-uniform and asynchronous streams are combined, greater non-uniformity will be generated in a period of time; that is, periodic congestion of network flow is certain to appear. With the increasing of video user numbers, no upper limit can be given to periodic congestion, and when it exceeds the internal storage capacity of the switch, packet loss will be directly caused.

Why does "Diff Serv" fail?

After "Inte Serv" made its appearance for 7 years, a novel method "Diff Serv" starts to prevail. "Diff Serv" tries to provide a network service being superior to "Best Efforts". Such a method does not require complex network-wide resource reservation, and it is easy to implement. It only needs to put a "priority" label on each data packet and the network switch processes video data with "priority" first. The basic theory thereof is just like that a bank issues a gold card to a VIP client and the queuing time of a high-end client may be effectively reduced. This method also sounds good, but in fact, it is impracticable, too.

There exists one easy fact that cannot be ignored: the flow of a single video service is much larger than that of a traditional non-video service (over a hundredfold).

When there are a few video users, video data packets will be seen almost everywhere on the network. If most of the data packets have a "gold card", VIP is meaningless. Additionally, because IP interconnection networking principle is not compulsory, although QoS has drawn up a set of moral standards for users that maintain their personal integrity during chaotic times, it is unpractical to require all the users to carry the standards into effect.

Therefore, "Diff Serv" is only effective in a few enterprise private networks, and it is difficult to be effectively popularized in large-scale public networks.

Why can't "Light load" succeed?

Since IP Internet was popularized step by step, people lave been unremittingly seeking after an effective prescription for network QoS. After more than 10 years brain squeeze, network technicians work out two QoS solutions, but neither is ideal. Under the macro-environment in which people loose confidence in solving QoS, some anonymous people put forward a method, i.e., "Light load". The basic design consideration thereof is so-called light-load network, and it is considered that so long as a sufficient bandwidth is provided and optical fiber enters users' houses, there should be no need to worry about network congestion.

Is the design consideration of light-load network feasible? The answer is also No.

The current network technicians seem to miss a basic theory: the root of network packet loss phenomenon is flow non-uniformity. Macroscopically, when the sending speed is high in one time period, it is certain to cause jam in another time period; no upper limit can be given to the peak flow of the network so long as the network flow is non-uniform, and any arbitrary large bandwidth may be occupied in a short time.

Actually, a reasonably good video program may be transmitted so long as there exists a bandwidth of 2 Mbps; if a bandwidth of 8 Mbps is provided, a video content of HDTV quality may be transmitted. However, if we randomly browse a text or a picture on an ordinary web site, the instantaneous flow will be tens of folds of that of HDTV, because most of the current web site servers use a Gigabit network interface. If the flows of a lot of similar web sites just collide, the burst flow generated in a certain short time will exceed the flow required by all network-wide users that use HDTV, and a network with any bandwidth can be occupied. As shown by statistical analysis, such a collision is frequent.

IP Internet tries to absorb the instantaneous flow by employing a memory, which causes the increase of transmission delay. The storage capacity is limited, but the burst flow has no upper limit; therefore, by employing the memory method, it can only improve the packet loss of the current device, and the burst flow absorbed at the current node will put much pressure on the next node. Video stream flow is ceaseless, and the storage mode of the switch intensifies the accumulation of the burst flow to a weak node, thus network packet loss is inevitable.

By employing light load plus "Diff Serv" technology, the current network constructors may deal with narrowband VoIP voice services. This is because voice does not occupy the main part of total flow on the network; once jam occurs, voice will take priority by sacrificing computer files. However, for high-bandwidth video communication, only temporary improvement can be obtained by partial expansion. If expansion is also carried out at other nodes, the non-uniformity of network flow will increase therewith, so that the effect of the originally expanded part will be lowered. If expansion is carried uniformly network wide, the transmission quality will return to that before expansion. In other words, overall expansion is ineffective.

At preset, device manufacturers recommend ultra-wideband access networks of tens or even hundreds of Megabit to each household. However, even if optical fiber enters each household, it is difficult to exhibit a video communication service with good QoS to the consumers. In spite of what complex QoS measures are taken, the transmission quality of IP Internet can only be "improved", and no quality of network transmission can be "guaranteed".

SUMMARY

The technical problem to be solved by the invention is to provide a service communication method for an access network device, which may effectively save the bandwidth and routing resources, guarantee the stability and smoothness of a transmission path, avoid the time delay of a multimedia service, meet the requirements of state information security, and save hardware resources, thereby guaranteeing the quality of the network transmission.

The embodiments of the invention further provide a service communication system for an access network device, a node server and an access switch, which may guarantee the implementation and application of the above method in practice.

To solve the above technical problem, one embodiment of the invention discloses a service communication method for an access network device, wherein the access network device includes a source terminal and a target terminal jointly connected to one and the same access switch, and the method includes the following steps:

notifying, by a node server according to a request for a current service, the access switch to which the source terminal and the target terminal are jointly connected to set, in the access switch's internal data packet address table, a downlink port of the access switch to which a data packet of the current service is to be oriented;

sending, by the source terminal, an uplink data packet of the current service; and orienting, by the access switch, the data packet to the corresponding downlink port according to settings of its internal data packet address table after receiving the data packet, and transferring the data packet to the target terminal via the downlink port.

By the above steps, direct communication may be implemented among a plurality of terminals under one and the same access switch. In one embodiment of the invention, after the node server notifies the access switch to set, in its internal data packet address table, a downlink port to which a data packet of the current service is to be oriented, in service communication between the source terminal and the target terminal, a data packet does not need to be uploaded to the node server and then issued by the node server to the corresponding terminal; instead, the data packet is directly transferred via the corresponding downlink port of the access switch. It should be noted that, for this embodiment, the communication routing mode of the access switch connected under the node server is not limited; preferably, it may employ the mode of the invention in which a data packet address table is configured based on the main control of the node server and then a data packet is transmitted according to the data packet address table; or, it may employ the existing IP routing mode. This is not limited in the invention.

In one embodiment of the invention, the access network device refers to a device on the access network part of a novel network. Such a novel network has a network structure that may be controlled centralizedly. The network may have the types of tree network, star network and ring network, etc.; but on this basis, a centralized control node is needed to control the whole network. Devices on the access network part may be mainly divided into 3 categories: a node server, an access switch and a terminal (including various set-top boxes, code plates and storages, etc.). Wherein, a node server is a node in the access network that has a centralized control function, and it may control the access switch and the terminal. The node server may be directly connected with the access switch, and it may be directly connected with the terminal.

In practice, communication between terminals may be bidirectional, that is, in addition to the above application case in which a source terminal sends a data packet to a target terminal, one embodiment of the invention may further include the following steps:

sending, by the target terminal, an uplink data packet of the current service;

orienting, by the access switch; the data packet to the corresponding downlink port according to the settings of its internal data packet address table after receiving the data packet, and transferring the data packet to the source terminal via the downlink port.

One embodiment of the invention is applicable for any unicast service, that is, as an example of a specific application, the data packet may be a unicast data packet, and in such a case, the data packet address table is a unicast data packet address table; during unicast service communication, the destination address of the data packet is the receiving-party address.

As one preferred embodiment of the invention, during a unidirectional communication of a unicast service, the request for the current service is a request initiated by a source terminal for establishing a unicast service communication with a target terminal, and the step in which the node server notifies the access switch to set a data packet address table includes the following substeps:

acquiring, by the node server, communication link information of the current service according to the request for the current service, wherein the communication link information includes information on a downlink port of the access switch to which the target terminal is connected.

sending, by the node server, a port configuration protocol packet to the access switch according to the communication link information; and setting, by the access switch in its internal data packet address table, the downlink port to which a data packet with a destination address being an address of the target terminal is to be oriented, according to the port configuration protocol packet.

As another preferred embodiment of the invention, during a bidirectional communication of a unicast service, the request for the current service includes a request initiated by the source terminal for establishing a unicast service communication with the target terminal, and the step in which the node server notifies the access switch to set a data packet address table includes the following substeps:

acquiring, by the node server, communication link information of the current service according to the request for the current service, wherein the communication link information includes information on a downlink port of the access switch to which the source terminal is connected and information on a downlink port to which the target terminal is connected;

sending, by the node server, a port configuration protocol packet to the access switch according to the communication link information; and setting, by the access switch, in its internal data packet address table according to the port configuration protocol packet, a downlink port to which a data packet with a destination address being an address of the source terminal is to be oriented and a downlink port to which a data packet with a destination address being an address of the target terminal is to be oriented.

In a specific unicast communication service, the request for the current service includes service type information, service content information and an access network address of the source terminal, wherein, the service content information includes a service number; and the step in which the node server acquires the communication link information of the current service includes the following substeps:

extracting an access network address of the target terminal from a preset content-address mapping table according to the service number; and acquiring the communication link information of the current service according to the service type information, the access network address of the source terminal and the access network address of the target terminal.

For a unicast communication service, the communication link information may be unidirectional communication link information, for example, a source terminal initiates a unicast service request to a target terminal, or a target terminal initiates a unicast service request to a source terminal; alternatively, the communication link information may also be bidirectional communication link information, for example, a source terminal and a target terminal initiate a unicast service request to each other.

During the process of establishing a communication connection, the node server may notify the source terminal and the target terminal, and determine whether the current communication link may be employed according to a reply of the target terminal; that is, in one preferred embodiment of the invention, the step in which the node server acquires the communication link information of the current service further includes the following substeps:

sending, by the node server, a menu protocol packet to the source terminal and the target terminal; and receiving a reply protocol packet issued by the target terminal in response to the menu protocol packet.

More specifically, the step in which the node server acquires the communication link information of the current service may further include the following substeps:

orienting the menu protocol packet to the source terminal according to settings of a preset downlink protocol packet address table in the access switch located between the node server and the source terminal; and orienting the menu protocol packet to the target terminal according to the settings of the preset downlink protocol packet address table in the access switch located between the node server and the target terminal;

Wherein, the downlink protocol packet address table is set with: a CPU module to which a protocol packet with a destination address being an access network address of the current access switch is to be oriented; and a port to which a protocol packet with a destination address being an address of any other access network device is to be oriented.

That is, the node server may send a menu protocol packet to the source terminal and the target terminal based on the settings of a preset protocol packet address table.

In a specific implementation, when notifying the access switch to configure a data packet address table, the node server may further send a service processing command to the source terminal and the target terminal respectively, so as to notify the source terminal and the target terminal to perform a corresponding operation according to the service processing command.

One embodiment of the invention is applicable for any multicast service, that is, as an example of another specific application, the data packet may be a multicast data packet, and in such a case, the data packet address table is a multicast data packet address table; during multicast service communication, the destination address of the data packet is a multicast address.

As one preferred embodiment of the invention, for a typical multicast business in which a target terminal requests for a multicast service, for example, a target terminal watches a living broadcast, the request for the current service includes a request initiated by the target terminal for multicast service communication, and the step in which the node server notifies the access switch to set the data packet address table may include the following substeps:

acquiring, by the node server, communication link information of the current service according to the request for the current service, wherein the communication link information includes information on a downlink port of the access switch to which the target terminal is connected;

sending, by the node server, a port configuration protocol packet to the access switch according to the communication link information; and setting, by the access switch, in its internal data packet address table according to the port configuration protocol packet, the downlink port to which a data packet with a destination address being the multicast address is to be oriented.

Preferably, for a multicast business in which the source terminal further initiates a multicast service, for example, the source terminal initiates a living broadcast, the request for the current service further includes a request submitted by the source terminal for initiating multicast service communication, and the step in which the node server notifies the access switch to set the data packet address table further includes the following substeps:

acquiring, by the node server, communication link information of the current service according to the request for the current service, wherein the communication link information includes information on a downlink port of the access switch to which the source terminal is connected;

sending, by the node server, a port configuration protocol packet to the access switch according to the communication link information; and setting, by the access switch, in its internal data packet address table according to the port configuration protocol packet, the downlink port to which a data packet with a destination address being the multicast address is to be oriented.

As an embodiment of a specific multicast communication service, the request initiated by the target terminal for multicast service communication includes service type information, service content information and an access network address of the target terminal; wherein, the service content information includes a service number;

The step in which the node server acquires the communication link information of the current service includes the following substeps:

extracting an access network address of the source terminal from a preset content-address mapping table according to the service number;

acquiring a multicast address corresponding to the source terminal, and allocating the multicast address to the target terminal; and acquiring downlink communication link information of the current multicast service according to the service type information, the access network address of the source terminal and the access network address of the target terminal.

This embodiment mainly relates to a communication link establishing process when a target terminal requests for a multicast service, so the communication link, thereof is a downlink on which multicast data are sent to the target terminal.

As an embodiment of another specific multicast communication service, the request submitted by the source terminal for initiating multicast service communication includes service type information, service content information and an access network address of the source terminal, wherein the service content information includes a service number;

The step in which the node server acquires the communication link information of the current service further includes the following substeps:

allocating a multicast address to the source terminal according to the request; and acquiring downlink communication link information of the current multicast service according to the service type information and access network addresses of the node server and the source terminal.

This embodiment mainly relates to a communication link establishing process when a source terminal initiates a multicast, so the communication link thereof is a downlink on which multicast data are sent to the source terminal.

In a specific implementation, when the node server notifies the access switch to configure a data packet address table, it may further send a service processing command to the target terminal, and the target terminal performs a corresponding operation according to the service processing command; or, it may send a service processing command to the source terminal, and the source terminal performs a corresponding operation according to the service processing command.

In practice, if the node server acquires a plurality of pieces of communication link information of the current service, the node server may select one piece among the pieces of communication link information as the communication link information of the current service according to a preset rule. As an example of a specific application, the preset rule may be as follows: the node server acquires flow information of each communication link and flow information of the current service, and information on a communication link with the minimum flow used is determined as the communication link information of the current service; or, the preset rule may be as follows: the node server acquires bandwidth information of each communication link and bandwidth information of the current service, and information on a communication link with the maximum bandwidth is determined as the communication link information of the current service.

In a specific implementation, preferably, the request for the current service is recorded in a service request protocol packet, and the service request protocol packet is oriented to the node server via an uplink port of the access switch connected between the source terminal and the node server according to settings of a preset uplink protocol packet address table in the access switch;

Wherein, the uplink protocol packet address table is set with the uplink port to which a protocol packet with a destination address being an address of the node server is to be oriented.

In one embodiment of the invention, preferably, the node server may orient a port configuration protocol packet to a corresponding access switch by connecting to a corresponding downlink port of the access switch according to settings of its internal preset downlink protocol packet address table;

Wherein, the downlink protocol packet address table is set with a downlink port to which a protocol packet with a destination address being an address of a subordinate access network device is to be oriented.

In order to save resources, after the current service is completed, one embodiment of the invention may further include the following steps:

sending, by the node server, a port releasing command to the access switch to which the source terminal and the target terminal are jointly connected, after the current service is completed; and releasing, by the access switch, the port to which a data packet of the current service is to be oriented from its internal data packet address table according to the port releasing command.

Preferably, the node server may also issue a service processing ending command to the source terminal and/or the target terminal, and the source terminal and/or target terminal ends service processing according to the service processing ending command.

In order to better perform centralized management and control on access network addresses, an address information table is further set inside the node server, in which address occupation information, device identification information and device resource information are recorded.

After the current service is completed, the node server may modify content in the preset address information table, and the modifying includes updating address occupation information of the port released by the access switch as not used.

To realize the convergence of the novel network of the invention and the existing Ethernet, the access network device further includes an Ethernet protocol conversion gateway and a local area Ethernet that are connected between the access switch, and the source terminal and the target terminal, and one embodiment of the invention may further include the following steps:

the Ethernet protocol conversion gateway accesses the novel network, and obtains from the node server an MAC address of the Ethernet protocol conversion gateway and MAC addresses of terminals bond to the Ethernet protocol conversion gateway;

the Ethernet protocol conversion gateway receives a data packet or a protocol packet sent from the novel network, adds the MAC address of the Ethernet protocol conversion gateway and an MAC address of the target terminal into the data packet or the protocol packet, and then sends the packet to the local area Ethernet; and the Ethernet protocol conversion gateway receives a data packet or a protocol packet sent from the local area Ethernet, removes the MAC address of the Ethernet protocol conversion gateway and an MAC address of the source terminal from the data packet or the protocol packet, and then sends the packet to the novel network;

wherein, the target terminal and the source terminal conform to a novel network protocol.

It should be noted that, in order to realize the convergence of the above novel network and the existing Ethernet and make full use of the functions of the existing Ethernet protocol conversion gateway at the same time, in the invention, the standard Ethernet gateway is reconstructed as a special-type access switch, which plays the role of connection and conversion between the novel network and the Ethernet. The reconstructed Ethernet gateway is referred to as Ethernet protocol conversion gateway. In the novel network, the Ethernet protocol conversion gateway lies on the access network part, and it may be connected with the access switch, or it may be directly connected with the node server. In the Ethernet, the Ethernet protocol conversion gateway is connected with a standard Ethernet switch, and the Ethernet switch is connected with a terminal.

In the invention, data transmission between the novel network and the Ethernet mainly relates to the following 4 data types:

1) Query Packet: a protocol packet sent from a node server to an access switch, an Ethernet protocol conversion gateway or a terminal;

2) Reply Packet: a protocol packet replied by an access switch, an Ethernet protocol conversion gateway or a terminal to a node server;

3) Unicast Data packet; and

4) Multicast Data packet.

The Ethernet protocol conversion gateway mainly carries out the forwarding of the above 4 types of data between the novel network and the Ethernet, and the core implementation concept is as follows:

The Ethernet protocol conversion gateway accesses the novel network, and obtains the MAC address of the Ethernet protocol conversion gateway and the MAC addresses of terminals registered under the Ethernet protocol conversion gateway from the node server that has a centralized control function. When the Ethernet protocol conversion gateway receives a data packet or a protocol packet sent from the novel network, it adds the MAC address of the Ethernet protocol conversion gateway and the MAC address of the target terminal into the data packet or the protocol packet and then sends it to the Ethernet, and the data packet or the protocol packet is transmitted on the Ethernet via an Ethernet protocol; when the Ethernet protocol conversion gateway receives a data packet or a protocol packet sent from the Ethernet, it removes the MAC address of the Ethernet protocol conversion gateway and the MAC address of the source terminal from the data packet or the protocol packet and then sends it to the novel network, and the data packet or the protocol packet is transmitted in the novel network via the novel network protocol.

Wherein, the target terminal and the source terminal conform to the novel network protocol. Thus, the target terminal and the source terminal not only can enter the Ethernet via MAC addresses, but also can enter the novel network by conforming to the novel network protocol. Therefore, compatible transmission can be realized on two different types of networks.

In this embodiment, preferably, a packet header of a data packet sent from the novel network and a packet header of a data packet sent from the Ethernet both contain addresses of two transmission ends in the novel network, wherein the addresses are source addresses and destination addresses of the data packets.

After the Ethernet protocol conversion gateway accesses the novel network, this embodiment may further include the following steps:

obtaining a mapping between the MAC addresses of the terminals bond to the Ethernet protocol conversion gateway and novel network addresses of the terminals; and receiving, by the Ethernet protocol conversion gateway, a data packet sent from the novel network, and adding a corresponding MAC address of the target terminal into the data packet according to a mapping between a destination address of the data packet and the MAC address.

In a specific implementation, a binding relation between the MAC addresses of the terminals and the Ethernet protocol conversion gateway is preset in the node server at the time the terminal and the Ethernet protocol conversion gateway are sold.

One embodiment of the invention further discloses a service communication method for an access network device, wherein the access network device includes a source terminal and a target terminal that are jointly connected to a current-level access switch, a subordinate access switch is connected between the current-level access switch and the source terminal and/or the target terminal, and the method includes the following steps:

notifying, by a node server according to a request for a current service, the current-level access switch to set in the current-level access switch's internal data packet address table a downlink port of the current-level access switch to which a data packet of the current service is to be oriented, and notifying the subordinate access switch to set in the subordinate access switch's internal data packet address table a port of the subordinate access switch to which a data packet of the current service is to be oriented; and after receiving a data packet of the current service, orienting, by the current-level access switch and the subordinate switch, the data packet to corresponding ports for transmission respectively, according to settings of their data packet address tables respectively.

This embodiment mainly provides a method for direct communication between terminals that are jointly connected to a current-level access switch, but multiple levels of subordinate access switches may exist between the current-level access switch and the terminals. Similarly, by employing this embodiment, in the service communication between the source terminal and the target terminal, a data packet does not need to be uploaded to the node server and then issued by the node server to the corresponding terminal; instead, the data packet is directly transferred via the corresponding ports of the current-level access switch and the subordinate access switch. For this embodiment, the communication routing mode of the access switch connected under the node server preferably employs the mode of the invention in which a data packet address table is configured based on the main control of a node server and then a data packet is transmitted according to the data packet address table.

In practice, communication between the terminals may be bidirectional, that is, one embodiment of the invention may include the following steps:

receiving, by the current-level access switch, an uplink data packet sent from a target terminal/source terminal with a destination address being an address of the source terminal/target terminal, orienting the data packet to a corresponding port according to settings of the data packet address table in the current-level access switch, and transmitting the data packet to the subordinate access switch;

orienting, by the subordinate switch, the data packet to a corresponding port according to settings of its data packet address table, and transferring the data packet to the source terminal/target terminal.

One embodiment of the invention is applicable for any unicast service, that is, as an example of a specific application, the data packet may be a unicast data packet, and in such a case, the data packet address table is a unicast data packet address table.

During a unidirectional or bidirectional unicast communication service, in different cases in which the source terminal, the target terminal and the current-level access switch are connected, the mode in which the node server notifies the access switch to set a data packet address table is also different, and specifically, it may mainly include the following six cases:

Case 1: The source terminal is connected with the current-level access switch directly, and the target terminal is connected with the current-level access switch via the subordinate access switch; in the case of unidirectional unicast communication, the steps in which the node server notifies the access switches to set the data packet address tables include the following substeps:

receiving, by the node server, a request initiated by the source terminal for establishing service communication with the target terminal, and acquiring communication link information of the current service according to the request, wherein the communication link information includes: information on a downlink port of the current-level access switch to which the subordinate access switch is connected, and information on a downlink port of the subordinate access switch to which the target terminal is connected;

sending, by the node server, a port configuration protocol packet to the current-level access switch and the subordinate access switch respectively according to the communication link information;

setting, by the current-level access switch, in its internal data packet address table according to the port configuration protocol packet, a downlink port to which a data packet with a destination address being an address of the target terminal is to be oriented; and setting, the subordinate access switch, in its internal data packet address table according to the port configuration protocol packet, a downlink port to which a data packet with a destination address being the address of the target terminal is to be oriented.

Case 2: The source terminal is connected with the current-level access switch directly, and the target terminal is connected with the current-level access switch via a subordinate access switch; in the case of a bidirectional unicast communication, the steps in which the node server notifies the access switches to set the data packet address tables include the following substeps:

receiving, by the node server, a request initiated by the source terminal for establishing service communication with the target terminal, and acquiring communication link information of the current service according to the request, wherein the communication link information includes: information on a downlink port of the current-level access switch to which a subordinate access switch is connected, information on a downlink port of the subordinate access switch to which the target terminal is connected, information on an uplink port of the subordinate access switch to which the current-level access switch is connected, and information on a downlink port of the current-level access switch to which the source terminal is connected;

sending, by the node server, a port configuration protocol packet to the current-level access switch and the subordinate access switch respectively according to the communication link information;

setting, by the current-level access switch, in its internal data packet address table according to the port configuration protocol packet, a downlink port to which a data packet with a destination address being an address of the target terminal is to be oriented, and a downlink port to which a data packet with a destination address being an address of the source terminal is to be oriented;

setting, the subordinate access switch, in its internal data packet address table according to the port configuration protocol packet, a downlink port to which a data packet with a destination address being the address of the target terminal is to be oriented, and an uplink port to which a data packet with a destination address being the address of the source terminal is to be oriented.

Case 3: The source terminal is connected with the current-level access switch via a subordinate access switch, and the target terminal is connected with the current-level access switch directly; in the case of a unidirectional unicast communication, the steps in which the node server notifies the access switches to set the data packet address tables include the following substeps:

receiving, by the node server, a request initiated by the source terminal for establishing service communication with the target terminal, and acquiring communication link information of the current service according to the request, wherein the communication link information includes: information on an uplink port of the subordinate access switch to which the current-level access switch is connected, and information on a downlink port of the current-level access switch to which the target terminal is connected;

sending, by the node server, a port configuration protocol packet to the current-level access switch and the subordinate access switch respectively according to the communication link information;

setting, by the current-level access switch, in its internal data packet address table according to the port configuration protocol packet, a downlink port to which a data packet with a destination address being an address of the target terminal is to be oriented;

setting, by the subordinate access switch, in its internal data packet address table according to the port configuration protocol packet, an uplink port to which a data packet with a destination address being the address of the target terminal is to be oriented.

Case 4: The source terminal is connected with the current-level access switch via a subordinate access switch, and the target terminal is connected with the current-level access switch directly; in the case of a bidirectional unicast communication, the steps in which the node server notifies the access switches to set the data packet address tables include the following substeps:

receiving, by the node server, a request initiated by the source terminal for establishing service communication with the target terminal, and acquiring communication link information of the current service according to the request, wherein communication link information includes: information on an uplink port of the subordinate access switch to which the current-level access switch is connected, information on a downlink port of the current-level access switch to which the target terminal is connected, information on a downlink port of the current-level access switch to which a subordinate access switch is connected, and information on a downlink port of the subordinate access switch to which the source terminal is connected;

sending, by the node server, a port configuration protocol packet to the current-level access switch and the subordinate access switch respectively according to the communication link information;

setting, by the current-level access switch, in its internal data packet address table according to the port configuration protocol packet, a downlink port to which a data packet with a destination address being an address of the target terminal is to be oriented, and a downlink port to which a data packet with a destination address being an address of the source terminal is to be oriented; and setting, by the subordinate access switch, in its internal data packet address table according to the port configuration protocol packet, an uplink port to which a data packet with a destination address being the address of the target terminal is to be oriented, and a downlink port to which a data packet with a destination address being the address of the source terminal is to be oriented.

Case 5: The source terminal is connected with the current-level access switch via a first subordinate access switch, and the target terminal is connected with the current-level access switch via a second subordinate access switch; in the case of unidirectional unicast communication, the steps in which the node server notifies the access switches to set the data packet address tables include the following substeps:

receiving, by the node server, a request initiated by the source terminal for establishing service communication with the target terminal, and acquiring communication link information of the current service according to the request, wherein the communication link information includes: information on an uplink port of the first subordinate access switch to which the current-level access switch is connected, information on a downlink port of the current-level access switch to which the second subordinate access switch is connected, and information on a downlink port of the second subordinate access switch to which the target terminal is connected;

sending, by the node server, a port configuration protocol packet to the current-level access switch, the first subordinate access switch and the second subordinate access switch respectively according to the communication link information;

setting, by the current-level access switch, in its internal data packet address table according to the port configuration protocol packet, a downlink port to which a data packet with a destination address being an address of the target terminal is to be oriented, and a downlink port to which a data packet with a destination address being an address of the source terminal is to be oriented;

setting, by the first subordinate access switch, in its internal data packet address table according to the port configuration protocol packet, an uplink port to which a data packet with a destination address being the address of the target terminal is to be oriented, and a downlink port to which a data packet with a destination address being the address of the source terminal is to be oriented; and setting, by the second subordinate access switch, in its internal data packet address table according to the port configuration protocol packet, a downlink port to which a data packet with a destination address being the address of the target terminal is to be oriented, and an uplink port to which a data packet with a destination address being the address of the source terminal is to be oriented.

Case 6: The source terminal is connected with the current-level access switch via a first subordinate access switch, and the target terminal is connected with the current-level access switch via a second subordinate access switch; in the case of a bidirectional unicast communication, the steps in which the node server notifies the access switches to set the data packet address tables include:

receiving, by the node server, a request initiated by the source terminal for establishing service communication with the target terminal, and acquiring communication link information of the current service according to the request, wherein the communication link information includes: information on an uplink port of the first subordinate access switch to which the current-level access switch is connected, information on a downlink port of the current-level access switch to which the second subordinate access switch is connected, information on a downlink port of the second subordinate access switch to which the target terminal is connected, information on an uplink port of the second subordinate access switch to which the current-level access switch is connected, information on a downlink port of the current-level access switch to which the first access switch is connected, and information on a downlink port of the first access switch to which the source terminal is connected;

sending, by the node server, a port configuration protocol packet to the current-level access switch, the first subordinate access switch and the second subordinate access switch respectively according to the communication link information;

setting, by the current-level access switch, in its internal data packet address table according to the port configuration protocol packet, a downlink port to which a data packet with a destination address being an address of the target terminal is to be oriented;

setting, by the first subordinate access switch, in its internal data packet address table according to the port configuration protocol packet, an uplink port to which a data packet with a destination address being the address of the target terminal is to be oriented; and setting, by the second subordinate access switch, in its internal data packet address table according to the port configuration protocol packet, a downlink port to which a data packet with a destination address being the address of the target terminal is to be oriented.

In a specific unicast communication service, the request initiated by the source terminal for establishing unicast service communication with the target terminal includes service type information, service content information and an access network address of the source terminal, wherein the service content information includes a service number;

The step in which the node server acquires the communication link information of the current service includes the following substeps:

extracting an access network address of the target terminal from a preset content-address mapping table according to the service number; and acquiring the communication link information of the current service according to the service type information, the access network address of the source terminal and the access network address of the target terminal.

For a unicast communication service, the communication link information may be unidirectional communication link information, for example, a source terminal initiates a unicast service request to a target terminal, or a target terminal initiates a unicast service request to a source terminal; or, the communication link information may also be bidirectional communication link information, for example, a source terminal and a target terminal initiate a unicast service request to each other.

During the process of establishing a communication connection, the node server may notify the source terminal and the target terminal, and determine whether the current communication link may be employed according to a reply of the target terminal; that is, in one preferred embodiment of the invention, the step in which the node server acquires the communication link information of the current service further includes the following substeps:

sending, by the node server, a menu protocol packet to the source terminal and the target terminal; and receiving a reply protocol packet issued by the target terminal in response to the menu protocol packet.

More specifically, the step in which the node server acquires the communication link information of the current service further includes the following substeps:

orienting the menu protocol packet to the source terminal according to settings of a preset downlink protocol packet address table in an access switch between the node server and the source terminal; and orienting the menu protocol packet to the target terminal according to settings of a preset downlink protocol packet address table in an access switch between the node server and the target terminal;

wherein, the downlink protocol packet address tables are set with: a CPU module to which a protocol packet with a destination address being an access network address of the current access switch is to be oriented; and a port to which a protocol packet with a destination address being an address of any other access network devices is to be oriented.

That is, the node server may send a menu protocol packet to the source terminal and the target terminal based on settings of preset protocol packet address tables.

In a specific implementation, when notifying an access switch to configure a data packet address table, the node server may further send a service processing command to the source terminal and the target terminal respectively, so as to notify the source terminal and the target terminal to perform a corresponding operation according to the service processing command.

One embodiment of the invention is applicable for any multicast service, that is, as an example of another specific application, the data packet may be a multicast data packet, and in such a case, the data packet address table is a multicast data packet address table; during a multicast service communication, the destination address of the data packet is a multicast address.

As one preferred embodiment of the invention, for a typical multicast service in which a target terminal requests for a multicast service, for example, a target terminal watches a living broadcast, and in different cases in which the target terminal and the current-level access switch are connected, the modes in which the node server notifies an access switch to set a data packet address table are different, and it mainly includes the following two cases:

Case 1: The target terminal is connected with the current-level access switch directly, and in such a case, the request for the current service includes a request initiated by the target terminal for multicast service communication, and the step in which the node server notifies the access switch to set a data packet address table includes the Mowing substeps:

acquiring, by the node server, the communication link information of the current service according to the request for the current service, wherein the communication link information includes information on a downlink port of the current-level access switch to which the target terminal is connected;

sending, by the node server, a port configuration protocol packet to the current-level access switch according to the communication link information; and setting, by the current-level access switch, in its internal data packet address table according to the port configuration protocol packet, the downlink port to which a data packet with a destination address being the multicast address is to be oriented.

Case 2: The target terminal is connected with the current-level access switch via a subordinate access switch, and in such a case, the request for the current service includes a request initiated by the target terminal for multicast service communication, and the step in which the node server notifies the access switches to set data packet address tables include the following substeps:

acquiring, by the node server, the communication link information of the current service according to the request for the current service, wherein the communication link information includes information on a downlink port of the current-level access switch to which the subordinate access switch is connected, and information on a downlink port of the subordinate access switch to which the target terminal is connected;

sending, by the node server, a port configuration protocol packet to the current-level access switch and the subordinate access switch according to the communication link information;

setting, by the current-level access switch, in its internal data packet address table according to the port configuration protocol packet, a downlink port to which a data packet with a destination address being the multicast address is to be oriented; and setting, by the subordinate access switch, in its internal data packet address table according to the port configuration protocol packet, a downlink port to which a data packet with a destination address being the multicast address is to be oriented.

Preferably, for a multicast business in which the source terminal further initiates a multicast service, for example, the source terminal initiates a living broadcast, and in different cases in which the source terminal and the current-level access switch are connected, the modes in which the node server notifies the access switches to set data packet address tables are different, and it mainly includes the following two cases:

Case 1: The request for the current service further includes a request submitted by the source terminal for initiating multicast service communication, the source terminal is connected with the current-level access switch directly, and the communication link information further includes information on a downlink port of the current-level access switch to which the source terminal is connected;

The step in which the node server notifies the access switches to set data packet address tables further includes:

sending, by the node server, a port configuration protocol packet to the current-level access switch according to the communication link information, and setting, by the current-level access switch, in its internal data packet address table according to the port configuration protocol packet, a downlink port to which a data packet with a destination address being the multicast address is to be oriented.

Case 2: The request for the current service further includes a request submitted by the source terminal for initiating multicast service communication, the source terminal is connected with the current-level access switch via the subordinate access switch, and the communication link information further includes information on a downlink port of the current-level access switch to which a subordinate access switch is connected, and information on a downlink port of the subordinate access switch to which the source terminal is connected;

The step in which the node server notifies the access switches to set data packet address tables further comprises:

sending, by the node server, a port configuration protocol packet to the current-level access switch and the subordinate access switch respectively according to the communication link information;

setting, by the current-level access switch, in its internal data packet address table according to the port configuration protocol packet, the downlink port to which a data packet with a destination address being the multicast address is to be oriented; and setting, by the subordinate access switch, in its internal data packet address table according to the port configuration protocol packet, the downlink port to which a data packet with a destination address being the multicast address is to be oriented.

As an embodiment of a specific multicast communication service, the request initiated by the target terminal for multicast service communication includes service type information, service content information and an access network address of the target terminal; wherein, the service content information includes a service number;

the step in which the node server acquires the communication link information of the current service comprises:

extracting an access network address of the source terminal in a preset content-address mapping table according to the service number;

acquiring a multicast address corresponding to the source terminal, and allocating the multicast address to the target terminal; and acquiring the downlink communication link information of the current multicast service according to the service type information, the access network address of the source terminal and the access network address of the target terminal.

This embodiment mainly relates to the communication link establishing process when a target terminal requests a multicast service, so the communication link thereof is a downlink on which multicast data are sent to the target terminal.

As an embodiment of another specific multicast communication service, the request submitted by the source terminal for initiating a multicast service communication includes service type information, service content information and an access network address of the source terminal, wherein, the service content information includes a service number;

the step in which the node server acquires the communication link information of the current service further includes:

allocating a multicast address to the source terminal according to the request; and acquiring a downlink communication link information of the current multicast service according to the service type information and the access network addresses of the node server and the source terminal.

This embodiment mainly relates to a communication link establishing process when a source terminal initiates a multicast, so the communication link thereof is a downlink on which multicast data are sent to the source terminal.

In a specific implementation, when the node server notifies the access switch to configure a data packet address table, it may further sends a service processing command to the target terminal, and the target terminal performs a corresponding operation according to the service processing command; or, it sends a service processing command to the source terminal, and the source terminal performs a corresponding operation according to the service processing command.

In practice, if the node server acquires a plurality of pieces of communication link information of the current service, the node server selects one piece of communication link information thereof as the communication link information of the current service according to a preset rule. As an example of a specific application, the preset rule may be as follows: the node server acquires the flow information of each communication link and the flow information of the current service, and the information on a communication link with the minimum flow used is determined as the communication link information of the current service; or, the preset rule may be as follows: the node server acquires the bandwidth information of each communication link and bandwidth information of the current service, and the information on a communication link with the maximum bandwidth is determined as the communication link information of the current service.

In a specific implementation, preferably, the request for the current service is recorded in a service request protocol packet, and the service request protocol packet is oriented to the node server via an uplink port of an access switch connected between the source terminal and the node server according to settings of a preset uplink protocol packet address table in the access switch.

Wherein, the uplink protocol packet address table is set with an uplink port to which a protocol packet with a destination address being the node server is to be oriented.

In one embodiment of the invention, preferably, the node server orients the port configuration protocol packet to a corresponding access switch by connecting to the downlink port of the corresponding access switch according to the settings of its internal preset downlink protocol packet address table;

Wherein, the downlink protocol packet address table is set with a downlink port to which a protocol packet with a destination address being the address of a subordinate access network device is to be oriented.

In order to save resources, after the current service is completed, one embodiment of the invention may further include the following steps:

sending, by the node server, a port releasing command to an access switch that participates in the current service, after the current service is completed; and releasing, by the access switch, the port to which a data packet of the current service is to be oriented from its internal data packet address table according to the port releasing command.

Preferably, the node server will also issue a service processing ending command to the source terminal and/or the target terminal, and the source terminal and/or target terminal ends the service processing according to the service processing ending command.

In order to better perform the centralized management and control on the access network address, an address information table is further set inside the node server, in which the address occupation information, the device identification information and the device resource information are recorded.

After the current service is completed, the node server will modify the contents in the preset address information table, and the modifying includes updating the address occupation information of the port released by the access switch as not being used.

To realize the convergence of the novel network of the invention and the existing Ethernet, the access network device further includes an Ethernet protocol conversion gateway and a local area Ethernet that are connected between the access switches and the source terminal as well as the target terminal, and one embodiment of the invention may further include the following steps:

the Ethernet protocol conversion gateway accesses the novel network, and obtains the MAC address of the Ethernet protocol conversion gateway and the MAC addresses of terminals bond to the Ethernet protocol conversion gateway from the node server;

the Ethernet protocol conversion gateway receives a data packet or a protocol packet sent from the novel network, adds the MAC address of the Ethernet protocol conversion gateway and an MAC address of the target terminal into the data packet or the protocol packet, and then sends the packet to the local area Ethernet; and the Ethernet protocol conversion gateway receives a data packet or a protocol packet sent from the local area Ethernet, removes the MAC address of the Ethernet protocol conversion gateway and an MAC address of the source terminal from the data packet or the protocol packet, and then sends the packet to the novel network;

wherein, the target terminal and the source terminal conform to a novel network protocol.

In this embodiment, preferably, for a data packet sent from the novel network and a data packet sent from the Ethernet, the packet headers both contain the addresses of the two transmission ends in the novel network, wherein the address is the source address and the destination address of the data packet.

After the Ethernet protocol conversion gateway accesses the novel network, it may further include the following steps:

obtaining a mapping between the MAC addresses of the terminals bond to the Ethernet protocol conversion gateway and the addresses of the terminals in the novel network; and receiving, by the Ethernet protocol conversion gateway, a data packet sent from the novel network, and adding an MAC address of a corresponding target terminal into the data packet according to the mapping between the destination address of the data packet and the MAC address.

In a specific implementation, a binding relation between the MAC addresses of the terminals and the Ethernet protocol conversion gateway is preset in the node server at the time the terminal and the Ethernet protocol conversion gateway are sold.

One embodiment of the invention further discloses a service communication system for an access network device, wherein the access network device includes a node server, and a source terminal and a target terminal jointly connected to one and the same access switch, and the node server includes:

a notifying module, for notifying, according to a request for the current service, the access switch to which the source terminal and the target terminal are jointly connected to set, in the access switch's internal data packet address table, a downlink port of the access switch to which a data packet of the current service is to be oriented;

the access switch includes:

a port configuring module, for setting, in its internal packet address table according to a port configuring notification sent by the node server, a downlink port of the access switch to which a data packet of the current service is to be oriented; and a first port orienting module, for orienting, after receiving an uplink data packet of the current service sent by the source terminal, the data packet to a corresponding downlink port according to settings of its internal data packet address table, and transferring the data packet to the target terminal via the downlink port.

In practice, the communication between the terminals may be bidirectional, that is, in addition to the above application case in which a source terminal sends a data packet to a target terminal, in one embodiment of the invention, the access switch further includes:

a second port orienting module, for orienting, after receiving an uplink data packet of the current service sent by the target terminal, the data packet to a corresponding downlink port according to the settings of its internal data packet address table, and transferring the data packet to the source terminal via the downlink port.

One embodiment of the invention is applicable for any unicast service, that is, as an example of a specific application, the data packet may be a unicast data packet, and in such a case, the data packet address table is a unicast data packet address table; during unicast service communication, the destination address of the data packet will the receiving-party address.

As one preferred embodiment of the invention, during unidirectional communication of a unicast service, the request for the current service is a request submitted by the source terminal for establishing unicast service communication with the target terminal, the notifying module of the node server includes:

a first communication link acquiring submodule, for acquiring communication link information of the current service according to the request for the current service, wherein the communication link information includes information on a downlink port of the access switch to which the target terminal is connected;

a port configuration protocol packet sending submodule, for sending a port configuration protocol packet to the access switch according to the communication link information.

The port configuring module of the access switch includes:

a first port configuring submodule, for setting, in its internal data packet address table according to the port configuration protocol packet, a downlink port to which a data packet with a destination address being the target terminal is to be oriented.

As another preferred embodiment of the invention, during a bidirectional communication of a unicast service, the request for the current service includes a request submitted by the source terminal for establishing a unicast service communication with the target terminal, and the notifying module of the node server includes:

a second communication link acquiring submodule, for acquiring communication link information of the current service according to the request for the current service, wherein the communication link information includes information on a downlink port of the access switch to which the source terminal is connected and information on a downlink port of the access switch to which the target terminal is connected;

a port configuration protocol packet sending submodule, for sending a port configuration protocol packet to the access switch according to the communication link information.

The port configuring module of the access switch includes:

a second port configuring submodule, for setting, in its internal data packet address table according to the port configuration protocol packet, a downlink port to which a data packet with a destination address being the source terminal is to be oriented and a downlink port to which a data packet with a destination address being the target terminal is to be oriented.

In a specific unicast communication service, the request for the current service includes service type information, service content information and an access network address of the source terminal, wherein, the service content information includes a service number; the first communication link acquiring submodule or the second communication link acquiring submodule in the node server further comprises:

a target terminal address extracting unit, for extracting an access network address of the target terminal from a preset content-address mapping table according to the service number;

a link calculating unit, for acquiring the communication link information of the current service according to the service type information, the access network address of the source terminal and the access network address of the target terminal.

For a unicast communication service, the communication link information may be unidirectional communication link information, for example, a source terminal initiates a unicast service request to a target terminal, or a target terminal initiates a unicast service request to a source terminal; or, the communication link information may also be bidirectional communication link information, for example, a source terminal and a target terminal initiate a unicast service request to each other.

During the process of establishing a communication connection, the node server may notify the source terminal and the target terminal, and determine whether the current communication link may be employed according to a reply of the target terminal; that is, in one preferred embodiment of the invention, the node server further includes:

a menu protocol packet sending module, for sending a menu protocol packet to the source terminal and the target terminal; and a reply protocol packet receiving module, for receiving a reply protocol packet issued by the target terminal in response to the menu protocol packet.

More specifically, when the access switch is an access switch connected between the node server and the source terminal, the access switch further includes:

a first menu packet orienting module, for orienting the menu protocol packet to the source terminal according to the settings of its internal preset downlink protocol packet address table.

When the access switch is an access switch connected between the node server and the target terminal, the access switch further includes:

a second menu packet orienting module, for orienting the menu protocol packet to the target terminal according to the settings of its internal preset downlink protocol packet address table;

Wherein the downlink protocol packet address table is set with: a CPU module to which a protocol packet with a destination address being an access network address of the current access switch is to be oriented; and a port to which a protocol packet with a destination address being an address of any other access network device is to be oriented.

That is, the node server may send a menu protocol packet to the source terminal and the target terminal based on the settings of a preset protocol packet address table.

In a specific implementation, when notifying the access switch to configure a data packet address table, the node server may further send a service processing command to the source terminal and the target terminal respectively, so as to notify the source terminal and the target terminal to perform a corresponding operation according to the service processing command. That is, in one preferred embodiment of the invention, the node server further includes:

a service processing command sending module, for sending a service processing command to the source terminal and the target terminal respectively;

The source terminal further comprises: a first command performing module, for performing a corresponding operation according to the service processing command.

The target terminal further comprises: a second command performing module, for performing a corresponding operation according to the service processing command.

One embodiment of the invention is applicable for any multicast service, that is, as an example of another specific application, the data packet may be a multicast data packet, and in such a case, the data packet address table is a multicast data packet address table; during a multicast service communication, the destination address of the data packet is a multicast address.

As one preferred embodiment of the invention, for a typical multicast service in which a target terminal requests for a multicast service, for example, a target terminal watches a living broadcast, the request for the current service includes a request initiated by a target terminal for multicast service communication, and the notifying module of the node server includes:

a third communication link acquiring submodule, for acquiring communication link information of the current service according to the request for the current service, wherein the communication link information comprises information on a downlink port of the access switch to which the target terminal is connected; and a port configuration protocol packet sending submodule, for sending a port configuration protocol packet to the access switch according to the communication link information.

The port configuring module of the access switch includes:

a third port configuring submodule, for setting, in its internal data packet address table according to the port configuration protocol packet, a downlink port to which a data packet with a destination address being the multicast address is to be oriented.

Preferably, for a multicast business in which the source terminal further initiates a multicast service, for example, the source terminal initiates a living broadcast, the request for the current service further includes a request submitted by the source terminal for initiating multicast service communication, and the notifying module of the node server includes:

a fourth communication link acquiring submodule, for acquiring communication link information of the current service according to the request for the current service, wherein the communication link information comprises information on a downlink port of the access switch to which the source terminal is connected; and a port configuration protocol packet sending submodule, for sending a port configuration protocol packet to the access switch according to the communication link information.

The port configuring module of the access switch includes:

a fourth port configuring submodule, for setting, in its internal data packet address table according to the port configuration protocol packet, a downlink port to which a data packet with a destination address being the multicast address is to be oriented.

As an embodiment of a specific multicast communication service, the request initiated by the target terminal for multicast service communication includes service type information, service content information and an access network address of the target terminal; wherein, the service content information includes a service number;

The third communication link acquiring submodule of the node server further includes:

a source terminal address extracting unit, for extracting an access network address of the source terminal from a preset content-address mapping table according to the service number;

a first multicast address allocating unit, for acquiring a multicast address corresponding to the source terminal, and allocating the multicast address to the target terminal; and a first link calculating unit, for acquiring downlink communication link information of a current multicast service according to the service type information, the access network address of the source terminal, and the access network address of the target terminal.

This embodiment mainly relates to the communication link establishing process when a target terminal requests a multicast service, so the communication link thereof is a downlink on which multicast data are sent to the target terminal.

As an embodiment of another specific multicast communication service, the request submitted by the source terminal for initiating multicast service communication includes service type information, service content information and an access network address of the source terminal, wherein, the service content information includes a service number.

The fourth communication link acquiring submodule of the node server further includes:

a second multicast address allocating unit, for allocating a multicast address to the source terminal according to the request;

a second link calculating unit, for acquiring downlink communication link information of the current multicast service according to the service type information and the access network addresses of the node server and the source terminal.

This embodiment mainly relates to a communication link establishing process when a source terminal initiates a multicast, so the communication link thereof is a downlink on which multicast data are sent to the source terminal.

In a specific implementation, preferably, the request for the current service is recorded in a service request protocol packet, when the access switch is an access switch connected between the source terminal and the node server, the access switch further includes:

an uplink orienting module, for orienting the service request protocol packet to the node server via an uplink port of the access switch according to settings of a preset uplink protocol packet address table in the access switch;

wherein, the uplink protocol packet address table is set with an uplink port to which a protocol packet with a destination address being an address of the node server is to be oriented.

In one embodiment of the invention, preferably, the node server further includes:

a downlink orienting module, for orienting a port configuration protocol packet to a corresponding access switch by connecting to a corresponding downlink port of the access switch according to settings of the node server's internal preset downlink protocol packet address table;

wherein, the downlink protocol packet address table is set with a downlink port to which a protocol packet with a destination address being an address of a subordinate access network device is to be oriented.

In order to save resources, after the current service is completed, the node server further includes:

a port release notifying module, for sending a port releasing command to the access switch to which the source terminal and the target terminal are jointly connected, after the current service is completed.

The access switch further includes:

a port release processing module, for releasing the port to which a data packet of the current service is to be oriented from its internal data packet address table according to the port releasing command.

Preferably, the node server further includes:

a service processing ending command sending module, for issuing a service processing ending command to the source terminal and/or the target terminal.

The source terminal includes a first ending processing module, for ending service processing according to the service processing ending command;

The target terminal includes a second ending processing module, for ending service processing according to the service processing ending command.

In order to better perform the centralized management and control on the access network address, an address information table is further set inside the node server, in which the address occupation information, the device identification information and the device resource information are recorded.

After the current service is completed, the node server further includes:

an address information table updating module, for modifying content in a preset address information table, wherein the modifying comprises updating address occupation information of a port released by the access switch as not being used.

To realize the convergence of the novel network of the invention and the existing Ethernet, the access network device further includes an Ethernet protocol conversion gateway and a local area Ethernet that are connected between the access switch and the source terminal as well as the target terminal, and the Ethernet protocol conversion gateway includes:

an MAC acquiring module, for accessing the novel network, and for obtaining from the node server an MAC address of the Ethernet protocol conversion gateway and MAC addresses of terminals bond to the Ethernet protocol conversion gateway;

an MAC adding module, for receiving a data packet or a protocol packet sent from the novel network, for adding the MAC address of the Ethernet protocol conversion gateway and an MAC address of the target terminal into the data packet or the protocol packet, and then for sending the data packet or the protocol packet to the local area Ethernet;

an MAC deleting module, for receiving a data packet or a protocol packet sent from the local area Ethernet, for removing the MAC address of the Ethernet protocol conversion gateway and an MAC address of the source terminal from the data packet or the protocol packet, and then for sending the data packet or the protocol packet to the novel network;

wherein, the target terminal and the source terminal conform to a novel network protocol.

In this embodiment, preferably, for the data packet sent from the novel network and the data packet sent from the Ethernet, the packet headers both contain the addresses of the two transmission ends in the novel network, wherein the address is the source address and the destination address of the data packet.

After the Ethernet protocol conversion gateway accesses the novel network, the Ethernet protocol conversion gateway further includes:

a mapping relation acquiring module, for obtaining a mapping between the MAC addresses of the terminals bond to the Ethernet protocol conversion gateway and novel network addresses of the terminals after the Ethernet protocol conversion gateway accesses the novel network;

thus, the MAC adding module is further configured for receiving a data packet sent from the novel network, and for adding a corresponding MAC address of the target terminal into the data packet according to a mapping between a destination address of the data packet and the MAC address.

In a specific implementation, a binding relation between the Ethernet protocol conversion gateway and the MAC addresses of the terminals is preset in the node server when the terminals and the Ethernet protocol conversion gateway are sold.

One embodiment of the invention further discloses a node server, including:

a service request receiving module configured for receiving a request for a current service; wherein the request comprises information on a source terminal and information on a target terminal; and a notifying module configured for notifying, according to the request for the current service, an access switch to which the source terminal and the target terminal are jointly connected to set, in the access switch's internal data packet address table, a downlink port of the access switch to which a data packet of the current service is to be oriented.

One embodiment of the invention is applicable for any unicast service, that is, as an example of a specific application, the data packet may be a unicast data packet, and in such a case, the data packet address table is a unicast data packet address table; during unicast service communication, the destination address of the data packet will the receiving-party address.

As one preferred embodiment of the invention, during a unidirectional communication of a unicast service, the request for the current service is a request submitted by a source terminal for establishing unicast service communication with a target terminal, and the notifying module includes:

a first communication link acquiring submodule configured for acquiring communication link information of the current service according to the request for the current service, wherein the communication link information comprises information on a downlink port of the access switch to which the target terminal is connected; and a port configuration protocol packet sending submodule configured for sending a port configuration protocol packet to the access switch according to the communication link information.

As another preferred embodiment of the invention, during a bidirectional communication of a unicast service, the request for the current service includes a request submitted by the source terminal for establishing unicast service communication with the target terminal, and the notifying module includes:

a second communication link acquiring submodule configured for acquiring communication link information of the current service according to the request for the current service, wherein the communication link information comprises information on a downlink port of the access switch to which the source terminal is connected and information on a downlink port of the access switch to which the target terminal is connected; and a port configuration protocol packet sending submodule configured for sending a port configuration protocol packet to the access switch according to the communication link information.

In a specific unicast communication service, the request for the current service includes service type information, service content information and an access network address of the source terminal, wherein, the service content information includes a service number; the first communication link acquiring submodule or second communication link acquiring submodule in the node server further comprises:

a target terminal address extracting unit configured for extracting an access network address of the target terminal from a preset content-address mapping table according to the service number; and a link calculating unit configured for acquiring the communication link information of the current service according to the service type information, the access network address of the source terminal and the access network address of the target terminal.

For a unicast communication service, the communication link information may be unidirectional communication link information, for example, a source terminal initiates a unicast service request to a target terminal, or a target terminal initiates a unicast service request to a source terminal; or, the communication link information may also be bidirectional communication link information, for example, a source terminal and a target terminal initiate a unicast service request to each other.

During the process of establishing a communication connection, the node server may notify the source terminal and the target terminal, and determine whether the current communication link may be employed according to a reply of the target terminal; that is, in one preferred embodiment of the invention, the node server further comprises:

a menu protocol packet sending module configured for sending a menu protocol packet to the source terminal and the target terminal; and a reply protocol packet receiving module configured for receiving a reply protocol packet issued by the target terminal in response to the menu protocol packet.

In a specific implementation, when notifying the access switch to configure a data packet address table, the node server may further send a service processing command to the source terminal and the target terminal respectively, so as to notify the source terminal and the target terminal to perform a corresponding operation according to the service processing command. That is, in one preferred embodiment of the invention, the node server further comprises:

a service processing command sending module, for sending a service processing command to the source terminal and the target terminal respectively, so as to notify the source terminal and the target terminal to perform a corresponding operation according to the service processing command.

One embodiment of the invention is applicable for any multicast service, that is, as an example of another specific application, the data packet may be a multicast data packet, and in such a case, the data packet address table is a multicast data packet address table; during a multicast service communication, the destination address of the data packet is a multicast address.

As one preferred embodiment of the invention, for a typical multicast service in which a target terminal requests for a multicast service, for example, a target terminal watches a living broadcast, the request for the current service includes a request initiated by a target terminal for multicast service communication, and the notifying module comprises:

a third communication link acquiring submodule configured for acquiring communication link information of the current service according to the request for the current service, wherein the communication link information comprises information on a downlink port of the access switch to which the target terminal is connected; and a port configuration protocol packet sending submodule configured for sending a port configuration protocol packet to the access switch according to the communication link information.

Preferably, for a multicast business in which the source terminal further initiates a multicast service, for example, the source terminal initiates a living broadcast, the request for the current service further includes a request submitted by the source terminal for initiating multicast service communication, and the notifying module comprises:

a fourth communication link acquiring submodule configured for acquiring communication link information of the current service according to the request for the current service, wherein the communication link information comprises information on a downlink port of the access switch to which the source terminal is connected; and a port configuration protocol packet sending submodule configured for sending a port configuration protocol packet to the access switch according to the communication link information.

As an embodiment of a specific multicast communication service, the request initiated by the target terminal for a multicast service communication includes service type information, service content information and an access network address of the target terminal; wherein, the service content information includes a service number;

The third communication link acquiring submodule further comprises:

a source terminal address extracting unit configured for extracting an access network address of the source terminal from a preset content-address mapping table according to the service number;

a first multicast address allocating unit configured for acquiring a multicast address corresponding to the source terminal, and for allocating the multicast address to the target terminal; and a first link calculating unit configured for acquiring downlink communication link information of a current multicast service according to the service type information, the access network address of the source terminal, and the access network address of the target terminal.

This embodiment mainly relates to the communication link establishing process when a target terminal requests a multicast service, so the communication link thereof is a downlink on which multicast data are sent to the target terminal.

As an embodiment of another specific multicast communication service, the request submitted by the source terminal for initiating a multicast service communication includes service type information, service content information and an access network address of the source terminal, wherein, the service content information includes a service number.

The fourth communication link acquiring submodule further comprises:

a second multicast address allocating unit configured for allocating a multicast address to the source terminal according to the request; and a second link calculating unit configured for acquiring downlink communication link information of a current multicast service according to the service type information, an access network address of the node server, and the access network address of the source terminal.

This embodiment mainly relates to a communication link establishing process when a source terminal initiates a multicast, so the communication link thereof is a downlink on which multicast data are sent to the source terminal.

In a specific implementation, preferably, the node server further comprises:

a first service processing command sending module configured for sending a service processing command to the taget terminal, so as to notify the target terminal to perform a corresponding operation according to the service processing command;

and/or, a second service processing command sending module configured for sending a service processing command to the source terminal, so as to notify the source terminal to perform a corresponding operation according to the service processing command.

Preferably, the node server further comprises:

a downlink orienting module configured for orienting a port configuration protocol packet to a corresponding access switch by connecting to a corresponding downlink port of the access switch according to settings of the node server's internal preset downlink protocol packet address table; and wherein, the downlink protocol packet address table is set with a downlink port to which a protocol packet with a destination address being an address of a subordinate access network device is to be oriented.

In order to save resources, after the current service is completed, the node server further comprises:

a port release notifying module configured for sending a port releasing command to the access switch to which the source terminal and the target terminal are jointly connected, after the current service is completed.

Preferably, the node server further comprises:

a service processing ending command sending module configured for issuing a service processing ending command to the source terminal and/or the target terminal.

The source terminal comprises a first ending processing module configured for ending service processing according to the service processing ending command.

The target terminal comprises a second ending processing module configured for ending service processing according to the service processing ending command.

In order to better perform the centralized management and control on the access network address, an address information table is further set inside the node server, in which the address occupation information, the device identification information and the device resource information are recorded.

After the current service is completed, the node server further comprises:

a an address information table updating module configured for modifying content in a preset address information table; wherein the modifying comprises updating address occupation information of a port released by the access switch as not being used.

One embodiment of the invention further discloses an access switch, to which a source terminal and a target terminal are connected, and the access switch includes:

an interacting module, for receiving port configuring notification sent by a node server with respect to a request for a current service;

a port configuring module, for setting, in its internal data packet address table according to the port configuring notification, a downlink port of the access switch to which a data packet of the current service is to be oriented; and a first port orienting module, for orienting an data packet of the current service sent by the source terminal to a corresponding downlink port according to settings of its internal data packet address table after receiving the data packet, and for transferring the data packet to the target terminal via the downlink port.

In practice, the communication between the terminals may be bidirectional, that is, in addition to the above application case in which a source terminal sends a data packet to a target terminal, in one embodiment of the invention, the access switch further includes:

a second port orienting module configured for orienting, an uplink data packet of the current service sent by the target terminal, to a corresponding downlink port according to the settings of its internal data packet address table after receiving the data packet, and for transferring the data packet to the source terminal via the downlink port.

One embodiment of the invention is applicable for any unicast service, that is, as an example of a specific application, the data packet may be a unicast data packet, and in such a case, the data packet address table is a unicast data packet address table; during unicast service communication, the destination address of the data packet will the receiving-party address.

As one preferred embodiment of the invention, during a unidirectional communication of a unicast service, the current service is a unicast service communication between a source terminal and a target terminal, the port configuring notification sent by the node server is packaged in a port configuration protocol packet, and the port configuration protocol packet includes information on a downlink port of the access switch to which the target terminal is connected.

The port configuring module of the access switch comprises:

a first port configuring submodule configured for setting, in its internal data packet address table according to the port configuration protocol packet, a downlink port to which a data packet with a destination address being an address of the target terminal is to be oriented.

As another preferred embodiment of the invention, during a bidirectional communication of a unicast service, the current service is unicast service communication between a source terminal and a target terminal, the port configuring notification sent by the node server is packaged in a port configuration protocol packet, and the port configuration protocol packet includes information on a downlink port of the access switch to which the source terminal is connected and information on a downlink port to which the target terminal is connected.

The port configuring module of the access switch comprises:

a second port configuring submodule configured for setting, in its internal data packet address table according to the port configuration protocol packet, a downlink port to which a data packet with a destination address being an address of the source terminal is to be oriented and a downlink port to which a data packet with a destination address being an address of the target terminal is to be oriented.

During the process of establishing a communication connection, the node server may notify the source terminal and the target terminal, and determine whether the current communication link may be employed according to a reply of the target terminal; that is, in one preferred embodiment of the invention, when the access switch is an access switch connected between the node server and the source terminal, the access switch further comprises:

a first menu packet orienting module configured for orienting a menu protocol packet sent by the node server to the source terminal according to settings of its internal preset downlink protocol packet address table.

When the access switch is an access switch connected between the node server and the target terminal, the access switch further comprises:

a second menu packet orienting module configured for orienting the menu protocol packet sent by the node server to the target terminal according to the settings of its internal preset downlink protocol packet address table;

wherein the downlink protocol packet address table is set with: a CPU module to which a protocol packet with a destination address being an access network address of the current access switch is to be oriented; and a port to which a protocol packet with a destination address being an address of any other access network device is to be oriented.

One embodiment of the invention is applicable for any multicast service, that is, as an example of another specific application, the data packet may be a multicast data packet, and in such a case, the data packet address table is a multicast data packet address table; during a multicast service communication, the destination address of the data packet is a multicast address.

As one preferred embodiment of the invention, for a typical multicast service in which a target terminal requests for a multicast service, for example, a target terminal watches a living broadcast, the current service includes multicast service communication initiated by a target terminal, the port configuring notification sent by the node server is packaged in a port configuration protocol packet, and the port configuration protocol packet includes information on a downlink port of the access switch to which the target terminal is connected;

The port configuring module of the access switch comprises:

a third port configuring submodule configured for setting, in its internal data packet address table according to the port configuration protocol packet, a downlink port to which a data packet with a destination address being the multicast address is to be oriented.

Preferably, for a multicast business in which the source terminal further initiates a multicast service, for example, the source terminal initiates a living broadcast, the current service further comprises multicast service communication initiated by a source terminal; the port configuration protocol packet sent by the node server further includes information on a downlink port of the access switch to which the source terminal is connected.

The port configuring module of the access switch comprises:

a fourth port configuring submodule configured for setting, in its internal data packet address table according to the port configuration protocol packet, a downlink port to which a data packet with a destination address being the multicast address is to be oriented.

As an embodiment of a specific multicast communication service, the request for the current service is recorded in a service request protocol packet, when the access switch is an access switch connected between the source terminal and the node server, the access switch further comprises:

an uplink orienting module configured for orienting the service request protocol packet to the node server via an uplink port of the access switch according to settings of a preset uplink protocol packet address table in the access switch;

wherein, the uplink protocol packet address table is set with an uplink port to which a protocol packet with a destination address being an address of the node server is to be oriented.

After the current service is completed, the access switch further comprises:

a port release processing module configured for releasing a port to which a data packet of the current service is to be oriented from its internal data packet address table according to a port releasing command sent by the node server.

It should be noted that, as divided according to the actual hardware, the node server of the invention mainly comprises a network interface module, a switching engine module, a CPU module and a disk array module; the access switch of the invention mainly comprises a network interface module (downlink network interface module and uplink network interface module), a switching engine module and a CPU module; because the above hardware modules perform different functions for different processing situations, for example, the switching engine module looks up in different address tables for different packets (protocol packet and data packet, etc.), the orientation information of the packets obtained will be different; or, in the case that a CPU module receives a packet, it may configure an address table, or it may parse the packet and generate a reply packet. Thus, for those skilled in the art to better understand the invention, in the embodiments of the invention, the modules related to the network access systems of the node server, the access switch and the access network device of the invention are mainly described with regard to their functions. However, essentially, such functional modules correspond to the actual hardware modules.

In comparison with the prior art, the invention has the following advantages:

In the invention, for a service communication process of a source terminal and a target terminal jointly connected to one and the same access switch, firstly, a node server notifies the access switch to set, in its internal data packet address table, a downlink port to which a data packet of the current service is to be oriented; when a service communication is carried out between the source terminal and the target terminal, a data packet is directly transferred via a corresponding downlink port of the access switch according to the settings of the internal data packet address table, that is, the source terminal and the target terminal may directly carry out a service communication under the access switch to which they are jointly connected, without the need to upload the data packet to the node server and then deliver the data packet to the corresponding terminal by the node server. Thus, the bandwidth and the routing resources may be effectively saved.

Further, in the invention, when a service request is initiated (in the protocol interaction process established by the communication process), the transmission path of the current service data is set in advance by a main control server according to the situation of the service request in a mode in which a table is configured for each access switch; during the transmission process of a data packet, the data packet may be transmitted directly according to the transmission path, without the need to employ the solution of the existing IP protocol in which each data packet negotiates the transmission route autonomously. In a word, the present invention may guarantee the stability and smoothness of the transmission path, and avoid the time delay of a multimedia service.

Moreover, in the invention, a mode of table configuration is employed for all data services, and a path is set in advance, thus the state information security requirements may be met. For example, for state information security, it requires monitoring certain data in the novel network; by employing the mode of table configuration according to the invention, it is very easy to orient the data transmitted by the current service to a monitoring channel, so that it can meet the requirements of state information security.

In addition, in the invention, the access switch does not need to perform routing calculation for each data packet, and it does not need to maintain the network device topology around it, either, so long as oriented transmission is performed according to the data packet address table configured in advance, and the orienting process may be implemented via hardware, which may greatly improve the orienting efficiency of the switch, drastically lower the operation demand of the switch, and save the hardware resources.

DETAILED DESCRIPTION OF THE EMBODIMENTS

Figure 1:
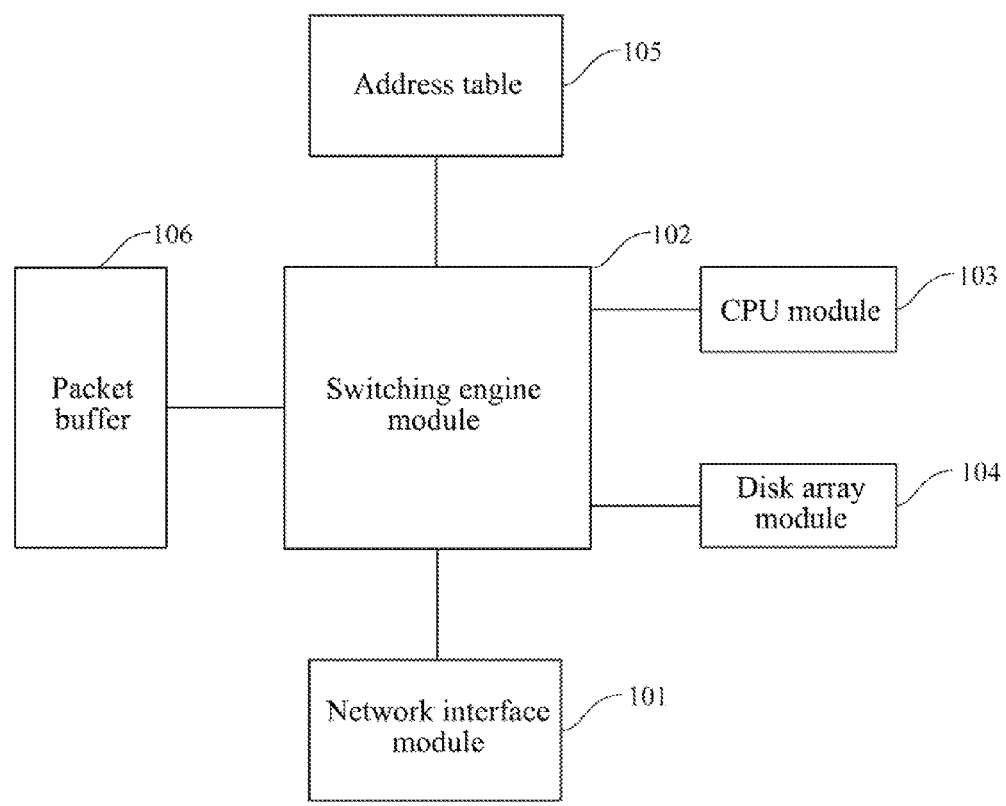
FIG. 1 shows the hardware structural representation of a node server according to the invention

To make the above objects, characteristics and advantages of the invention more apparent, the invention will be further illustrated below in detail in conjunction with the drawings and embodiments.

1) The core concept of the invention will be briefly introduced below.

It is considered by the inventor that the present invention has the following several sufficient conditions for realizing network-wide QoS:

Firstly, the mechanism about "Best Efforts" in the core theories of IP Internet will certainly cause network flow non-uniformity and frequent packet loss. In fact, TCP protocol just utilizes the packet loss state of the network to adjust the transmission flow.

Secondly, the mechanism about "Store & Forward" in the core theories of IP Internet will cause a greater non-uniformity of network flow at the next node at the time it absorbs the local burst flow.

Thirdly, the mechanism about "Error Detection & Retransmission" in the core theories of IP Internet will cause an intolerable delay in synchronous video communication, thus it has no use value.

Fourthly, successional network flow non-uniformity or burst flow will certainly cause periodic switch (router) packet loss.

Thus it can be seen that, because the computer file burst flow is discrete in essence and has no subsequent burst flows, the above core theories of IP Internet have once made the Internet able to transmit a file efficiently. However, when facing the QoS successional synchronous streaming media transmission, the above core theories of IP Internet becomes a prime criminal that harms the quality of network transmission. A conclusion has been drawn from the above discussion that, none of resource reservation, priority and light-load solutions can solve the QoS of synchronous streaming media fundamentally.

Since none of the above methods is feasible, how can we guarantee the quality of network transmission?

it is considered by the inventor that the current various QoS methods are all based on an error hypothesis. According to this hypothesis, the QoS solutions are to provide a privilege of being processed preferentially to video flow. But in fact, because the network flow needed by different media forms is extremely non-uniform, video flow will be the absolute main body on the network so long as a few users use a video service.

Seen from another viewpoint, providing a good quality especially to a majority of the network flows is equivalent to providing a poor quality especially to a minority of the network flows (i.e., the non-video flows). Since a majority of the network flows must require QoS, why not provide QoS to the remaining minority of service flows that does not require QoS? It is hypothesized that, when subscribing an airline ticket, 1000 passengers request first class and only a few passengers accept economy class, then a natural measure taken by the airline company is to cancel economy class, because the cost taken by the airline company to provide only a few economy-class services is much greater than that to provide free class upgrade for these passengers. In fact, it is very easy to guarantee the quality of all network transmission or none of the network transmission, but it is difficult to partially guarantee the quality, especially when we do not know the dividing line of the two parts. Therefore, no QoS problem will exist, so long as QoS is provided to all network services.

In its early stage, IP Internet is just like a country road, and no traffic policeman is needed in a small town with unsophisticated folkway. However, in a bustling bigalopolis, the disordered scene on some busy roads is out of control even with traffic lights and traffic policemen, and it is difficult to be on time for trips or appointments, just like today's IP Internet.

The invention is just like a highway, with no policeman and traffic light: and motor vehicles are restricted to run on specified roads via traffic lanes isolated by concrete and flyover crossings. According to the experience of the traffic bureau of California, the way to avoid highway jam is to close the entrance ramp.

The design concept of California highway has three features:
  a switch is set on the entrance ramp of the highway for controlling the macroscopic traffic flow;
  the driving speed is kept stable, thereby improving the traffic rate; and
  road isolations of a concrete structure and flyover crossings, rather than policemen and traffic lights, are employed to restrict vehicle driving.

The embodiments of the invention conform to theory of telephone networks and take three measures similar to those of the above highway:
  the flow on each path is calculated and measured, once the flow is to be saturated, it will be bypassed, or new users will be rejected;
  strict uniform-flow transmission is performed, and in the embodiments of the invention, a packet loss rate of $1/1,000,000$ can be attained in TV under a heavy-load flow of 90%; and uplink data matching and flow control are performed, so that it can be ensured on structure that users strictly conform to the traffic rules, because it is impossible to expect that all users autonomously take the QoS measures.

Computer files and streaming media are two kinds of distinct media forms, and the processing modes thereof are exclusive to each other. Theory and practice of the network according to the invention disclose the following two achievements:
  a price-performance ratio that is a hundredfold of that of IP Internet;
  a method for developing high-quality symmetrical TV without interfering with the existing IP Internet service.

Especially on a large-flow backbone network, computer files and streaming media use the same optical fiber via different wavelengths. If they must be united to a single network, for example, an access network, then the computer files should be united to a video streaming network. An embodiment of the invention provides a complete solution for transparent bearer IP Internet.

Separating streaming media and files is just the first step, it is more important to guarantee the quality of the independent streaming media network.

As described above, the PSTN telephone network employs a strict synchronization mechanism, and the network congestion phenomenon will not appear before the flow is occupied 100 percent. Theoretically, a uniform flow will be obtained after a plurality of uniform flows are combined. It has been further proved by practice that under the premise of a uniform flow, the network flow may reach its limit value, with no packet loss phenomenon appears. Because the video media flow, which occupies over ninety percent of the further network flow, has the characteristics of a uniform flow, in the present invention that takes video service as the main object, the approach to guaranteeing Internet QoS is of course to eliminate source flow non-uniformity, especially to fundamentally prevent packet loss phenomenon of a network switch from appearing under a heavy load condition.

In an embodiment of the invention, a modified Ethernet is employed to establish a connection-oriented circuit, and packets with fixed length are unitedly employed network-wide. A media flow of any bandwidth may be Obtained by only changing the time interval of packet transmission. To guarantee the uniform-flow characteristic of the network, it is required by the Internet of the invention that terminal designing must have a uniform-flow ability. However, in the practical network environment, it cannot expect that all the users autonomously comply with the uniform-flow specification. Therefore, in an embodiment of the invention, the node server issues a passport to the network switches, which only allows a user packet to pass uniformly under a very fine time precision. To a user terminal that is designed according to the specified requirements, the passport is totally transparent.

Under the above premise, a satisfactory result is obtained in network practice. The switch of the invention can obtain a heavy load packet loss rate less than $1/1,000,000$ in the condition of a bandwidth utilization of 90%.

In conclusion, QoS is an unavoidable problem of the next generation network, and streaming media network is another species that is different from the traditional computer files. Therefore, it has no future to adapt the IP Internet to video services, and the only way out is to create a new network.

2) A novel network put forward in the invention will be introduced below.

The novel network has a network structure that is controlled centralizedly. It may be the types of tree network, star network and ring network, etc.; but on this basis, a centralized control node is needed on the network to control the whole network.

The novel network is divided into two parts: an access network and a metropolitan area network. Devices on the access network part may be mainly divided into 3 categories: a node server, an access switch and a terminal (including various set-top boxes, code plates and storages, etc.). Wherein, a node server is a node on the access network that has a centralized control function, and it can control the access switch and the terminal. The node server may be directly connected with the access switch, and it may be directly connected with the terminal. Similarly, devices on the metropolitan area network part may be divided into 3 categories: a metropolitan area server, a node switch and a node server. Wherein, the node server is just the node server on the access network part, that is, the node server not only belongs to the access network part, but also belongs to the metropolitan area network part. The metropolitan area server is a node on the metropolitan area network that has a centralized control function, and it may control the node switch and the node server. The metropolitan area server may be directly connected with the node switch, or it may be directly connected with the node server. Thus it can be seen that the whole novel network has a network structure that is controlled centralizedly by layers, while the networks controlled under the node server and the metropolitan area server may have various structures, for example, tree type, star type and ring type, etc.

1. The Classification of the Novel Network Device 1.1 Device in the novel network system of the invention may be mainly divided into 3 categories: a server, a switch (including an Ethernet gateway) and a terminal (including various set-top boxes, code plates and storages, etc.). Generally, the novel network may be divided into a metropolitan area network (or state network and global network, etc.) and an access network.

1.2 Devices on the access network part may be mainly divided into 3 categories: a node server, an access switch (including an Ethernet gateway) and a terminal (including various set-top boxes, code plates and storages, etc.).

The specific hardware structure of each access network device is as follows:

Node Server:

As shown in FIG. 1, a node server mainly includes a network interface module 101, a switching engine module 102, a CPU module 103 and a disk array module;

Wherein, packets corning from the network interface module 101, the CPU module 103 and the disk array module 104 all enter the switching engine module 102; the switching engine module 102 performs an operation of checking an address table 105 on each of the packets, so that the orientation information of the packet is obtained; the packet is stored in a corresponding queue of a packet buffer 106 according to the orientation information of the packet; if the queue of the packet buffer 106 is to be the packet is discarded; the switching engine module 102 polls all the packet buffer queues, and performs a forwarding operation if the following conditions are met: 1) the port sending buffer is not full; and 2) the count of the packet counter in the queue is greater than 0. The disk array module 104 mainly realizes the control on a hard disk, including operations of initialization, read and write, etc. on the hard disk; the CPU module 103 is mainly responsible for the protocol processing with the access switch and the terminal (not shown), the configuring of the address table 105 (including downlink protocol packet address table, uplink protocol packet address table and data packet address table), and the configuring of the disk array module 104.

Figure 2:
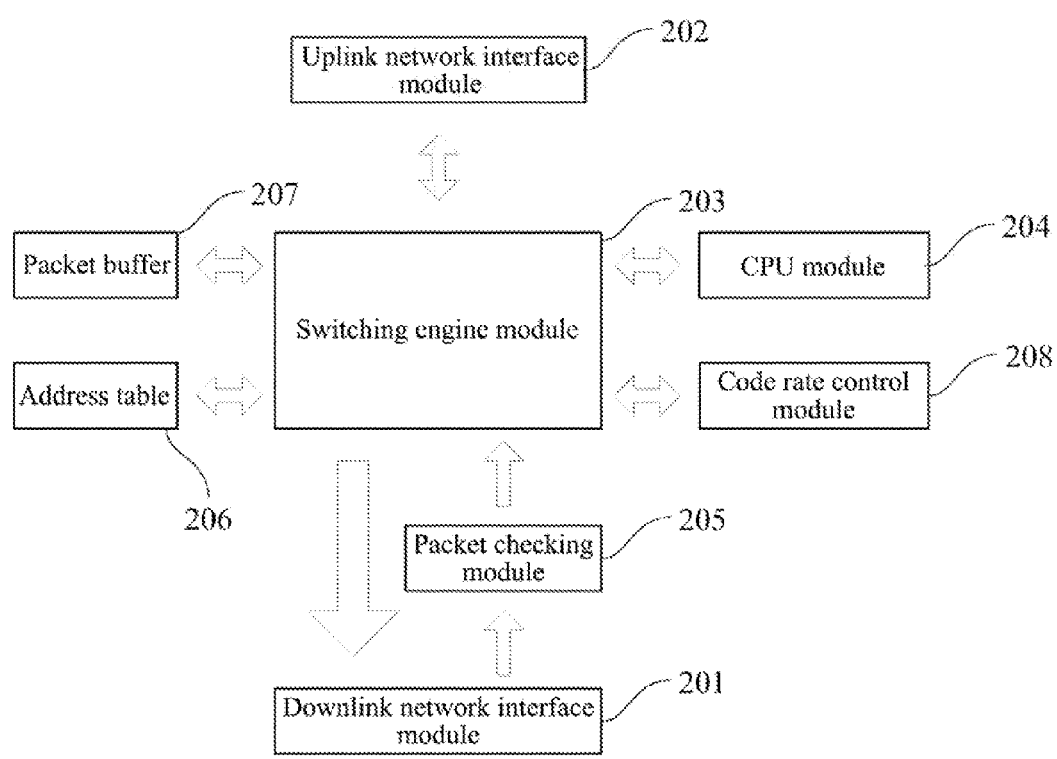
FIG. 2 shows the hardware structural representation of an access switch according to the invention.

Access Switch:

As shown in FIG. 2, the access switch mainly includes network interface modules (downlink network interface module 201 and uplink network interface module 202), a switching engine module 203 and a CPU module 204;

Wherein, a packet coming from the downlink network interface module 201 (uplink data) enters a packet checking module 205; the packet checking module 205 checks whether the destination address (DA), source address (SA), packet type and packet length of the packet meet a requirement, if yes, it allocates a corresponding stream identifier (stream-id), and puts the packet into the switching engine module 203; otherwise, the packet is discarded. A packet coming from the uplink network interface module 202 (downlink data) enters the switching engine module 203; a packet coming from the CPU module 204 enters the switching engine module 203; the switching engine module 203 performs an operate of checking an address table 206 on each of the entered packets, so that the orientation information of the packet is obtained; if the packet entering the switching engine module 203 goes from a downlink network interface to an uplink network interface, the packet is stored in a corresponding queue of a packet buffer 207 in conjunction with the stream identifier (stream-id); if the queue of the packet buffer 207 is to be full, the packet is discarded; if the packet entering the switching engine module 203 does not go from a downlink network interface to an uplink network interface, the packet is stored in a corresponding queue of the packet buffer 207 according to the orientation information of the packet; if the queue of the packet buffer 207 is to be full, the packet is discarded.

The switching engine module 203 polls all the packet buffer queues, and it is divided into two cases in an embodiment of the invention:

if a queue goes from a downlink network interface to an uplink network interface, it will be forwarded when the following conditions are met: 1) the port sending buffer is not full; 2) the count of the packet counter in the queue is greater than 0; and 3) a token generated by a code rate control module is obtained;

if a queue does not go from a downlink network interface to an uplink network interface, it will be forwarded when the following conditions are met: 1) the port sending buffer is not full; and 2) the count of the packet counter in the queue is greater than 0.

The code rate control module 208 is configured by the CPU module 204, and a token is generated for all packet buffer queues that go from a downlink network interface to an uplink network interface in a programmable interval, for controlling the code rate of uplink forwarding.

The CPU module 204 is mainly responsible tier the protocol processing with the node server, the configuring of the address table 206 and the configuring of the code rate control module 208.

Figure 3:
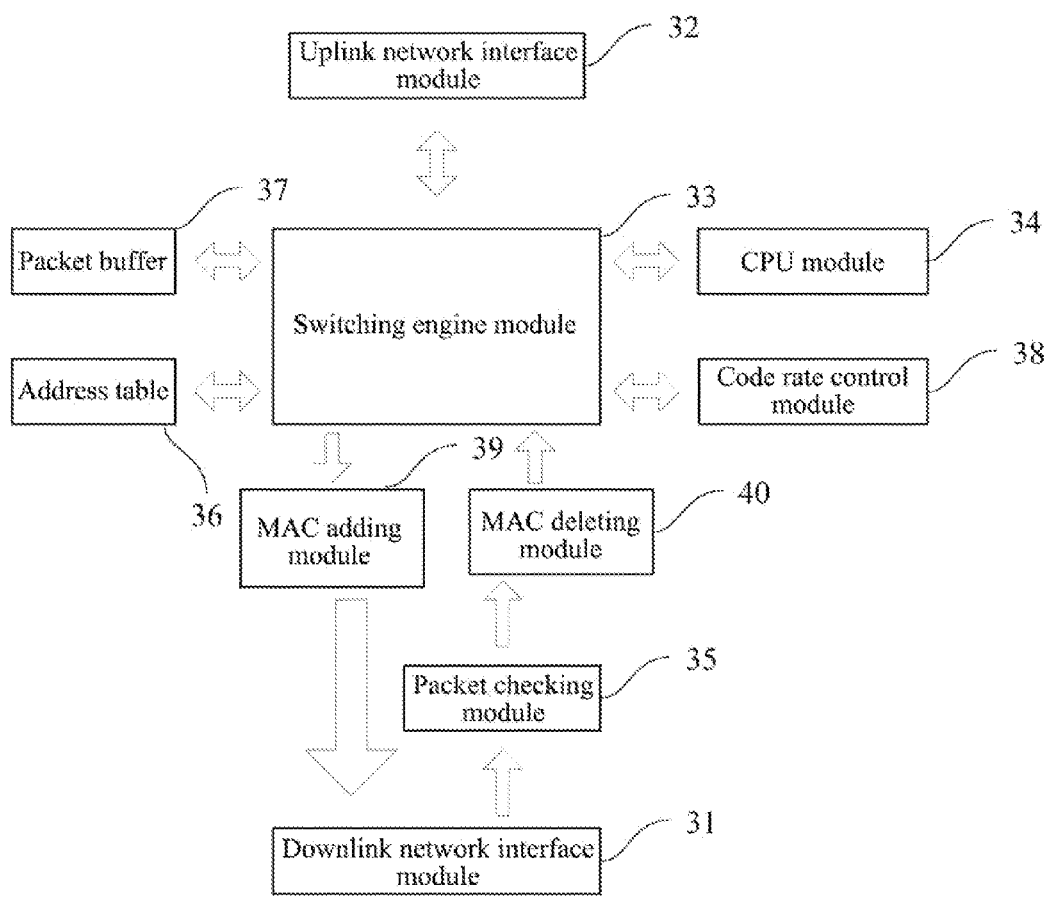
FIG. 3 shows the hardware structural representation of an Ethernet protocol conversion gateway according to the invention.

Ethernet Protocol Conversion Gateway:

As shown in FIG. 3, the Ethernet protocol conversion gateway mainly includes network interface modules (downlink network interface module 31 and uplink network interface module 32), a switching engine module 33, a CPU module 34, a packet checking module 35, a code rate control module 38, art address table 36, a packet buffer 37 and an MAC adding module 39 and an MAC deleting module 40.

Wherein, a data packet coming from the downlink network interface module 31 enters the packet checking module 35; the packet checking module 35 checks whether the Ethernet MAC DA, Ethernet MAC SA, Ethernet length or frame type, novel network destination address DA, novel network source address SA, novel network packet type and packet length of the data packet meet a requirement, if yes, a corresponding stream identifier (stream-id) will be allocated; then, the MAC deleting module 40 removes the MAC DA, the MAC SA and the length or frame type (2 byte), and puts the packet into a corresponding receive buffer; otherwise, the packet will be discarded;

The downlink network interface module 31 checks the sending buffer of the port, if there exists a packet, it acquires the Ethernet MAC DA of the corresponding terminal according to the novel network destination address DA of the packet, adds the Ethernet MAC DA of the terminal, the MAC SA of the Ethernet protocol conversion gateway and the Ethernet length or frame type, and sends the packet out.

The function of other modules in the Ethernet protocol conversion gateway is similar to that of the access switch.

Terminal:

The terminal mainly includes a network interface module, a service processing module and a CPU module; for example, a set-top box mainly includes a network interface module, a video and audio coding/decoding engine module and a CPU module; a code plate mainly includes a network interface module, a video and audio coding engine module and a CPU module; and a storage mainly includes a network interface module, a CPU module and a disk array module.

1.3 Devices on the metropolitan area network part may be mainly divided into 2 categories: a node server, a node switch and a metropolitan area server. Wherein, the node switch mainly includes a network interface module, a switching engine module and a CPU module; and the metropolitan area server mainly includes a network interface module, a switching engine module and a CPU module.

2. The Definition of Novel Network Data Packet 2.1 The Definition of Access Network Data Packet The access network data packet mainly includes the following parts: destination address (DA), source address (SA), reserved byte, payload (VDU) and CRC.

As shown by the table below, the access network data packet mainly includes the following parts:

| DA | SA | Reserved | Payload | CRC |
|----|----|----|----|----|

Wherein:

Destination address (DA) is consisted of 8 bytes, wherein the first byte represents packet type (for example, protocol packet, multicast data packet and unicast data packet, etc.), and there are 256 possibilities at most; the second byte to the sixth byte represent a metropolitan area network address; the seventh byte and the eighth byte represent an access network address;

Source address (SA) is also consisted of 8 bytes, the definition of which is the same as that of destination address (DA);

Reserved byte is consisted of 2 bytes;

The payload part has different lengths according to different types of data packets, if it is a protocol packet, the payload part has a length of 64 bytes; if it is a unicast or multicast data packet, the payload part has a length of 32+1024=1056 bytes; however, it is not limited to the above two cases;

CRC is consisted of 4 bytes, and the calculation method thereof conforms to standard Ethernet CRC algorithm.

2.2 The Definition of Metropolitan Area Network Data Packet

The topology of a metropolitan area network is a pattern type, and there are two or even more than two connections between two devices; that is, there may be more than two connections between a node switch and a node server, between a node switch and a node switch and between a node switch and a node server. However, the metropolitan area network address of a metropolitan area network device is unique. In order to accurately describe the connection relation between metropolitan area network devices, the following parameter is introduced in the embodiments of the invention: label, for uniquely describe a metropolitan area network device.

The definition of the label in this specification is similar to that of the label in Multi-Protocol Label Switch (MPLS). It is hypothesized that two connections exist between device A and device B, then a data packet will have two labels from device A to device B, and a data packet will have two labels from device B to device A, too. The label is divided into IN label and OUT label. It is hypothesized that the label of a data packet when it enters device A (IN label) is 0x0000, then the label of the data packet when it leaves device A (OUT label) may become 0x0001. The network access process on the metropolitan area network is a network access process that is controlled centralizedly, which means that the address allocation and label allocation of the metropolitan area network are both dominated by the metropolitan area server, and the node switch and the node server only execute passively. This is different from the label allocation in MPLS, wherein the label allocation in MPLS is a mutual negotiation result of the switch and the server.

As shown by the table below, a data packet on the metropolitan area network mainly includes the following parts:

| DA | SA | Reserved | Label | Payload | CRC |
|----|----|----|----|----|----|

That is, destination address (DA), source address (SA), reserved byte (Reserved), label, payload (PDU) and CRC. Wherein, for the format of label, reference may be made to the following definition: Label is consisted of 32 bits, wherein the high 16 bits are reserved, and only the low 16 bits are used; Label lies between reserved byte and payload of a data packet.

3. The Implementation of the Novel Network

The network access process of a node server and an access switch and the network access process of a node server and a terminal will be discussed below. In order to simplify the design, four types of data packets are defined on the access network, respectively:

downlink protocol packet (a protocol packet sent from a node server to an access switch or a terminal);

uplink protocol packet (a protocol packet replied by an access switch or a terminal to a node server);

unicast data packet; and multicast data packet;

An access network address is consisted of 16 bits in total, so the total number of access switches and terminals that can be accessed will be 65536. It is hypothesized that the packet type of the downlink protocol packet is "1000 0000" (binary system), i.e., 0x80 (hexadecimal system), the packet type of the uplink protocol packet is "0000 1000" (binary system), i.e., 0x08 (hexadecimal system), the packet type of the unicast data packet is "0001 0000" (binary system), i.e., 0x10 (hexadecimal system), the packet type of the multicast data packet is "0111 1000" (binary system), i.e., 0x78 (hexadecimal system), then by combining like terms, an address table with a length of 8 bits may be mapped to an address table with a length of 2 bits, for example:

"1000 0000"=>"00", the address table of a downlink protocol packet, which is defined in the embodiments of the invention as table 0;

"0000 1000"=>"01", the address table of an uplink protocol packet, which is defined as table 1 in the embodiments of the invention;

"0001 0000"=>"10", the address table of a unicast data packet, which is defined as table 2 in the embodiments of the invention;

"0111 1000"=>"11", the address table of a multicast data packet, which is defined as table 3 in the embodiments of the invention.

In conjunction with the 16-bit access network address, in practice, it only needs four address tables of 64K=4×65536, that is, 256K. The output of the address table represents the port to which a data packet is to be oriented. For example, access switch BX-008 has 1 uplink 100M network interface, 8 downlink 100M network interfaces and 1 CPU module interface. If the 8 downlink 100M network interfaces are in turn defined as port 0 to port 7, the CPU module interface is defined as port 8, and the uplink 100M network interface is defined as port 9, then an address table of totally 256K×10 bit will be needed, for example, the output "00 0000 0001" of the address table represents port 0 to which a data packet is to be oriented, "11 0000 0000" represents port 8 and port 9 to which a data packet is to be oriented, and so on.

It is hypothesized that a data packet coming from port 9 has a destination address (DA) of 0x8056 0x1500 0x0000 0x55aa, then its packet type is 0x80, and its access network address is 0x55aa; according to a table lookup rule, table 0 will be looked up for the address of "00 0101 0101 1010 1010", and the output of the address table corresponding to this address will be "01 0000 0000", which represents that the data packet is to be oriented to port 8.

Figure 4:
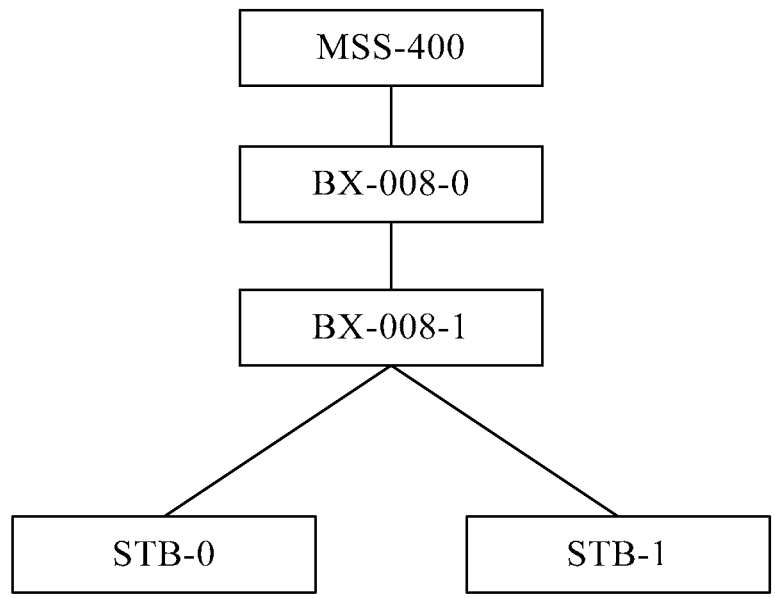
FIG. 4 is a schematic diagram showing the connection among a node server, an access switch and a terminal according to the invention.

3.1 Service Communication Process of an Access Network Device 3.1.1 An Example of a Unicast Communication Service Process Performed by an Access Network Device As shown in FIG. 4, it is hypothesized that there exists a node server MSS-400 (with an access network address of 0x0000), port 0 thereof is connected with an access switch BX-008-0 (with an access network address of 0x0001), port 1 of the access switch BX-008-0 is connected with an access switch BX-008-1 (with an access network address of 0x0002), and port 2 of the access switch BX-008-1 is connected with a set-top box STB-0 (with an access network address of 0x0009), port 3 of the access switch BX_008-1 is connected with a set-top box STB-1 (with an access network address of 0x0012). The set-top box STB_0 issues a request to the node server MSS-400 for performing visual communication with the set-top box STB_1, in the following steps:

S1) The set-top box STB_0 issues a service request protocol packet, the DA (destination address) of the packet is 0x0800 0x0000 0x0000 0x0000 (i.e., the address of MSS-400), and the SA (source address) is 0x0000 0x0000 0x0000 0x0009; the packet may further include reserved 0x0000 (reserved word), and the PDU part is as shown in the following table:

| 8e01 | | | |
|---|---|---|---|
| Field Number | Length | Code | Description |
| 0 | 1W | 8e01 | user request instruction (source terminal →node server) |
| 1 | 1W | | service type (service_type) |
| 2-4 | 3W | | user number (source terminal number) |
| 5 | 1W | | user extension number (source terminal extension number) |
| 6-31 | 26W | | service parameter (0 is added to an unoccupied part) |

The program number and the broadcast channel number related to the service request are both put in the service parameter, for example:

define SERVICE_TYPE_GTML_REQUEST 0x8000, requesting for a menu define SERVICE_TYPE_VOD_REQUEST 0x8001, requesting for a VOD program define SERVICE_TYPE_CHANGE_MENU 0x8002, requesting for changing a background menu define SERVICE_TYPE_BROADCAST_REQUEST 0x8003, requesting for watching broadcast define SERVICE_TYPE_CHANGE_CHANNEL 0x8004, requesting for changing channel define SERVICE_TYPE_TELEPHONE_DIRECT 0x8005, requesting for sending a videophone define SERVICE_TYPE_PERMISSION 0x8006, an reply of whether access is permitted define SERVICE_TYPE_RECORD_REQUEST 0x8007, requesting for recording define SERVICE_TYPE_END_REQUEST 0x8008, requesting for ending the current service define SERVICE_TYPE_ORG_CAST_REQUEST 0x8009, requesting for originating a living broadcast define SERVICE_TYPE_DDB_REQUEST 0x800b, requesting for watching delayed TV define SERVICE_TYPE_SKIP 0x800c, fast forward, fast rewind, pause and continue during the process of watching a VOD or delayed TV define SERVICE_TYPE_RECORD_END 0x800e, requesting for ending recording define SERVICE_TYPE_VIEW_Monitor_DIRECT 0x8024, requesting for watching monitor define SERVICE_TYPE_RCV_CAST_DIRECT 0x8025, requesting for watching living broadcast define SERVICE_TYPE_TELEPHONE_REQUEST 0, requesting for sending a videophone define SERVICE_TYPE_RCV_CAST_REQUEST 0xa, requesting for watching living broadcast define SERVICE_TYPE_VIEW_Monitor 0xc, requesting for watching monitor

In this example, the service parameter is SERVICE_TYPE_TELEPHONE_REQUEST or SERVICE_TYPE_TELEPHONE_DIRECT.

S2) The node server MSS-400 determines that a request for visual communication (service type) is received according to the content of the packet, knows that the called terminal (target terminal) is STB_1 by looking up in a CAM table (content-address mapping table) according to the service number, knows the link topology related to the current service according to its internal address information table, and determines that the link is permitted and communication may be established between the two parts. Then, a menu protocol packet is sent respectively to the calling party (STB_0) and the called party (STB_1), and it waits the called party to reply:

Wherein, the menu protocol packet sent to STB_0: DA is 0x8000 0x0000 0x0000 0x0009, SA is 0x0000 0x0000 0x0000 0x0000, reserved is 0x0000, and PDU part is as shown in the following table:

| Field Number | Length | Code | Description |
|---|---|---|---|
| 0 | 1W | 3900 | data download instruction |
| 1 | 1W | | data type (0 = null, 1 = gtml 2 = gtml fodder 3 = set-top box program 4 = start menu 5 = bmp 100 = dsp program on gateway 101 = dsp program of 008) |
| 2 | 1W | | reserved |
| 3 | 1W | | number of valid packets |
| 4 | 1W | | sequence number of the current packet |
| 5 | 1W | | length of valid data in the current packet |
| 6-14 | 9W | | reserved |
| 15-526 | 512W | | data |
| 527 | 1W | | CRC (summarization of 512 data) |

The menu protocol packet sent to STB_1: DA is 0x8000 0x0000 0x0000 0x0012, SA is 0x0000 0x0000 0x0000 0x0000, reserved is 0x0000, and PDU part is as shown in the above table.

S3) According to the configuration of table 0 on node server MSS-400 and the configuration of table 0 on access switches BX-008-0 and BX-008-1, these 2 menu protocol packets will be respectively oriented to set-top boxes STB_0 and STB_1. The called STB_1 issues a request SERVICE_TYPE_PERMISSION for accepting the communication with STB_1 and sends a reply protocol packet to node server MSS-400, wherein for the packet, DA is 0x0800 0x0000 0x0000 0x0000, SA is 0x0000 0x0000 0x0000 0x0012, reserved is 0x0000, service parameter is SERVICE_TYPE_PERMISSION, and PDU part is as shown in the following table:

| 8e01 ||||
|---|---|---|---|
| Field Number | Length | Code | Description |
| 0 | 1W | 8e01 | user request instruction (target terminal →node server) |
| 1 | 1W | | service type (service_type) |
| 2-4 | 3W | | user number (source terminal number) |
| 5 | 1W | | user extension number (source terminal extension number) |
| 6-31 | 26W | | service parameter (SERVICE_TYPE_PERMISSION) |

S4) According to the configuration of table 1 on the access switch BX-008-1, the reply protocol packet is oriented to node server MSS-400, and node server MSS-400 determines that a request for accepting visual communication is received according to the content of the packet, knows that the called party is STB_1 by looking up in a CAM table according to the service number, and node server MSS-400 knows the link topology related to the current service according to its internal address information table, and determines that the link is permitted and communication may be established between the two parts.

In such a case, node server MSS-400 sends a port configuration protocol packet to all access switches on the uplink (the calling path) and the downlink (the called path), for requesting to open the uplink of the address of the opposite party and the downlink of the address of its own at the same time, where the current uplink and downlink relate merely to the access switch BX-008-1 with which both set-top boxes STB_0 and STB_1 are connected.

Two port configuration protocol packets sent to the access switch BX-008-1:

1) the first port configuration protocol packet: DA is 0x8000 0x0000 0x0000 0x0002, SA is 0x0000 0x0000 0x0000 0x0000, reserved is 0x0000, and PDU part is as shown in the following table:

| 8b54 ||||
|---|---|---|---|
| Field Number | Length | Code | Description |
| 0 | 1W | 8b54 | access switch open and close command (node server →access switch) |
| 1 | 1W | | device type (BX-008) |
| 2-5 | 4W | | 0x1000 0x0000 0x0000 0x0009 |
| 6 | 1W | | "00 0000 0100", which represents that downlink port 2 is opened |
| 7-10 | 4W | | 0000 |
| 11 | 1W | | data type 0x10 |
| 12 | 1W | | access switch address (access network address) 0x0002 |
| 13-15 | 3W | | access switch device flag |
| 16-31 | 18W | | 0000 |

2) the second port configuration protocol packet: DA is 0x8000 0x0000 0x0000 0x0002, SA is 0x0000 0x0000 0x0000 0x0000, reserved is 0x0000, and PDU part is as shown in the following table:

| 8b54 ||||
|---|---|---|---|
| Field Number | Length | Code | Description |
| 0 | 1W | 8b54 | access switch open and close command (node server → access switch) |
| 1 | 1W | | device type (BX-008) |
| 2-5 | 4W | | 0x1000 0x0000 0x0000 0x0012 |
| 6 | 1W | | "00 0000 1000", which represents that downlink port 3 is opened |
| 7-10 | 4W | | 0000 |
| 11 | 1W | | data type 0x10 |
| 12 | 1W | | access switch address (access network address) 0x0002 |
| 13-15 | 3W | | access switch device flag |
| 16-31 | 18W | | 0000 |

Packet sent to set-top box STB-0 (service processing command, i.e., coding/decoding command in this example):

wherein, DA is 0x8000 0x0000 0x0000 0x0009, SA is 0x0000 0x0000 0x0000 0x000, reserved is 0x0000, and PDU part is as shown in the following table:

| 8704 ||||
|---|---|---|---|
| Field Number | Length | Code | Description |
| 0 | 1W | 8704 | coding/decoding command (node server →source terminal) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x1000 0x0000 0x0000 0x0012 |

-continued

8704

| Field Number | Length | Code | Description |
|---|---|---|---|
| 19-22 | 4W | | 0x1000 0x0000 0x0000 0x0009 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

Packet sent to STB-1 (service processing command, i.e., coding/decoding command in this example):
wherein, DA is 0x8000 0x0000 0x0000 0x0012, SA is 0x0000 0x0000 0x0000 0x000, reserved is 0x0000, and PDU part is as shown in the following table:

8704

| Field Number | Length | Code | Description |
|---|---|---|---|
| 0 | 1W | 8704 | coding/decoding command (node server →target terminal) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x1000 0x0000 0x0000 0x0009 |
| 19-22 | 4W | | 0x1000 0x0000 0x0000 0x0012 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

In the PDU of the above coding/decoding command, field number 13 represents coding type: 0=stopping coding, 0ffff=maintaining the original state, 0xfffe=returning data decoded, without coding locally; Field Number 14 represents decoding type: 0=stopping decoding, 0ffff=maintaining the original state; Field Number 15-18 represents coding address (DA or multicast address): 0xffff=maintaining the original state; Field Number 19-22 represents decoding address (DA or multicast address): 0xffff-maintaining the original state; Field Number 23 represents: HB: coded HDA, LB: decoded HAD; 0xffff=maintaining the original state; Field Number 24 represents alarm parameter: 0=alarm shut down, 1=alarm enabled, 0xffff=maintaining the original state; Field Number 25 represents holder operating parameter: 0xffff=maintaining the original state; Field Number 26 represents auxiliary channel operating parameter: 0xffff=maintaining the original state.

Wherein, the coding type is as shown in the following table:

| Code | Video Compression | Video System | Audio Compression | Flow Level |
|---|---|---|---|---|
| 0x3215 | MPEG4 | PAL | MP3 | 1.7M |
| 0x3217 | MPEG4 | PAL | MP3 | 3.3M |
| 0x3218 | MPEG4 | PAL | MP3 | 6.6M |

S5) According to the configuration of table 0 on node server MSS-400 and the configuration of table 0 on access switches BX-008-0 and BX-008-1, the above 2 packets sent to the access switch BX-008-1 will be oriented to BX-008-1.

In such a case, access switch BX-008-1 configures its own table 2 as follows:

"10 0000 0000 0001 0010"=>"00 0000 1000", i.e., a unicast data packet with a destination address (DA) of 0x1000 0x0000 0x0000 0x0012 is oriented to port 3;

"10 0000 0000 0000 1001"=>"00 0000 0100", i.e., a unicast data packet with a destination address (DA) of 0x1000 0x0000 0x0000 0x0009 is oriented to port 2;

S6) According to the configuration of table 0 on node server MSS-400 and the configuration of table 0 on access switches BX-008-0 and BX-008-1, the latter 2 packets sent to the set-top boxes will be respectively oriented to set-top boxes STB-0 and STB-1. Set-top boxes STB-0 and STB-1 start coding/decoding according to the content of the packets, and receive and send unicast data.

S7) Set-top box STB-0 sends a unicast data packet to set-top box STB-1, wherein DA of the packet is 0x1000 0x00 0x0000 0x0012, and SA is 0x0000 0x0000 0x0000 0x0009;

S8) The unicast data packet enters access switch BX-008-1. A switching engine module of BX-008-1 looks up in table 2 according to a combined address field, wherein the table address is "10 0000 0000 0001 0010", the output of the item is "00 0000 1000" ("10 0000 0000 0001 0010"=>"00 0000 1000", i.e., a unicast data packet with a destination address (DA) of 0x1000 0x0000 0x0000 0x0012 is oriented to port 3), which represents that downlink port 3 is opened, and the current unicast data packet enters the set-top box STB-1 via the port 3;

S9) Set-top box STB-1 sends a unicast data packet to set-top box STB-0, wherein DA of the packet is 0x1000 0x0000 0x0000 0x0009, and SA is 0x0000 0x0000 0x0000 0x0012;

S10) The unicast data packet enters access switch BX-008-1. A switching engine module of BX-008-1 looks up in table 2 according to a combined address field, wherein the table address is "10 0000 0000 0000 1001", the output of the item is "00 0000 0100" ("10 0000 0000 0000 1001"=>"00 0000 0100", i.e., a unicast data packet with a destination address (DA) of 0x1000 0x0000 0x0000 0x0009 is oriented to port 2), which represents that downlink port 2 is opened, and the current unicast data packet enters the set-top box STB-0 via the port 2;

3.1.2 An Example of a Multicast Service Communication Process Performed by an Access Network Device Again referring to FIG. 4, it is hypothesized that there exists a node server MSS-400 (with an access network address of 0x0000), port 0 thereof is connected with an access switch BX-008-0 (with an access network address of 0x0001), port 1 of the access switch BX-008-0 is connected with an access switch BX-008-11 (with an access network address of 0x0002), and port 2 of the access switch BX-008-1 is connected with a set-top box STB-0 (with an access network address of 0x0009), the number of STB_0 is 0x6666 0x6666 0x6666, port 3 of the access switchBX_008-1 is connected with a set-top box STB-1 (with an access network address of 0x0012), and the number of STB_1 is 0x8888 0x8888 0x8888.

Set-top box STB_0 requests to node server MSS-400 for initiating living broadcast in the following steps:

S1) Set-top box STB_0 issues a service request protocol packet for initiating living broadcast, wherein DA of the packet is 0x0800 0x0000 0x0000 0x0000, SA is 0x0000 0x0000 0x0000 0x0009, reserved is 0x0000 (reserved word), and the PDU part is as shown in the following table:

| 8e01 | | | |
|---|---|---|---|
| Field Number | Length | Code | Description |
| 0 | 1W | 8e01 | terminal request instruction (terminal →node server) |
| 1 | 1W | | service type (service_type) |
| 2-4 | 3W | | terminal number (number of requestor) 0000 |
| 5 | 1W | | terminal extension number (extension number of requestor) 0000 |
| 6-31 | 26W | | #define SERVICE_TYPE_ORG_CAST_REQUEST 0x8009, requesting for originating a living broadcast |

S2) According to the configuration of table 1 on access switches BX-008-0 and BX-008-1connected between set-top box STB_0 and node server MSS-400, the service request protocol packet is oriented to node server MSS-400, node server MSS-400 determines that a request for initiating living broadcast (service type) is received according to the content of the packet, knows that the user (source terminal) is STB_0 by looking up in a CAM table (content-address mapping table) according to the service number, knows the link topology related to the current service according to its internal address information table, and it determines that the link is permitted and living broadcast may be initiated, then it allocates a multicast address of 0x0008. Moreover, the node server sends a port configuration protocol packet to all access switches on the current communication link, for requesting to open the uplink of the address of the opposite party and the downlink of the address of its own at the same time. At this point, it knows from link topology determination that only access switch BX-008-1 needs to be configured at present.

In such a case, node server MSS-400 sends a port configuration protocol packet to access switch BX-008-1;

wherein, DA of the packet is 0x8000 0x0000 0x0000 0x0002, SA is 0x0000 0x0000 0x0000 0x0000, reserved is 0x0000 (reserved word), and the PDU part is as shown in the following table:

| 8b54 | | | |
|---|---|---|---|
| Field Number | Length | Code | Description |
| 0 | 1W | 8b54 | access switch open and close command (node server –>access switch) |
| 1 | 1W | | device type (BX-008) |
| 2-5 | 4W | | 0x7800 0x0000 0x0000 0x0008 |
| 6 | 1W | | "00 0000 0001", which represents that downlink port 2 is opened |
| 7-10 | 4W | | 0000 |
| 11 | 1W | | data type 0x78 |
| 12 | 1W | | access switch address (access network address) 0x0002 |
| 13-15 | 3W | | access switch device flag |
| 16-31 | 18W | | 0000 |

Node server MSS-400 sends a packet to set-top box STB-0 (service processing command, i.e., coding/decoding command in this example):

wherein, DA of the packet is 0x8000 0x0000 0x0000 0x0009, SA is 0x0000 0x0000 0x0000 0x0000, reserved is 0x0000, and PDU part is as shown in the following table:

| 8704 | | | |
|---|---|---|---|
| Field Number | Length | Code | Description |
| 0 | 1W | 8704 | coding/decoding command (node server →set-top box) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x7800 0x0000 0x0000 0x0008 |
| 19-22 | 4W | | 0x7800 0x0000 0x0000 0x0008 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

S3) According to the configuration of table 0 on node server MSS-400 and the configuration of table 0 on access switch BX-008-0, the above port configuration protocol packet sent to the access switch BX-0081 will be oriented to BX-0008-1.

In such a case, BX-008-1 configures its own table 3 as follows:
"11 0000 0000 0000 1000"==>"00 0000 0100", i.e., a multicast data packet with a destination address (DA) of 0x7800 0x0000 0x0000 0x0008 is oriented to port 2;

S4) According to the configuration of table 0 on node server MSS-400 and the configuration of table 0 on access switches BX-008-0 and BX-008-1, the above packet sent to set-top box STB-0 will be oriented to STB-0. STB-0 starts coding/decoding according to the content of the packet, and starts receiving and sending multicast data.

S5) Set-top box STB-0 issues a multicast data packet, wherein DA of the packet is 0x7800 0x0000 0x0000 0x0008 (multicast address), and SA is 0x0000 0x0000 0x0000 0x0009;

S6) The multicast data packet enters access switch BX-008-1. A switching engine module of access switch BX-008-1 looks up in table 3 according to a combined address field, wherein the table address is "11 0000 0000 0000 1000", the output of the item is "00 0000 0100" ("11 0000 0000 0000 1000"=>"00 0000 0100", i.e., a multicast data packet with a destination address (DA) of 0x7800 0x0000 0x0000 0x0008 is oriented to port 2), which represents that downlink port 2 is opened, and the current multicast data packet enters set-top box STB-0 via port 2.

Set-top box STB_1 requests to node server MSS-400 for watching living broadcast in the following steps, with a number of 0x6666 0x6666 0x6666:

S1) Set-top box STB_1 issues a service request protocol packet for watching living broadcast, wherein DA of the packet is 0x0800 0x0000 0x0000 0x0000, SA is 0x0000 0x0000 0x0000 0x0012, reserved is 0x0000, and PDU part is as shown in the following table:

| 8e01 | | | |
|---|---|---|---|
| Field Number | Length | Code | Description |
| 0 | 1W | 8e01 | user request instruction (terminal →node server) |

8e01

| Field Number | Length | Code | Description |
|---|---|---|---|
| 1 | 1W | | service type (service_type) |
| 2-4 | 3W | | terminal number (number of requestor) 0x6666 0x6666 0x6666 |
| 5 | 1W | | terminal extension number (extension number of requestor) 0000 |
| 6-31 | 26W | | #define SERVICE_TYPE_RCV_CAST_DIRECT 0x8025, requesting for watching living broadcast |

S2) According to the configuration of table 1 on access switches BX-008-0 and BX-008-1 connected between set-top box STB_1 and node server MSS-400, the service request protocol packet is oriented to node server MSS-400, node server MSS-400 determines that a request for watching living broadcast is received according to the content of the packet, knows that the initiator (source terminal) is STB_0 by looking up in a CAM table according to the service number, knows the link topology related to the current service according to its internal address information table, and it determines that the link is permitted and living broadcast may be watched, thus it allocates a multicast address (corresponding to the multicast address allocated to the source terminal) of 0x0008. Moreover, the node server sends a port configuration protocol packet to all access switches on the current communication link, for requesting to open the uplink of the address of the opposite party and the downlink of the address of its own at the same time.

In such a case, node server MSS-400 sends a port configuration protocol packet to access switch BX-008-1: wherein, DA is 0x8000 0x0000 0x0000 0x0002, SA is 0x0000 0x0000 0x0000 0x0000, reserved is 0x0000, and PDU part is as shown in the following table:

8b54

| Field Number | Length | Code | Description |
|---|---|---|---|
| 0 | 1W | 8b54 | access switch open and close command (node server →access switch) |
| 1 | 1W | | device type (BX-008) |
| 2-5 | 4W | | 0x7800 0x0000 0x0000 0x0008 |
| 6 | 1W | | "00 0000 1100", which represents that ports 2 and 3 are opened |
| 7-10 | 4W | | 0000 |
| 11 | 1W | | data type 0x78 |
| 12 | 1W | | access switch address (access network address) 0x0002 |
| 13-15 | 3W | | access switch device flag |
| 16-31 | 18W | | 0000 |

Also, node server MSS-400 sends a packet to set-top box STB-1 (service processing command, i.e., coding/decoding command in this example):

wherein, DA of the packet is 0x8000 0x0000 0x0000 0x0012, SA is 0x0000 0x0000 0x0000 0x0000, reserved is 0x0000, and PDU part is as shown in the following table:

8704

| Field Number | Length | Code | Description |
|---|---|---|---|
| 0 | 1W | 8704 | coding/decoding command (node server →terminal) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0 |
| 14 | 1W | | 0x3217 |
| 15-18 | 4W | | 0xffff |
| 19-22 | 4W | | 0x7800 0x0000 0x0000 0x0008 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

S3) According to the configuration of table 0 on node server MSS-400, the packet sent to access switch BX-008-1 will be oriented to access switch BX-008-1.

In such a case, access switch BX-008-1 configures its own table 3 as follows:

"11 0000 0000 0000 1000"=>"00 0000 1100", i.e., a multicast data packet with a destination address (DA) of 0x7800 0x0000 0x0000 0x0008 is oriented to ports 2 and 3;

S4) According to the configuration of table 0 on node server MSS-400 and the configuration of table 0 on access switches BX-008-0 and BX-008-1, the packet sent to set-top box STB-1 will be oriented to STB-1. STB-1 receives multicast data and decodes the data according to the content of the packet.

S5) Set-top box STB-0 issues a multicast data packet, wherein DA of the packet is 0x7800 0x0000 0x0000 0x0008 (multicast address), and SA is 0x0000 0x0000 0x0000 0x0009;

S6) The multicast data packet enters access switch BX-008-1. A switching engine module of access switch BX-008-1 looks up in table 3 according to a combined address field, wherein the table address is "11 0000 0000 0000 1000", the output of the item is "00 0000 1100" ("11 0000 0000 0000 1000"=>"00 0000 1100", i.e., a multicast data packet with a destination address (DA) of 0x7800 0x0000 0x0000 0x0008 is oriented to port 2 and port 3), which represents that downlink ports 2 and 3 are opened, and the current multicast data packet enters set-top boxes STB-0 and STB-1 via ports 2 and 3;

In embodiments of the invention, table 0 and table 1 are both configured during a network access process. For one skilled in the art to better understand the invention, an example of an access network device configuring table 0 and table 1 during a network access process will be provided below.

3.1.3 An Example of the Interaction Among a Node Server, an Access Switch, and a Terminal During a Network Access Process:

The access network address may be set as 16 bits, and every access network address has a unique access network address (including set-top box, access switch, storage and even the node server itself). For convenient management of the access network addresses of all access network devices, an address information table may be maintained in the CPU module of the node server, the size of which is the sixteenth power of two, i.e., 64K, and each item of the table is consisted as follows:

1) address occupation descriptor: "00" represents that the address is not used, "01" represents that the address is standby (the node server uses the address to issue a port downlink protocol packet, but no network access uplink protocol packet is received), and "10" represents that the address is used (which is set after the node server receives a network access uplink protocol packet);

2) device descriptor: for example, "000000" represents node server, "000001" represents access switch BX-008, "000010" represents a storage, and "000011" represents a terminal;

3) device resource description information: for example, the access network address of another device connected with the device's network port and the uplink and downlink flow count of each of the device's network ports, if the device is an access switch; the access network address of another device connected with the device's network port, the count of the device's read and write channels and uplink and downlink flow count of the device's network port, if the device is a storage; and so on. All the information is used to provide a decision-making foundation to the service process, and the information will be modified during each service process.

Figure 5:
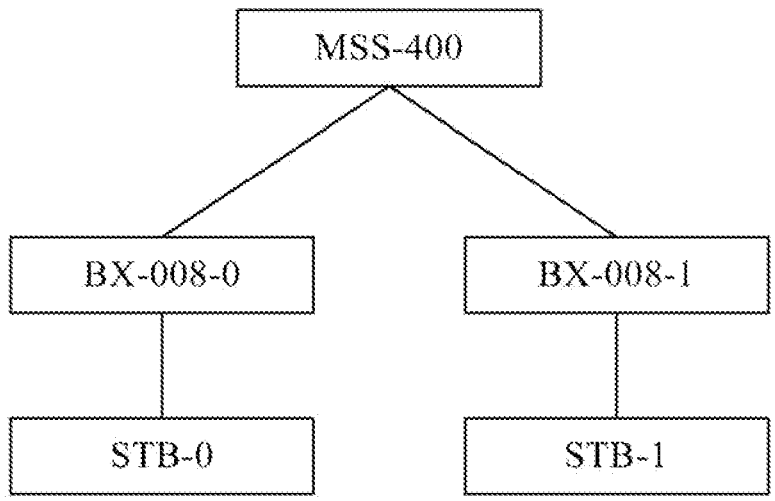
FIG. 5 is another schematic diagram showing the connection among anode server, an access switch and a terminal according to the invention.

As shown in FIG. 5, it is hypothesized that there exists a node server MSS-400, port 0 thereof is connected with an access switch BX-008-0, port 1 thereof is connected with an access switch BX-008-1, and port 0 of BX-008-0 is connected with a set-top box STB-0, port 1 of 13×008-1 is connected with a set-top box STB-1.

S1) After server MSS-400 is powered on, it initializes the hardware, obtains the default metropolitan area network address (which is hypothesized as 0x00 0x0000 0x0000), and imports a configuration file from the hard disk to the CPU memory (for example, the registration information of a switch and the registration information of a terminal, etc.), server MSS-400 initializes the address information table and clears all items (which represents that no address is used), and server MSS-400 configures its own access network address as 0x0000, that is, item 0x0000 of the address information table is configured as follows:

address occupation descriptor: "10" represents that the address is used device descriptor: "000000" represents node server;

device resource description information: the node server has 8 downlink 100M network interfaces in turn defined as port 0 to port 7, 1 CPU module interface defined as port 8, 1 disk array interface defined as port 9 and 1 uplink 1000M fiber interface defined as port 10, and the type of this node server is MSS-400, the access network address of a device connected with the node server's network port is not allocated, and uplink and downlink flow count of each of the node server's network ports is 0;

the next available address of the address information table is 0x0001;

S2) Server MSS-400 initializes tables 0, 1, 2 and 3:
configuring table 0 as "000 0000 0000", i.e., the transmission of all downlink protocol packets is closed;
configuring table 1 as "001 0000 0000", i.e., all uplink protocol packets are oriented to the CPU;
configuring tables 2 and 3 as "000 0000 0000", i.e., all unicast and multicast data packet transmission is closed;

S3) Server MSS-400 knows that it has 8 downlink ports and the next available address is 0x0001, so it configures the 8 items of table 0 respectively as:

"00 0000 0000 0000 0001"=>"000 0000 0001", i.e., a query packet with a destination address (DA) of 0x8000 0x0000 0x0000 0x0001 is oriented to port 0;

"00 0000 0000 0000 0010"=>"000 0000 0010", i.e., a query packet with a destination address (DA) of 0x8000 0x0000 0x0000 0x0002 is oriented to port 1;

"00 0000 0000 0000 0011"=>"000 0000 0100", i.e., a query packet with a destination address (DA) of 0x8000 0x0000 0x0000 0x0003 is oriented to port 2;

"00 0000 0000 0000 0100"=>"000 0000 1000", i.e., a query packet with a destination address (DA) of 0x8000 0x0000 0x0000 0x0004 is oriented to port 3;

"00 0000 0000 0000 0101"=>"000 0001 0000", i.e., a query packet with a destination address (DA) of 0x8000 0x0000 0x0000 0x0005 is oriented to port 4;

"00 0000 0000 0000 0110"=>"000 0010 0000", i.e., a query packet with a destination address (DA) of 0x8000 0x0000 0x0000 0x0006 is oriented to port 5;

"00 0000 0000 0000 0111"=>"000 0100 0000", i.e., a query packet with a destination address (DA) of 0x8000 0x0000 0x0000 0x0007 is oriented to port 6;

"00 0000 0000 0000 1000"=>"000 1000 0000", i.e., a query packet with a destination address (DA) of 0x8000 0x0000 0x0000 0x0008 is oriented to port 7;

S4) Server MSS-400 sends query packets with destination addresses (DA) of 0x8000 0x0000 0x0000 0x0001, 0x8000 0x0000 0x0000 0x0002, 0x8000 0x0000 0x0000 0x0003, 0x8000 0x0000 0x0000 0x0004, 0x8000 0x0000 0x0000 0x0005, 0x8000 0x0000 0x0000 0x0006, 0x8000 0x0000 0x0000 0x0007, 0x8000 0x0000 0x0000 0x0008 (with an SA of 0x0000 0x0000 0x0000 0x0000), and according to the configuration of its table 0, the query packets will be in turn oriented to ports 0 to 7; at this point, items 0x0001 to 0x0008 of the address information table are configured as:

address occupation descriptor: "01" represents that the address is standby;
device descriptor: it is not modified;
device resource description information: it is not modified;
The next available address of the address information table is 0x0009;

S5) After switches BX-008-0 and BX-008-1 are powered on, they initializes the hardware:
configuring its table 0 "00 xxxx xxxx xxxx xxxx" as "01 0000 0000", i.e., all downlink protocol packets are oriented to the CPU;
configuring its table 1 "01 xxxx xxxx xxxx xxxx" as "10 0000 0000", i.e., all uplink protocol packets are oriented to the uplink 100M network interface;
configuring its tables 2 and 3 as "00 0000 0000", i.e., all unicast and multicast data packet transmission is closed;

S6) While receiving a query packet, switch BX-008-0 receives the query packet to its CPU module according to the configuration of its table 0, the CPU module resolves the query packet, generates a reply packet (which contains the registration information of the current access switch) and sends the reply packet to server MSS-100, wherein DA of the reply packet is 0x0800 0x0000 0x0000 0x0000, and SA is 0x0000 0x0000 0x0000 0x0001;

S7) After server MSS-400 receives the reply packet issued by switch BX-008-0 and contrasts the source address (SA) of the reply packet and the device type, it will know that its port 0 is connected with an access switch, then the information of the access switch is found in an internal registration information table of the node server, and a network access command is sent to the access switch (informing that the access network address thereof is 0x0001);

S8) After switch BX-008-0 receives the network access command and knows that its own access network address is 0x0001, it accesses the network, then its table 0 "00 0000 0000 0000 0001" is configured as "01 0000 0000", and the remaining items of table 0 are configured as "00 0000 0000", that is, only the downlink protocol packet of the current switch is imported to the CPU; and also, a network access command reply is sent to the server;

S9) After server MSS-400 receives the network access command reply issued by switch BX-008-0, it will know that switch BX-008-0 has accessed the network, then item 0x0001 of the internal address information table of the server is configured as:
  address occupation descriptor: "10" represents that the address is used;
  device descriptor: "000001" represents an access switch BX-008;
  device resource description information: the access switch has 8 downlink 100M network interfaces defined in turn as port 0 to port 7, 1 CPU module interface defined as port 8 and 1 uplink 100M network interface defined as port 9, the type of the access switch is BX-008, the access network address of the device connected with the access switch's uplink network port is 0x0000 (i.e., MSS-400), the access network address of the device connected with the downlink network port is not allocated, and uplink and downlink flow count of each of the access switch's network ports is 0;
  then, a device state query instruction is sent to the port each second to check whether switch BX-008-0 works normally; and also, a port downlink protocol packet is sent to the downlink port of switch BX-008-0 to check whether other access network devices are connected under the current access switch. In such a case, the following configurations will be done by server MSS-400 in its table 0:
    "00 0000 0000 0000 1001"=>"000 0000 0001", i.e., a port downlink protocol packet with a destination address (DA) of 0x8000 0x0000 0x0000 0x0009 is oriented to port 0;
    "00 0000 0000 0000 1010"=>"000 0000 0001", i.e., a port downlink protocol packet with a destination address (DA) of 0x8000 0x0000 0x0000 0x000a is oriented to port 0;
    "00 0000 0000 0000 1011"=>"000 0000 0001", i.e., a port downlink protocol packet with a destination address (DA) of 0x8000 0x0000 0x0000 0x000b is oriented to port 0;
    "00 0000 0000 0000 1100"=>"000 0000 0001", i.e., a port downlink protocol packet with a destination address (DA) of 0x8000 0x0000 0x0000 0x000c is oriented to port 0;
    "00 0000 0000 0000 1101"=>"000 0000 0001", i.e., a port downlink protocol packet with a destination address (DA) of 0x8000 0x0000 0x0000 0x000d is oriented to port 0;
    "00 0000 0000 0000 1110"=>"000 0000 0001", i.e., a port downlink protocol packet with a destination address (DA) of 0x8000 0x0000 0x0000 0x000e is oriented to port 0;
    "00 0000 0000 0000 1111"=>"000 0000 0001", i.e., a port downlink protocol packet with a destination address (DA) of 0x8000 0x0000 0x0000 0x000f is oriented to port 0;
    "00 0000 0000 0001 0000"=>"000 0000 0001", i.e., a port downlink protocol packet with a destination address (DA) of 0x8000 0x0000 0x0000 0x0010 is oriented to port 0;

Server MSS-400 will notify switch BX-008-0 to perform the following configurations in the switch's table 0 via a port allocation packet containing port allocation information:
    "00 0000 0000 0000 1001"=>"00 0000 0001", i.e., a port downlink protocol packet with a destination address (DA) of 0x8000 0x0000 0x0000 0x0009 is oriented to port 0;
    "00 0000 0000 0000 1010"=>"00 0000 0010", i.e., a port downlink protocol packet with a destination address (DA) of 0x8000 0x0000 0x0000 0x000a is oriented to port 1;
    "00 0000 0000 0000 1011"=>"00 0000 0100", i.e., a port downlink protocol packet with a destination address (DA) of 0x8000 0x0000 0x0000 0x000b is oriented to port 2;
    "00 0000 0000 0000 1100"=>"00 0000 1000", i.e., a port downlink protocol packet with a destination address (DA) of 0x8000 0x0000 0x0000 0x000c is oriented to port 3;
    "00 0000 0000 0000 1101"=>"00 0001 0000", i.e., a port downlink protocol packet with a destination address (DA) of 0x8000 0x0000 0x0000 0x000d is oriented to port 4;
    "00 0000 0000 0000 1110"=>"00 0010 0000", i.e., a port downlink protocol packet with a destination address (DA) of 0x8000 0x0000 0x0000 0x000e is oriented to port 5;
    "00 0000 0000 0000 1111"=>"00 0100 0000", i.e., a port downlink protocol packet with a destination address (DA) of 0x8000 0x0000 0x0000 0x000f is oriented to port 6;
    "00 0000 0000 0001 0000"=>"00 1000 0000", i.e., a port downlink protocol packet with a destination address (DA) of 0x8000 0x0000 0x0000 0x0010 is oriented to port 7;

S10) Server MSS-400 sends port downlink protocol packets with destination addresses (DA) of 0x8000 0x0000 0x0000 0x0009, 0x800 0x0000 0x0000 0x000a, 0x8000 0x0000 0x0000 0x000b, 0x8000 0x0000 0x0000 0x000c, 0x8000 0x0000 0x0000 0x000d, 0x8000 0x0000 0x0000 0x000e, 0x8000 0x0000 0x0000 0x000f, 0x8000 0x0000 0x0000 0x0010 (with an SA of 0x0000 0x0000 0x0000 0x0000), and according to the configuration of table 0 on server MSS-400, the port downlink protocol packets will be in turn oriented to port 0 of server MSS-400; the port downlink protocol packets will be in turn oriented to ports 0 to 7 of switch BX-008-0 according to the configuration of table 0 on switch BX-008-0; moreover, items 0x0009 to 0x0010 of the address information table on server MSS-400 are configured as:
  address occupation descriptor: "01" represents that the address is standby;
  device descriptor: it is not modified;
  device resource description information: it is not modified;
  The next available address is 0x0011;

S11) After STB-0 receives a port downlink protocol packet from port 0 of switch BX-008-0 (i.e., a port downlink protocol packet with a destination address of 0x8000 0x0000 0x0000 0x0009), it sends a port uplink protocol packet (which contains the registration information of the current terminal), wherein DA of the packet is 0080 0x0000 0x0000 0x0000, and SA is 0x0000 0x0000 0x0000 0x0009 (port 0 of the switch);

S12) After server MSS-400 receives the port uplink protocol packet issued by switch STB-0 and contrasts the source address (SA) of the uplink protocol packet and the device type, it will know that port 0 of BX-008-0 is connected with a terminal, then the terminal information is found in the internal registration information table of the server, and a network access command is sent to the terminal (informing that the access network address of the terminal is 0x0009);

S13) After STB-0 receives the network access command and knows that its own access network address is 0x0009, it accesses the network and sends a network access command reply to the server;

S14) After server MSS-400 receives the network access command reply issued by STB-0, it will know that STB-0 has accessed the network, then item 0x0009 of the address information table is configured as address occupation descriptor: "10" represents that the address is used;

device descriptor: "000011" represents a terminal;

device resource description information: the terminal has a video and audio coding/decoding engine and a 100M network interface, the type of the terminal is STB, the access network address of a device connected with the terminal's network port is 0x0001 (i.e., BX-008-0), and the uplink and downlink flow count of the terminal's network port is 0;

Item 0x0001 of the address information table is configured as:

address occupation descriptor: it is not modified;

device descriptor: it is not modified;

device resource description information: the access switch has 8 downlink 100M network interfaces defined in turn as port 0 to port 7, 1 CPU module interface defined as port 8 and 1 uplink 100M network interface defined as port 9, the type of the access switch is BX-008, the access network address of the device connected with its uplink network port is 0x0000 (i.e., MSS-400), the access network address of the device connected with the downlink network port 0 is 0x0009, the rest is not allocated, and uplink and downlink flow count of each of its network ports is 0;

Then, server MSS-400 sends a device state query instruction to the port each second to check whether STB-0 works normally, when the server does not receive a state query reply in 6 seconds, it will be considered that STB-0 has been removed from the network, and no device state query instruction will be sent any longer; instead, it continues to send a query packet to the current port.

Referring to the above steps S6-S14, BX-008-1 may also access the network and obtain its access network address as 0x0002; and STB-1 may also access the network and obtain its access network address as 0x0012.

3.2 Convergence of the Novel Network of the Invention and the Existing Ethernet

In order to realize the convergence of the above novel network and the existing Ethernet and make frill use of the functions of the existing Ethernet protocol conversion gateway at the same time, in the invention, the standard Ethernet gateway is reconstructed as a special-type access switch, which plays the role of connection and conversion between the novel network and the Ethernet. The reconstructed Ethernet gateway is referred to as Ethernet protocol conversion gateway. In the novel network, the Ethernet protocol conversion gateway lies on the access network part, and it may be connected with the access switch, or it may be directly connected with the node server. In the Ethernet, an Ethernet protocol conversion gateway is connected with an Ethernet switch (L2 switch, for short below), and the Ethernet switch is connected with a terminal.

In the invention, the data transmission between the novel network and the Ethernet mainly relates to the following 4 data types:

1) Query Packet: a protocol packet sent from a node server to an access s-switch, an Ethernet protocol conversion gateway or a terminal;

2) Reply Packet: a protocol packet replied by an access switch, an Ethernet protocol conversion gateway or a terminal to a node server;

3) Unicast Data packet; and

4) Multicast Data packet.

The Ethernet protocol conversion gateway mainly carries out the forwarding of the above 4 types of data between the novel network and the Ethernet, and the core implementation concept is as tams:

The Ethernet protocol conversion gateway accesses the novel network, and obtains, from the node server that has centralized control function, the MAC address of the Ethernet protocol conversion gateway and the MAC address of a terminal registered under the Ethernet protocol conversion gateway. When the Ethernet protocol conversion gateway receives a data packet or a protocol packet sent from the novel network, it adds the MAC address of the Ethernet protocol conversion gateway and the MAC address of the target terminal into the data packet or the protocol packet and then sends it to the Ethernet, and the data packet or the protocol packet is transmitted in the Ethernet via Ethernet protocol; when the Ethernet protocol conversion gateway receives a data packet or a protocol packet sent from the Ethernet, it removes the MAC address of the Ethernet protocol conversion gateway and the MAC address of the source terminal in the data packet or the protocol packet and then sends it to the novel network, and the data packet or the protocol packet is transmitted in the novel network via the novel network protocol.

Wherein, the target terminal and the source terminal conform to the novel network protocol. Thus, the target terminal and the source terminal not only can enter the Ethernet via the MAC addresses, but also can enter the novel network by conforming to the novel network protocol. Therefore, compatible transmission can be realized on two different types of networks.

In the novel network, a data structure conforming to the novel network protocol is defined (2.1 The definition of access network data packet). The above 4 data types (data packet or protocol packet) all conform to such a data structure.

If the target terminal and the source terminal want to conform to the novel network protocol, they must conform to the above data structure of the novel network. Therefore, for a data packet or protocol packet sent from the novel network to the target terminal and a data packet or protocol packet sent from the source terminal in the Ethernet to the novel network, the packet headers both contain the addresses of the two transmission ends in the novel network, wherein the addresses are the source address (SA) and destination address (DA) of the packet or protocol packet. That is, a packet or protocol packet sent from the novel network to the target terminal has the address of the novel network, and the DA and SA in the packet header are both novel network addresses, as shown in the following table:

| DA | SA | Reserved | Payload | CRC |
| --- | --- | --- | --- | --- |

When passing through an Ethernet protocol conversion gateway, an Ethernet protocol conversion gateway MAC (i.e., MAC SA) and a target terminal MAC (i.e., MAC DA) will be added to the packet header, then it enters the Ethernet, and it is transmitted to the target terminal according to Ethernet protocol; the data packet or protocol packet sent from the source terminal in the Ethernet to the novel network has an address of the novel network and an MAC address of the Ethernet at the same time, that is, the packet header not only contains an DA and SA of the novel network, but also contains an Ethernet protocol conversion gateway MAC (i.e., MAC DA) and a source terminal MAC (i.e., MAC SA), as shown in the following table:

| MAC DA | MAC SA | Length or frame type | DA | SA | Reserved | Payload | CRC |
|---|---|---|---|---|---|---|---|

When passing through an Ethernet protocol conversion gateway, the Ethernet protocol conversion gateway MAC and the source terminal MAC are removed from the packet header, then the packet enters the novel network, and it is transmitted according to novel network protocol.

During the above process in which the novel network and the Ethernet are made compatible with each other, terminals connected under L2 switch also establish a binding relation with an Ethernet protocol conversion gateway, wherein said binding represents that a one-to-multiple mapping relation exists between the MAC address of the Ethernet protocol conversion gateway and the MAC addresses of the terminals, that is, a plurality of terminals may be registered under one Ethernet protocol conversion gateway. Such mapping and binding between terminal MAC address and Ethernet protocol conversion gateway MAC address are preset in a node server of the novel network at the time the terminal and the Ethernet protocol conversion gateway are sold, and the Ethernet protocol conversion gateway is informed of the mapping and binding by the node server. If the terminal is moved to another place, it must be re-registered by the operator. Thus, Ethernet MAC addresses may be flexibly allocated to an Ethernet protocol conversion gateway and a terminal bond thereto that are to be sold, thereby MAC address resources may be fully utilized. Alternatively, the MAC address of the Ethernet protocol conversion gateway may be solidified in each Ethernet protocol conversion gateway, and the MAC address of the terminal may also be solidified in each terminal. In such as case, it cannot flexibly allocate the MAC addresses.

It can be known from the above that, the Ethernet protocol conversion gateway and the terminal both have an address of the novel network and an MAC address of the Ethernet. Moreover, the address of the novel network and the MAC address of the Ethernet have a one-to-one mapping relation. Such a mapping relation may also be maintained by a node server of the novel network, and the Ethernet protocol conversion gateway may be informed of the mapping relation. Thus, when an Ethernet protocol conversion gateway receives a data packet or a protocol packet sent from the novel network, it may look up a target terminal MAC address corresponding to the novel network destination address (DA) in the packet according to such a mapping relation, and add it to the packet.

It has been briefly described above how the novel network and the Ethernet are made compatible with each other. The whole process will be described in detail below via the network access process and service process of a novel network node server and an Ethernet protocol conversion gateway, and of a node server and a terminal, according to specific examples.

Figure 6:
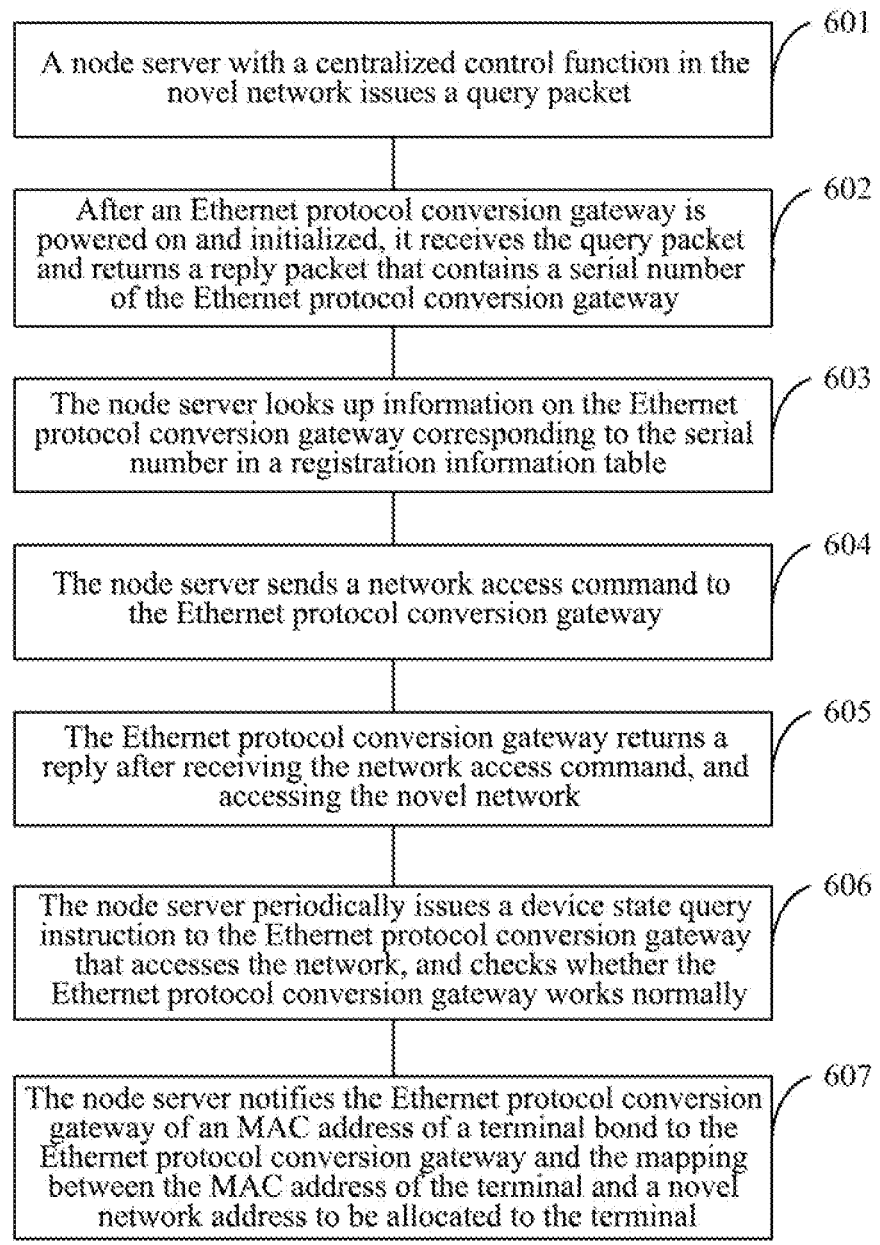
FIG. 6 is a flow chart showing the process in which an Ethernet protocol conversion gateway accesses a novel network according to an embodiment of the invention.

3.2.1 The Network Access Process of a Node Server and an Ethernet Protocol Conversion Gateway Referring to FIG. 6, it is a flow chart showing the process in which an Ethernet protocol conversion gateway accesses a novel network according to an embodiment of the invention.

Firstly, each Ethernet protocol conversion gateway that is allowed to access the network registers on the node server, and the registration information of the Ethernet protocol conversion gateway contains intrinsic information such as the serial number of the Ethernet protocol conversion gateway (including device type and device identification information), number of downlink ports and mask zone, etc. An Ethernet protocol conversion gateway that is not registered will be unable to access the network.

Step 601: A node server with a centralized control function in the novel network issues a query packet;

The node server sends the query packet to each port.

Step 602: After the Ethernet protocol conversion gateway is powered on and initialized, it receives the query packet and returns a reply packet that contains a serial number of the Ethernet protocol conversion gateway;

It is hypothesized that the Ethernet protocol conversion gateway receives a query packet issued by a certain port (for example, port 0).

Step 603: The node server looks up the Ethernet protocol conversion gateway information corresponding to the serial number in the registration information table, wherein the Ethernet protocol conversion gateway information includes Ethernet protocol conversion gateway MAC address and MAC address of a terminal bond to the Ethernet protocol conversion gateway;

After node server receives the reply packet issued by the Ethernet protocol conversion gateway, it will know that port 0 is connected with an Ethernet protocol conversion gateway, then it looks up in an internal registration information table.

Step 604: The node server sends a network access command to the Ethernet protocol conversion gateway, wherein the network access command contains the address of the Ethernet protocol conversion gateway in the novel network and the MAC address of the Ethernet protocol conversion gateway;

That is, the node server notifies the Ethernet protocol conversion gateway of the novel network address to be allocated to the Ethernet protocol conversion gateway and the Ethernet MAC address of the Ethernet protocol conversion gateway registered in advance, via a network access command.

Step 605: The Ethernet protocol conversion gateway returns a reply after receiving the network access command, and accessing the novel network;

After receiving the network access command, the Ethernet protocol conversion gateway will know its address in the novel network accessed and its MAC address in the Ethernet.

Step 606: The node server periodically issues a device state query instruction to the Ethernet protocol conversion gateway that accesses the network, and checks whether the Ethernet protocol conversion gateway works normally;

After the node server receives a network access command reply, it will know that the Ethernet protocol conversion gateway has accessed the network, and then it periodically (for example, each second) sends a device state query instruction to port 0. If the node server does not receive a state query reply in a certain period of time (for example, 6 seconds), it will be considered that the Ethernet protocol conversion gateway has been removed from the network, and no device state query instruction will be sent any longer, and it continues to send a query packet to port 0.

Step 607: The node server notifies the Ethernet protocol conversion gateway of the MAC address of the terminal bond to the Ethernet protocol conversion gateway, and the mapping between the terminal MAC address and the novel network address to be allocated to the terminal.

The node server knows according to the registration information table that a terminal is bond to the Ethernet protocol conversion gateway, so it sends the terminal MAC address bond to the Ethernet protocol conversion gateway, and the mapping between the terminal MAC address and the novel network address to be allocated, to the Ethernet protocol conversion gateway.

Via the above network access process, the Ethernet protocol conversion gateway will know its own novel network address, Ethernet MAC address, the terminal MAC address bond thereto and the mapping between the terminal MAC address and the novel network address to be allocated to the terminal.

Preferably, based on the above process, data transmission on the novel network may be specifically realized by looking up in an address table. Each node on the novel network, including node server, access switch and Ethernet protocol conversion gateway, maintains its own address table, and each time data are received, it performs data transmission and orientation according to the address table. Because the data transmission between the novel network and the Ethernet mainly relates to the transmission of a query packet, a reply packet, a unicast data packet and a multicast data packet, the address table is also divided into:

1) protocol packet address table: table 0 for short below, for transmitting and orienting a query packet or a service request protocol packet;

2) reply packet address look-up table: table 1 for short below, for transmitting and orienting a reply packet;

3) unicast data packet address table: table 2 for short below, for transmitting and orienting a unicast data packet; and 4) multicast data packet address table: table 3 for short below, for transmitting and orienting a multicast data packet.

In conjunction with the above network access process of an Ethernet protocol conversion gateway, during the powering and initializing process of the Ethernet protocol conversion gateway at step 302, table 0, table 1, table 2 and table 3 will be initialized. Then, after the Ethernet protocol conversion gateway receives the network access command at step 305, it will configure table 0: orienting the query packet or service request protocol packet sent to local machine to the CPU module port of the local machine. Then, after the Ethernet protocol conversion gateway sends a reply and accesses the network, the node server will further sends a configuration instruction to the Ethernet protocol conversion gateway for configuring table 0 on the Ethernet protocol conversion gateway: orienting the query packet or service request protocol packet sent to the terminal bond to the Ethernet protocol conversion gateway to a corresponding port of the Ethernet protocol conversion gateway respectively.

3.2.2 The Network Access Process of a Node Server and a Terminal

After the Ethernet protocol conversion gateway accesses the novel network, a terminal bond thereto also accesses the novel network.

Figure 7:
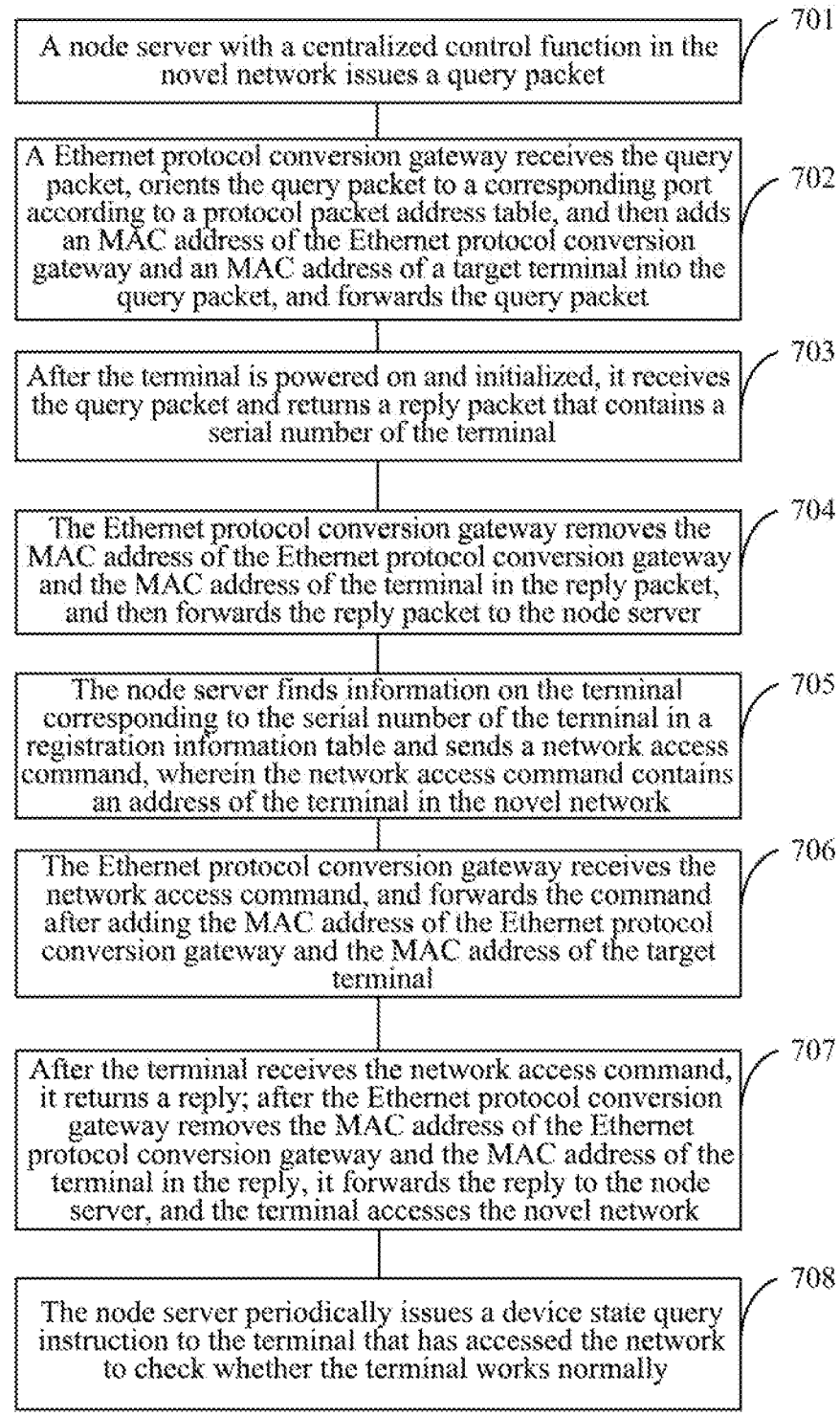
FIG. 7 is a flow chart showing the process in which a terminal accesses a novel network according to an embodiment of the invention.

Referring to FIG. 7, it is a flow chart showing the process in which a terminal accesses a novel network according to an embodiment of the invention.

Similarly, each terminal that is allowed to access the network is registered on the node server, and it is registered under the Ethernet protocol conversion gateway to which it is bond, wherein the registration information of a terminal contains terminal serial number (including device type and device identification information) and intrinsic information. A terminal that is not registered will be unable to access the network.

Step 701: A node server with a centralized control function in the novel network issues a query packet;

After an Ethernet protocol conversion gateway accesses the network, the node server will send a query packet to a downlink port of the Ethernet protocol conversion gateway to check whether a terminal device is connected under the Ethernet protocol conversion gateway.

Step 702: The Ethernet protocol conversion gateway receives the query packet, orients the query packet to a corresponding port according to a protocol packet address table, and then adds the MAC address of the Ethernet protocol conversion gateway and the MAC address of the target terminal into the query packet, and forwards the query packet.

The destination address (DA) of the query packet is the novel network address to be allocated by the node server to the terminal. Therefore, after the Ethernet protocol conversion gateway receives the query packet, it may look up the corresponding terminal MAC address according to the mapping between the novel network address and the Ethernet MAC address, and then adds it to the packet and sends the packet. After the query packet enters the Ethernet, it is transmitted according to the Ethernet protocol, and finally it is delivered to the target terminal.

Step 703: After the terminal is powered on and initialized, it receives the query packet and returns a reply packet that contains the terminal serial number.

Step 704: The Ethernet protocol conversion gateway removes the Ethernet protocol conversion gateway MAC address and the terminal MAC address in the reply packet, and then forwards the reply packet to the node server;

The reply packet contains the Ethernet protocol conversion gateway MAC address, the terminal MAC address, the destination address (DA) and source address (SA) of the novel network. After the Ethernet protocol conversion gateway removes the Ethernet protocol conversion gateway MAC address and the terminal MAC address, it orients the packet by looking up in table 1. The reply packet enters the novel network, and it is transmitted according to the novel network protocol.

Step 705: The node server finds the terminal information corresponding to the terminal serial number in a registration information table and sends a network access command, wherein the network access command contains the terminal address in the novel network;

After the node server receives the reply packet issued by the terminal, it will know that a terminal device is connected with the Ethernet protocol conversion gateway, and then it looks up in an internal registration information table.

Step 706: The Ethernet protocol conversion gateway receives the network access command, and forwards the command after adding the MAC address of the Ethernet protocol conversion gateway and the MAC address of the target terminal;

Step 707: After the terminal receives the network access command, it returns a reply; after the Ethernet protocol conversion gateway removes the Ethernet protocol conversion gateway MAC address and the terminal MAC address in the reply, it forwards the reply to the node server, and the terminal accesses the novel network;

After the terminal receives the network access command, it will know its address in the novel network accessed.

Step 708: The node server periodically issues a device state query instruction to the terminal that has accessed the network to check whether the terminal works normally.

After the node server receives a network access command reply, it knows that the terminal bond to the Ethernet protocol conversion gateway has accessed the network, and then it periodically (for example, each second) sends a device state query instruction to the terminal. If the node server does not receive a state query reply in a certain period of time (for example, 6 seconds), it will be considered that the terminal has been removed from the network, and no device state query instruction will be sent any longer; instead, it continues to send a query packet to the current port.

In the above process, data transmission inside the Ethernet conforms to an Ethernet protocol. In the Ethernet protocol, L2 switch can directly send a packet to a destination node, rather than sending a packet to all nodes in broadcast mode just like a hub; the most crucial technology thereof is that the switch can identify the network card MAC address of a node connected to the network and put it into a place named MAC address table. The MAC address table is stored in a buffer of the switch, and the address is remembered. Thus, when it needs to send data to the destination address, the switch may look up the node location of the MAC address in the MAC address table, and then it sends the data to said location directly. So-called number of MAC addresses represents the maximum number of MAC addresses that may be stored in the MAC address table of the switch. The more MAC addresses are stored, the higher the data forwarding speed and efficiency will be. Sufficient buffers are needed on each port of the switch to memorize these MAC addresses. Therefore, the number of MAC addresses that can be memorized by a switch will be determined by the size of the Buffer capacity correspondingly. Generally, it will be enough for a switch to memorize 1024 MAC addresses. 1024 MAC addresses may be memorized on an office end. On a terminal, 16 MAC addresses are supported due to a FLASH problem and actual demand.

In the Ethernet protocol, an MAC address is needed when information is transmitted between the hosts on one and the same subnet; but when information is sent for the first dine, there exists only an IP address, without MAC address. At this point, a packet will be sent, wherein the IP address is the IP address of the target machine, and the MAC address is ff-ff-ff-ff-ff-ff, which represents broadcast, that is, all machines on the subnet can receive the packet; after other hosts receive the packet, if they find that the IP address is not the IP address of their own, the packet will be discarded; and if the IP address is that of its own, it sends a packet to the source machine, which contains its MAC address. After the source machine receives the packet, it will know the MAC address of the target machine, which is called MAC address self-learning.

MAC address self-learning on a switch represents that: a correspondence table between an MAC address and an interface of the switch (for example, four interfaces for a household switch) exists on the switch, each time a packet is forwarded via the switch, it will be forwarded to all ports if no correspondence relation of the MAC address exists in the correspondence table; when the target machine returns information from a certain port, it will know to which port this MAC address corresponds, then this correspondence relation will be added into the table, which is MAC address self-learning of the switch.

With the invention, during data transmission process in a novel network: a protocol packet or data packet issued by a terminal contains an MAC address of an Ethernet protocol conversion gateway and an MAC address of the terminal, when the Ethernet protocol conversion gateway receives the packet, it removes the MAC address of the Ethernet protocol conversion gateway and the MAC address of the terminal from the packet; a protocol packet or data packet sent from a node server does not contain an MAC address of an Ethernet protocol conversion gateway and an MAC address of a terminal, but when the packet passes through a corresponding Ethernet protocol conversion gateway, the Ethernet protocol conversion gateway adds the MAC address of the Ethernet protocol conversion gateway and the MAC address of the terminal to the protocol packet or the data packet according to an internally recorded mapping relationship between a novel network address and the MAC address of the Ethernet protocol conversion gateway, and a mapping relationship between a novel network address and the MAC address of the terminal bonded to the Ethernet protocol conversion gateway.

After accessing the network, the node server may carry out a communication service (including unicast communication service and multicast communication service) with the Ethernet protocol conversion gateway and the terminal. For one skilled in the art to better understand the invention, an example in which a node server carries out a unicast communication service with an Ethernet protocol conversion gateway and a terminal will be provided below.

3.2.3 An Example of the Communication Connection Process of a Communication Service As shown in FIG. 5, it is hypothesized that there exists a node server MSS-400 (with an access network address of 0x0000), port 0 thereof is connected with Ethernet protocol conversion gateway BX-008-0 (with an access network address of 0x0001), port 1 thereof is connected with Ethernet protocol conversion gateway BX-008-1 (with an access network address of 0x0002), and port 0 of BX-008-0 is connected with set-top box STB-0 (with an access network address of 0x0009), port 1 of BX__008-1 is connected with set-top box STB-1 (with an access network address of 0x0012). Set-top box STB__0 issues a request to node server MSS-400 for performing a unicast communication service of visual communication with set-top box STB__1, in the following steps:

S1) Set-Top box STB__0 issues a service request protocol packet, the DA (destination address) of the packet is 0x0800 0x0000 0x0000 0x0000 (i.e., the address of MSS-400), and the SA (source address) is 0x0000 0x0000 0x0000 0x0009; the packet further includes the MAC address (MAC DA) of Ethernet protocol conversion gateway BX-008-0 and the MAC address (MAC SA) of set-top box STB__0; additionally, it may further include reserved 0x0000 (reserved word), and the PDU part is as shown in the following table:

| 8e01 | | | |
|---|---|---|---|
| Field Number | Length | Code | Description |
| 0 | 1W | 8e01 | user request instruction (source terminal →node server) |
| 1 | 1W | | service type (service__type) |
| 2-4 | 3W | | user number (source terminal number) |
| 5 | 1W | | user extension number (source terminal extension number) |
| 6-31 | 26W | | service parameter (0 is added to an unoccupied part) |

The program number and the broadcast channel number related to the service request are both put in the service parameter, for example:

define SERVICE_TYPE_GTML_REQUEST 0x8000, requesting for a menu
define SERVICE_TYPE_VOD_REQUEST 0x8001, requesting for a VOD program
define SERVICE_TYPE_CHANGE_MENU 0x8002, requesting for changing a background menu
define SERVICE_TYPE_BROADCAST_REQUEST 0x8003, requesting for watching broadcast
define SERVICE_TYPE_CHANGE_CHANNEL 0x8004, requesting for changing channel
define SERVICE_TYPE_TELEPHONE_DIRECT 0x8005, requesting for sending a videophone
define SERVICE_TYPE_PERMISSION 0x8006, an reply of whether access is permitted
define SERVICE_TYPE_RECORD_REQUEST 0x8007, requesting for recording
define SERVICE_TYPE_END_REQUEST 0x8008, requesting for ending the current service
define SERVICE_TYPE_ORG_CAST_REQUEST 0x8009, requesting for originating a living broadcast
define SERVICE_TYPE_DDB_REQUEST 0x800b, requesting for watching delayed TV
define SERVICE_TYPE_SKIP 0x800c, fast forward, fast rewind, pause and continue during the process of watching a VOD or delayed TV
define SERVICE_TYPE_RECORD_END 0x800e, requesting for ending recording
define SERVICE_TYPE_VIEW_Monitor_DIRECT 0x8024, requesting for watching monitor
define SERVICE_TYPE_RCV_CAST_DIRECT 0x8025, requesting for watching living broadcast
define SERVICE_TYPE_TELEPHONE_REQUEST 0, requesting for sending a videophone
define SERVICE_TYPE_RCV_CAST_REQUEST 0xa, requesting for watching living broadcast
define SERVICE_TYPE_VIEW_Monitor 0xc, requesting for watching monitor In this example, the service parameter is SERVICE_TYPE_TELEPHONE_REQUEST or SERVICE_TYPE_TELEPHONE_DIRECT.

S2) Ethernet protocol conversion gateway BX-008-0 connected between set-top box and node server MSS-400 receives the service request protocol packet; firstly, it removes the MAC address (MAC DA) of Ethernet protocol conversion gateway BX-008-0 and the MAC address (MAC SA) of set-top box STB_0 in the packet.

Then, according to the configuration of table 1, the service request protocol packet is oriented to node server MSS-400, and node server MSS-400 determines that a request for visual communication (service type) is received according to the content of the packet, knows that the called terminal (target terminal) is STB_1 by looking up in a CAM table (content-address mapping table) according to the service number, knows the link topology related to the current service according to its internal address information table, and determines that the link is permitted and communication may be established between the two parts. Then, a menu protocol packet is sent respectively to the calling party (STB_0) and the called party (STB_1), and it waits the called party to reply:

Wherein, the menu protocol packet sent to STB_0: DA is 0x8000 0x0000 0x0009, SA is 0x0000 0x0000 0x0000 0x0000, reserved is 0x0000, and PDU part is as shown in the following table:

| Field Number | Length | Code | Description |
|---|---|---|---|
| 0 | 1W | 3900 | data download instruction |
| 1 | 1W | | data type (0 = null, 1 = gtml 2 = gtml fodder 3 = set-top box program 4 = start menu 5 = bmp 100 = dsp program on gateway 101 = dsp program of 008) |
| 2 | 1W | | reserved |
| 3 | 1W | | number of valid packets |
| 4 | 1W | | sequence number of the current packet |
| 5 | 1W | | length of valid data in the current packet |
| 6-14 | 9W | | reserved |
| 15-526 | 512W | | data |
| 527 | 1W | | CRC (summarization of 512 data) |

The menu protocol packet sent to STB_1: DA is 0x8000 0x0000 0x0000 0x0012, SA is 0x0000 0x0000 0x0000 0x0000, reserved is 0x0000, and PDU part is as shown in the above table.

S3) According to the configuration of table 0 on node server MSS-400 and the configuration of table 0 on Ethernet protocol conversion gateways BX-008-0 and BX-008-1, these 2 menu protocol packets will be respectively oriented to set-top boxes STB_0 and STB_1, and during this process, BX-008-0 and BX-008-1 add MAC DA and MAC SA to these 2 menu protocol packets respectively.

The called STB_1 issues a request SERVICE_TYPE_PERMISSION for accepting the communication with SIB 1 and sends a reply protocol packet to node server MSS-400, wherein the packet contains the MAC address (MAC DA) of Ethernet protocol conversion gateway BX-008-1 and the MAC address (MAC SA) of set-top box STB_1, and further, DA is 0x080 0x0000 0x0000 0x0000, SA is 0x0000 0x0000 0x0000 0x0012, reserved is 0x0000, service parameter is SERVICE_TYPE_PERMISSION, and PDU part is as shown in the following table:

| 8e01 | | | |
|---|---|---|---|
| Field Number | Length | Code | Description |
| 0 | 1W | 8e01 | user request instruction (target terminal →node server) |
| 1 | 1W | | service type (service_type) |
| 2-4 | 3W | | user number (source terminal number) |
| 5 | 1W | | user extension number (source terminal extension number) |
| 6-31 | 26W | | service parameter (SERVICE_TYPE_PERMISSION) |

S4) Ethernet protocol conversion gateway BX-008-1 removes the MAC address (MAC DA) of Ethernet protocol conversion gateway BX-008-1 and the MAC address (MAC SA) of set-top box STB_1 in the reply protocol packet, then according to the configuration of table 1, the reply protocol packet is oriented to node server MSS-100, and node server MSS-400 determines that a request for accepting visual communication is received according to the content of the packet, knows that the called party is STB_1 by looking up in a CAM table according to the service number, and node server MSS-400 knows the link topology related to the current service according to its internal address information table, and determines that the link is permitted and communication may be established between the two parts.

In such a case, node server MSS-400 configures its own table 2 as follows:

"10 0000 0000 0001 0010"=>"000 0000 0010", i.e., a unicast data packet with a destination address (DA) of 0x1000 0x0000 0x0000 0x0012 (i.e., set-top box BX-008-1) is oriented to port 1;

"10 0000 0000 0000 1001"=>"000 0000 0001", i.e., a unicast data packet with a destination address (DA) of 0x1000 0x0000 0x0000 0x0009 (i.e., set-top box BX-008-0) is oriented to port 0;

Moreover, node server MSS-400 sends a port configuration command to all Ethernet protocol conversion gateways on the uplink (the calling path) and the downlink (the called path), for requesting to open the uplink of the address of the opposite party and the downlink of the address of its own at the same time.

Two packets sent to Ethernet protocol conversion gateway BX-008-0:

1) the first packet: DA is 0x8000 0x0000 0x0000 0x0001, SA is 0x0000 0x0000 0x0000 0x0000, reserved is 0x0000, and PDU is as shown in the following table:

| 8b54 | | | |
|---|---|---|---|
| Field Number | Length | Code | Description |
| 0 | 1W | 8b54 | Ethernet protocol conversion gateway port configuration command (node server →Ethernet protocol conversion gateway) |
| 1 | 1W | | device type (BX-008) |
| 2-5 | 4W | | address of port to be opened: 0x1000 0x0000 0x0000 0x0012 |
| 6 | 1W | | operation mode: "10 0000 0000", which represents that uplink port 9 is opened |
| 7-10 | 4W | | 0000 |
| 11 | 1W | | data type 0x10 |
| 12 | 1W | | Ethernet protocol conversion gateway address (access network address) 0x0001 |
| 13-15 | 3W | | Ethernet protocol conversion gateway device flag |
| 16-31 | 18W | | 0000 |

2) the second packet: DA is 0x8000 0x0000 0x0000 0x0001, SA is 0x0000 0x0000 0x0000 0x0000, reserved is 0x0000, and PDU part is as shown in the following table:

| 8b54 | | | |
|---|---|---|---|
| Field Number | Length | Code | Description |
| 0 | 1W | 8b54 | Ethernet protocol conversion gateway port configuration command (node server →Ethernet protocol conversion gateway) |
| 1 | 1W | | device type (BX-008) |
| 2-5 | 4W | | address of port to be opened: 0x1000 0x0000 0x0000 0x0009 |
| 6 | 1W | | operation mode: "00 0000 0001", which represents that port 0 is opened |
| 7-10 | 4W | | 0000 |
| 11 | 1W | | data type 0x10 |
| 12 | 1W | | Ethernet protocol conversion gateway address (access network address) 0x0001 |
| 13-15 | 3W | | Ethernet protocol conversion gateway device flag |
| 16-31 | 18W | | 0000 |

Two packets sent to Ethernet protocol conversion gateway BX-008-1:

1) the first packet: DA is 0x8000 0x0000 0x0000 0x0002, SA is 0x0000 0x0000 0x0000 0x0000, reserved is 0x0000, and PDU is as shown in the following table:

| 8b54 | | | |
|---|---|---|---|
| Field Number | Length | Code | Description |
| 0 | 1W | 8b54 | Ethernet protocol conversion gateway port configuration command (node server →Ethernet protocol conversion gateway) |
| 1 | 1W | | device type (BX-008) |
| 2-5 | 4W | | address of port to be opened: 0x1000 0x0000 0x0000 0x0009 |
| 6 | 1W | | operation mode: "10 0000 0000", which represents that uplink port 9 is opened |
| 7-10 | 4W | | 0000 |
| 11 | 1W | | data type 0x10 |
| 12 | 1W | | Ethernet protocol conversion gateway address (access network address) 0x0002 |
| 13-15 | 3W | | Ethernet protocol conversion gateway device flag |
| 16-31 | 18W | | 0000 |

2) the second packet: DA is 0x8000 0x0000 0x0000 0x0002, SA is 0x0000 0x0000 0x0000 0x0000, reserved is 0x0000, and PDU is as shown in the following table:

| 8b54 | | | |
|---|---|---|---|
| Field Number | Length | Code | Description |
| 0 | 1W | 8b54 | Ethernet protocol conversion gateway port configuration command (node server →Ethernet protocol conversion gateway) |
| 1 | 1W | | device type (BX-008) |
| 2-5 | 4W | | address of port to be opened: 0x1000 0x0000 0x0000 0x0012 |
| 6 | 1W | | operation mode: "00 0000 0010", which represents that port 1 is opened |
| 7-10 | 4W | | 0000 |
| 11 | 1W | | data type 0x10 |
| 12 | 1W | | Ethernet protocol conversion gateway address (access network address) 0x0002 |
| 13-15 | 3W | | Ethernet protocol conversion gateway device flag |
| 16-31 | 18W | | 0000 |

Packet sent to set-top box STB-0 (service processing command, i.e., coding/decoding command in this example):

wherein, DA of the packet is 0x8000 0x0000 0x0000 00009, SA is 0x0000 0x0000 0x0000 0x0000, reserved is 0x0000, and PDU part is as shown in the following table:

| 8704 | | | |
|---|---|---|---|
| Field Number | Length | Code | Description |
| 0 | 1W | 8704 | coding/decoding command (node server →source terminal) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x1000 0x0000 0x0000 0x0012 |
| 19-22 | 4W | | 0x1000 0x0000 0x0000 0x0009 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

Packet sent to STB-1 (service processing command, i.e., coding/decoding command in this example):

wherein, DA of the packet is 0x8000 0x0000 0x0000 0x0012, SA is 0x0000 0x0000 0x0000 0x0000, reserved is 0x0000, and PDU part is as shown in the following table:

| 8704 | | | |
|---|---|---|---|
| Field Number | Length | Code | Description |
| 0 | 1W | 8704 | coding/decoding command (node server →target terminal) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x1000 0x0000 0x0000 0x0009 |
| 19-22 | 4W | | 0x1000 0x0000 0x0000 0x0012 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

In the PDU of the above coding/decoding command, field number 13 represents coding type: 0=stopping coding, 0ffff=maintaining the original state, 0xfffe=returning data decoded, without coding locally; Field Number 14 represents decoding type: 0=stopping decoding, 0ffff=maintaining the original state; Field Number 15-18 represents coding address (DA or multicast address): 0xffff=maintaining the original state; Field Number 19-22 represents decoding address (DA or multicast address): 0xffff=maintaining the original state; Field Number 23 represents: FIB: coded HDA, LB: decoded HAD; 0xffff=maintaining the original state; Field Number 24 represents alarm parameter: 0=alarm shut down, 1=alarm enabled, 0xffff=maintaining the original state; Field Number 25 represents holder operating parameter: 0xffff=maintaining the original state; Field Number 26 represents auxiliary channel operating parameter: 0xffff=maintaining the original state.

Wherein, the coding type is as shown in the following table:

| Code | Video Compression | Video System | Audio Compression | Flow Level |
|---|---|---|---|---|
| 0x3215 | MPEG4 | PAL | MP3 | 1.7M |
| 0x3217 | MPEG4 | PAL | MP3 | 3.3M |
| 0x3218 | MPEG4 | PAL | MP3 | 6.6M |

S5) According to the configuration of table 0 on node server MSS-400 and the configuration of table 0 on Ethernet protocol conversion gateways BX-008-0 and BX-008-1, the above 4 packets sent to the Ethernet protocol conversion gateways will be respectively oriented to BX-008-0 and BX-008-1.

In such a case, Ethernet protocol conversion gateway BX-008-0 configures its own table 2 as follows:

"10 0000 0000 0001 0010"=>"10 0000 0000", i.e., a unicast data packet with a destination address (DA) of 0x1000 0x0000 0x0000 0x0012 is oriented to port 9;

"10 0000 0000 0000 1001"=>"00 0000 0001", i.e., a unicast data packet with a destination address (DA) of 0x1000 0x0000 0x0000 0x0009 is oriented to port 0;

Ethernet protocol conversion gateway BX-008-1 configures its own table 2 as follows:

"10 0000 0000 0001 0010"=>"00 0000 0010", i.e., a unicast data packet with a destination address (DA) of 0x1000 0x0000 0x0000 0x0012 is oriented to port 1;

"10 0000 0000 0000 1001"=>"10 0000 0000", i.e., a unicast data packet with a destination address (DA) of 0x1000 0x0000 0x0000 0x0009 is oriented to port 9;

According to the configuration of table 0 on node server MSS-400 and the configuration of table 0 on Ethernet protocol conversion gateways BX-008-1) and BX-008-1, the latter 2 packets sent to the set-top boxes will be respectively oriented to set-top boxes STB-0 and STB-1. During this process, BX-008-0 and BX-008-1 will respectively add the corresponding MAC DA and MAC SA into the 2 packets. After receiving the packet, set-top boxes STB-0 and STB-1 may start coding/decoding according to the content of the packet, and receive and send unicast data.

Specifically, after the communication link of the current service is configured, the process in which set-top boxes STB-0 and STB-1 receive and send unicast data based on the communication link is as follows:

1) Set-top box STB-0 sends a unicast data packet to set-top box STB-1, wherein the packet contains the MAC address (MAC DA) of Ethernet protocol conversion gateway BX-008-0 and the MAC address (MAC SA) of set-top box STB_0, wherein DA of the packet is 0x1000 0x0000 0x0000 0x0012, and SA is 0x0000 0x0000 0x0000 0x0009;

2) The unicast data packet enters Ethernet protocol conversion gateway BX-008-0, and firstly, the MAC DA and MAC SA are removed, then a switching engine module of Ethernet protocol conversion gateway BX-008-0 looks up in table 2 according to a combined address field, wherein the table address is "10 0000 0000 0001 0010", the output of the item is "10 0000 0000" ("10 0000 0000 0001 0010"=>"10 0000 0000", i.e., a unicast data packet with a destination address (DA) of 0x1000 0x0000 0x0000 0x0012 is oriented to port 9), which represents that uplink port 9 is opened, and the current unicast data packet enters node server MSS-400 via port 9;

3) After node server MSS-400 receives the unicast data packet, its switching engine looks up in table 2 according to a combined address field, wherein the table address is "10 0000 0000 0001 0010", the output of the item is "000 0000 0010" ("10 0000 0000 0001 0010"=>"000 0000 0010", i.e., a unicast data packet with a destination address (DA) of 0x1000 0x0000 0x0000 0x0012 is oriented to port 1), which represents that downlink port 1 is opened, and the current unicast data packet enters Ethernet protocol conversion gateway BX-008-1 via port 1;

4) Ethernet protocol conversion gateway BX-008-1 receives the unicast data packet, its switching engine module looks up in table 2 according to a combined address field, wherein the table address is "10 0000 0000 0001 0010", the output of the item is "00 0000 0010"=>"10 0000 0000 0001 0010"=>"00 0000 0010", i.e., a unicast data packet with a destination address (DA) of 0x1000 0x0000 0x0000 0x0012 is oriented to port 1), which represents that downlink port 1 is opened, and the current unicast data packet enters set-top box STB-1 via port 1; and during this process, BX-008-1 adds the MAC address (MAC SA) of Ethernet protocol conversion gateway BX-008-1 and the MAC address (MAC DA) of set-top box STB-1 into the packet.

5) Set-top box STB-1 sends a unicast data packet to set-top box STB-0, wherein DA of the packet is 0x1000 0x0000 0x0000 0x0009, and SA is 0x0000 0x0000 0x0000 0x0012; the packet further contains the MAC address (MAC DA) of Ethernet protocol conversion gateway BX-008-1 and the MAC address (MAC SA) of set-top box STB_1;

6) The unicast data packet enters Ethernet protocol conversion gateway BX-008-1, and firstly, the MAC DA and MAC SA are removed, then a switching engine module of Ethernet protocol conversion gateway BX-008-1 looks up in table 2 according to a combined address field, wherein the table address is "10 0000 0000 0000 1001", the output of the item is "10 0000 0000" ("10 0000 0000 0000 1001"=>"10 0000 0000", i.e., a unicast data packet with a destination address (DA) of 0x1000 0x0000 0x0000 0x0009 is oriented to port 9), which represents that uplink port 9 is opened, and the current unicast data packet enters node server MSS-400 via port 9;

7) After node server MSS-400 receives the unicast data packet, its switching engine looks up in table 2 according to a combined address field, wherein the table address is "10 0000 0000 0000 1001", the output of the item is "000 0000 0001" ("10 0000 0000 0000 1001"=>"000 0000 0001", i.e., a unicast data packet with a destination address (DA) of 0x1000 0x0000 0x0000 0x0009 is oriented to port 0), which represents that downlink port 0 is opened, and the current unicast data packet enters Ethernet protocol conversion gateway BX-008-0 via port 0;

8) Ethernet protocol conversion gateway BX-008-0 receives the unicast data packet, its switching engine module looks up in table 2 according to a combined address field, wherein the table address is "10 0000 0000 0000 1001", the output of the item is "00 0000 0001" ("10 0000 0000 0000 1001"=>"00 0000 0001", i.e., a unicast data packet with a destination address (DA) of 0x1000 0x0000 0x0000 0x0009 is oriented to port 0), which represents that downlink port 0 is opened, and the current unicast data packet enters set-top box STB-0 via port 0. During this process, BX-008-0 adds the MAC address (MAC SA) of Ethernet protocol conversion gateway BX-008-0 and the MAC address (MAC DA) of set-top box STB-0 into the packet.

Absolutely, the above service communication process is only for illustrative use. In practice, it is feasible to perform any unicast service communication or multicast service communication by employing the embodiments of the invention.

3. The advantages of the embodiments of the invention will be further described below by comparing with IP Internet.

1) Impersonation May be Prevented Fundamentally on Network Address Structure.

A user equipment informs the network of its IP Internet address; but in the invention, the network informs the user equipment of the novel network address.

To prevent others from intruding, the PC and Internet set a complex password and secret code barrier. Even for a real-name address, it still cannot be avoided that the secret code is deciphered or the security information of the user leaks out due to user's inadvertency. A PC terminal connected to the IP Internet must give a self-introduction first and inform the network of its IP address. However, who can guarantee that the IP address is true? This will be the first loophole of IP Internet that cannot be overcome.

In the novel network of the invention, the address of a terminal is learnt via network management protocol, and the user terminal can only access the novel network of the invention via this address that is learnt. Therefore, it can be ensured without authentication. A detailed description thereof may refer to network management protocol. The novel network of the invention creates a "colored" address system with an ordered structure (D/SCAF). The novel network address of the invention not only has uniqueness, but also has a function of being locatable and characterizable; for example, similar to ID card number, it implies the geographic position of user port, device attribute, service right and other characteristics. A switch on the novel network of the invention specifies a rule of conduct for the packets according to these characteristics, thus data distribution with different attribute may be realized.

2) An Independent Passport is Issued for Each Service, so that the Path for Hacker Attack and Virus Diffusion can be Blocked.

A user can enter and exit the IP Internet freely, and a user prepares a firewall by himself/herself; but in the novel network of the invention, a passport must be requested for each service. In the present invention, a communication path is configured according to the characteristic of the current service (communication between two terminals under the same one switch), that is, data packets of the current service may be directly forwarded by the same one switch, rather than be reported to a node server. With the present invention, path control can be performed separately for each service, further consideration is given to efficiency. When terminals of two parties in communication are located under the same one switch, packets are not needed to be reported to a node server, thus improving efficiency greatly.

On the IP network, because a communication protocol is executed on a user terminal, it may be tampered. Route information is broadcast on the network, so it may be intercepted. Various intrinsic defects of IP network, for example, address spoofing, anonymous attack, mail bomb, teardrop, hidden monitoring, port scanning, internal intruding and information altering, etc., provide a stage fir hackers. It is difficult to prevent Internet pollutions, such as junk mail, etc.

Because a user on the IP Internet may set any IP address to personate another user, a probe may be sent to any device on the network to snoop the information thereof, and any interference packet may be sent to the network (foul water casting). Therefore, various firewalls are invented. However, the installation of a firewall is voluntary, and the effect of a firewall is temporary and relative, because the IP Internet itself will never be clean. This is the second security defect of IP Internet that cannot be overcome.

In the novel network of the invention, after a user accesses the network, the network switch only allows the user to issue limited service requests to a node server, and all other packets will be rejected. If the node server authorizes the user request, it issues a network passport to the switch on which the user exists, and if a packet issued by the user terminal does not meet the authentication condition on the network switch end, it will be discarded, thus hacker attack can be avoided. Each time a service ends, the passport will be cancelled automatically. The passport mechanism is executed by the switch, which is outside the control range of a user.

Authentication of user packet source address: it can prevent a user from sending any imitated or anonymous packet (which is automatically set after network access).

Authentication of destination address: a user can only send a packet to an object designated by the server (which is determined during service request).

Authentication of data traffic: data traffic sent by a user must meet a specification of the server (which is determined during service request).

Authentication of copyright identification: it prevents a user from forwarding a content with a copyright that is downloaded from the network (which is set by a content provider).

Passive measures such as firewall, antivirus, encryption and isolation between interim and intranet, etc., will not be needed on the novel network of the invention, and the novel network of the invention blocks the approach of hacker attack and virus diffusion on the network structure. Therefore, it may be secure network essentially.

3) Network Device and User Data are Completely Isolated, Thus the Lifeline of Virus and Trojan Can be Cut Off.

An IP Internet device may dismantle a user packet freely; but the novel network device of the invention is completely isolated from the user data. That is, during data transmission, a novel network device (for example, switch and gateway, etc.) dose not dismantle user packet; instead, it looks up in a mapping table according to the packet address, and then forwards it from the corresponding port. That is, the switch of the invention does not have the function of route calculation and selection.

The computer created by Von Neumann put program instructions and operating data in the same place, that is, a segment of program may modify other programs and data in the machine. Such a computer mode still in use today gives an opportunity to Trojan, worm, virus and backdoor, etc. With the rapid accumulation of virus, the antivirus software and patch always lag behind, so they will be in a passive state.

The technical core of Internet TCP/IP protocol is Best Efforts, Store & Forward and Error Detection & Retransmission. To complete the mission of Internet, the network server and router must have the ability of user packet resolution, which leaves a way to hacker and virus. Thus, network security becomes an Indian wrestling in which the smarter one will win for the moment. This is the third defect of IP Internet that is inherited.

On the novel network of the invention, it is impossible for the CPUs of all servers and switch devices to touch the user packet of any user. That is, the whole novel network of the invention only establishes a transparent pipeline with specified flow and behaviors, which is completely isolated, between the terminal devices of the service-providing party and the service-receiving party. Whatever are received or sent by a user terminal, it has nothing to do with the network. The lifeline of virus and Trojan is cut off on the structure. Therefore, an end may be put to the possibility of stealing user data on the network; by the same token, those who attempt to be hackers or make a virus will have no object to attack.

4) Free Connections Between Users are Completely Isolated, so that Effective Management May be Ensured.

IP Internet is a free market and has no middleman; the novel network of the invention is a department store and has middlemen. For the network, consumers and content providers both belong to the category of network users, except for different scales. IP Internet is a free market that will not be managed, and communication may be conducted directly between any users (P2P). That is, it is determined by users whether management is needed, it is determined by unilateral large users (providers) whether it is charged, and it is determined by unilateral large users (vampire websites) whether laws and regulations are to be complied with. The operator can at most collect an entrance fee, and it will be Arabian Nights that the operator conducts legal, moral, security or commercial rules, neither now nor in the future. This is the fourth disability of IP Internet on structure.

In the novel network of the invention, it creates a concept of service node, and it forms a department store commercial mode that is managed. Free contact is impossible between users or between consumers and providers, and all contacts must be authorized by a node server (middleman), which is a necessary condition to realize the effective management of network services. If one wants to be a MPTV user, he/she must negotiate a role with the network operator; for example, from ordinary consumer to network store, school, hospital, government department, or even TV station, they are all clients of the operator, just as that the above are all clients of the telephone company. It seems that each role on the network just receives and sends a video content, however, for the receiving and sending of the video content, it must strictly comply with certain behavior rules that are negotiated. Only with specifications that must be complied with, can the relation between various users become C2C, B2C, B2B and so on in a true sense, or called managed user-to-user communication (MP2P).

5) Commercial Rules are Implanted into the Communication Protocol to Ensure a Profit-Gaining Mode;

IP Internet follows a mode of communication first; while the novel network of the invention follows a mode of management first.

For IP Internet, illegal media contents can only be sequestrated partially after a serious affect is caused, but it cannot be prevented in advance. "Professional attacks" that are systematically organized and planned cannot be prevented by law and morality; moreover, one can only be punished by law after others are harmed. The IP Internet defines management as an additional service, which is established on the application layer. Therefore, it is certain that management becomes an ornament which may exist or not. This is the fifth nature of IP Internet that cannot be changed.

In the novel network of the invention, a user terminal can only select to apply one of the services designated by the node server. The protocol signaling during the service establishing process is executed by the node server (without being processed by the user). The user terminal only answers the questions of the server passively, and accepts or rejects the service, and it cannot participate in the protocol process. Once the user accepts the service provided by the server, it will only be able to send a packet according to the mode specified by the passport, and any packet departing from the passport will be discarded in a bottom-layer switch. The basic concept of the novel network protocol according to the invention is to realize a commercial mode with a core of service content, rather than performing simple data communication. In such a mode, security will be an intrinsic attribute of the MPTV, rather than being an additional service appended to the network. Of course, service right authentication, resource confirmation and charging procedure, etc., all may be easily contained in the arrangement contract.

For device embodiments of a service communication system of an access network device, a node server, and an access switch according to the invention, they basically correspond to the above method embodiments, and reference may be made to the related description of the above method embodiments, so it will not be described again here.

It should be noted that, in this specification, relation terms such as first, second and so on are only used to distinguish one entity or operation from another entity or operation, rather than requiring or implying that such an actual relation or sequence exists between these entities or operations.

A service communication method for an access network device, a service communication system for an access network device, anode server, and an access switch according to the invention have been described in detail above. Theory and embodiment of the invention are illustrated with specific examples, and the description of the above embodiments only aims to help one skilled in the art to understand the method of the invention and its core concept; at the same time, various modifications and variations may be made by those skilled in the art without departing from the scope of the invention. In conclusion, the contents of the specification should not be construed as limiting the scope of the invention.

What is claimed is:

1. A service communication method for an access network device, wherein the access network device comprises a source terminal and a target terminal jointly connected to one and a same access switch, and the method comprises:
   notifying, by a node server according to a request for a current service, the access switch to which the source terminal and the target terminal are jointly connected to set, in the access switch's internal data packet address table, a downlink port of the access switch to which a data packet of the current service is to be oriented;
   sending, by the source terminal, an uplink data packet of the current service; and
   orienting, by the access switch, the data packet to the downlink port according to settings of its internal data packet address table after receiving the data packet, and transferring the data packet to the target terminal via the downlink port;
   wherein when the data packet is a unicast data packet, the data packet address table is a unicast data packet address table, and a destination address of the data packet is a receiving-party address during unicast service communication;
   and wherein the request for the current service is a request initiated by the source terminal for establishing unicast service communication with the target terminal, and the node server notifying the access switch to set the data packet address table comprises:
   acquiring, by the node server, communication link information of the current service according to the request for the current service, wherein the communication link information comprises information on a downlink port of the access switch to which the target terminal is connected;
   sending, by the node server, a port configuration protocol packet to the access switch according to the communication link information; and
   setting, by the access switch in its internal data packet address table according to the port configuration protocol packet, a downlink port to which a data packet with a destination address being an address of the target terminal is to be oriented;
   or
   the request for the current service comprises a request initiated by the source terminal for establishing unicast service communication with the target terminal, and the node server notifying the access switch to set the data packet address table comprises:
   acquiring, by the node server, communication link information of the current service according to the request for the current service, wherein the communication link information comprises information on the downlink port of the access switch to which the source terminal is connected and information on a downlink port of the access switch to which the target terminal is connected;
   sending, by the node server, a port configuration protocol packet to the access switch according to the communication link information; and
   setting, by the access switch, in its internal data packet address table according to the port configuration protocol packet, a downlink port to which a data packet with the destination address being an address of the source terminal is to be oriented and a downlink port to which a data packet with a destination address being an address of the target terminal is to be oriented.

2. The method of claim 1, further comprising:
   sending, by the target terminal, an uplink data packet of the current service; and
   orienting, by the access switch, the data packet to the downlink port according to the settings of its internal data packet address table after receiving the data packet, and transferring the data packet to the source terminal via the downlink port.

3. The method of claim 1, wherein the request for the current service comprises service type information, service content information and an access network address of the source terminal, and wherein the service content information comprises a service number; and the node server acquiring the communication link information of the current service comprises:
   extracting an access network address of the target terminal from a preset content-address mapping table according to the service number; and
   acquiring the communication link information of the current service according to the service type information, the access network address of the source terminal and the access network address of the target terminal;
   wherein the communication link information is unidirectional communication link information or bidirectional communication link information.

4. The method of claim 1, wherein when the data packet is a multicast data packet, the data packet address table is a multicast data packet address table, and a destination address of the data packet is a multicast address during multicast service communication;
   and wherein the request for the current service comprises a request initiated by the target terminal for multicast service communication, and the node server notifying the access switch to set the data packet address table comprises:
   acquiring, by the node server, communication link information of the current service according to the request for the current service, wherein the communication link information comprises information on a downlink port of the access switch to which the target terminal is connected;
   sending, by the node server, a port configuration protocol packet to the access switch according to the communication link information; and
   setting, by the access switch, in its internal data packet address table according to the port configuration protocol packet, a downlink port to which a data packet with a destination address being the multicast address is to be oriented;
   and wherein the request for the current service further comprises a request submitted by the source terminal for initiating multicast service communication, and the node server notifying the access switch to set the data packet address table comprises:
   acquiring, by the node server, communication link information of the current service according to the request for the current service, wherein the communication link information comprises information on a downlink port of the access switch to which the source terminal is connected;
   sending, by the node server, a port configuration protocol packet to the access switch according to the communication link information; and
   setting, by the access switch, in its internal data packet address table according to the port configuration protocol packet, a downlink port to which a data packet with a destination address being the multicast address is to be oriented.

5. The method of claim 4, wherein the request initiated by the target terminal for multicast service communication comprises service type information, service content information and an access network address of the target terminal; and wherein, the service content information comprises a service number; and the node server acquiring the communication link information of the current service comprises:

extracting an access network address of the source terminal from a preset content-address mapping table according to the service number;

acquiring a multicast address corresponding to the source terminal, and allocating the multicast address to the target terminal; and acquiring downlink communication link information of a current multicast service according to the service type information, the access network address of the source terminal, and the access network address of the target terminal.

6. The method of claim 1, wherein the request for the current service is recorded in a service request protocol packet, and the service request protocol packet is oriented to the node server via an uplink port of the access switch connected between the source terminal and the node server according to settings of a preset uplink protocol packet address table in the access switch; and wherein, the uplink protocol packet address table is set with an uplink port to which a protocol packet with a destination address being an address of the node server is to be oriented;

or wherein the node server orients a port configuration protocol packet to the access switch by connecting to a corresponding downlink port of the access switch according to settings of the node server's internal preset downlink protocol packet address table; and wherein, the downlink protocol packet address table is set with a downlink port to which a protocol packet with a destination address being an address of a subordinate access network device is to be oriented.

7. The method of claim 1, further comprising:

sending, by the node server, a port releasing command to the access switch to which the source terminal and the target terminal are jointly connected, after the current service is completed; and releasing, by the access switch, the port to which a data packet of the current service is to be oriented from its internal data packet address table according to the port releasing command;

and wherein the method further comprises:

issuing, by the node server, a service processing ending command to the source terminal and/or the target terminal; and the source terminal or target terminal ending service processing according to the service processing ending command, or the source terminal and target terminal ending service processing according to the service processing ending command;

wherein an address information table is further set inside the node server, in which address occupation information, device identification information and device resource information are recorded;

and wherein the method further comprises:

modifying, by the node server, content in a preset address information table;

wherein the modifying comprises updating address occupation information of a port released by the access switch as not being used.

8. The method of claim 1, wherein the access network device further comprises an Ethernet protocol conversion gateway and a local area Ethernet that are connected between the access switch, and the source terminal and the target terminal, and the method further comprises:

the Ethernet protocol conversion gateway accessing the novel network, and obtaining from the node server an MAC address of the Ethernet protocol conversion gateway and MAC addresses of terminals bond to the Ethernet protocol conversion gateway;

the Ethernet protocol conversion gateway receiving a data packet or a protocol packet sent from the novel network, adding the MAC address of the Ethernet protocol conversion gateway and an MAC address of the target terminal into the data packet or the protocol packet, and then sending the data packet or the protocol packet to the local area Ethernet; and the Ethernet protocol conversion gateway receiving a data packet or a protocol packet sent from the local area Ethernet, removing the MAC address of the Ethernet protocol conversion gateway and an MAC address of the source terminal from the data packet or the protocol packet, and then sending the data packet or the protocol packet to the novel network;

wherein, the target terminal and the source terminal conform to a novel network protocol.

9. A service communication method for an access network device, wherein the access network device comprises a source terminal and a target terminal that are jointly connected to a current-level access switch, a subordinate access switch is connected between the current-level access switch and the source terminal or the target terminal, or connected between the current-level access switch, the source terminal and the target terminal, and the method comprises:

notifying, by a node server according to a request for a current service, the current-level access switch to set, in the current-level access switch's internal data packet address table, a downlink port of the current-level access switch to which a data packet of the current service is to be oriented, and notifying the subordinate access switch to set in the subordinate access switch's internal data packet address table a port of the subordinate access switch to which a data packet of the current service is to be oriented; and after receiving the data packet of the current service, orienting, by the current-level access switch and the subordinate switch, the data packet to corresponding ports for transmission respectively, according to settings of their data packet address tables;

wherein when the data packet is a unicast data packet, and the data packet address table is a unicast data packet address table;

and wherein the source terminal is connected with the current-level access switch directly, the target terminal is connected with the current-level access switch via the subordinate access switch, and the node server notifying the access switches to set the data packet address tables comprises:

receiving, by the node server, a request initiated by the source terminal for establishing service communication with the target terminal, and acquiring communication link information of the current service according to the request, wherein the communication link information comprises: information on a downlink port of the current-level access switch to which the subordinate access switch is connected, and information on a downlink port of the subordinate access switch to which the target terminal is connected;

sending, by the node server, a port configuration protocol packet to the current-level access switch and the subordinate access switch respectively according to the communication link information;

setting, by the current-level access switch, in its internal data packet address table according to the port configuration protocol packet, a downlink port to which a data packet with a destination address being an address of the target terminal is to be oriented; and setting, by the subordinate access switch, in its internal data packet address table according to the port configuration protocol packet, a downlink port to which a data packet with a destination address being the address of the target terminal is to be oriented.

10. The method of claim 9, further comprising:

receiving, by the current-level access switch, an uplink data packet sent from a target terminal/source terminal with a destination address being an address of the source terminal/target terminal, orienting the data packet to a corresponding port according to settings of the data packet address table in the current-level access switch, and transmitting the data packet to the subordinate access switch;

orienting, by the subordinate switch, the data packet to the corresponding port according to settings of the data packet address table in the subordinate switch, and transferring the data packet to the source terminal/target terminal.

11. The method of claim 9, wherein the source terminal is connected with the current-level access switch directly, the target terminal is connected with the current-level access switch via the subordinate access switch, and the node server notifying the access switches to set the data packet address tables comprises:

receiving, by the node server, a request initiated by the source terminal for establishing a service communication with the target terminal, and acquiring communication link information of the current service according to the request, wherein the communication link information comprises: information on a downlink port of the current-level access switch to which the subordinate access switch is connected, information on a downlink port of the subordinate access switch to which the target terminal is connected, information on an uplink port of the subordinate access switch to which the current-level access switch is connected, and information on a downlink port of the current-level access switch to which the source terminal is connected;

sending, by the node server, a port configuration protocol packet to the current-level access switch and the subordinate access switch respectively according to the communication link information;

setting, by the current-level access switch, in its internal data packet address table according to the port configuration protocol packet, a downlink port to which a data packet with a destination address being an address of the target terminal is to be oriented, and a downlink port to which a data packet with a destination address being an address of the source terminal is to be oriented; and setting, by the subordinate access switch, in its internal data packet address table according to the port configuration protocol packet, a downlink port to which a data packet with a destination address being the address of the target terminal is to be oriented, and an uplink port to which a data packet with a destination address being the address of the source terminal is to be oriented;

or wherein the source terminal is connected with the current-level access switch via the subordinate access switch, the target terminal is connected with the current-level access switch directly, and the node server notifying the access switches to set the data packet address tables comprises:

receiving, by the node server, a request initiated by the source terminal for establishing service communication with the target terminal, and acquiring communication link information of the current service according to the request, wherein the communication link information comprises: information on an uplink port of the subordinate access switch to which the current-level access switch is connected, and information on a downlink port of the current-level access switch to which the target terminal is connected;

sending, by the node server, a port configuration protocol packet to the current-level access switch and the subordinate access switch respectively according to the communication link information;

setting, by the current-level access switch, in its internal data packet address table according to the port configuration protocol packet, a downlink port to which a data packet with a destination address being an address of the target terminal is to be oriented; and setting, by the subordinate access switch, in its internal data packet address table according to the port configuration protocol packet, an uplink port to which a data packet with a destination address being the address of the target terminal is to be oriented;

or wherein the source terminal is connected with the current-level access switch via the subordinate access switch, the target terminal is connected with the current-level access switch directly, and the node server notifying the access switches to set the data packet address tables comprises:

receiving, by the node server, a request initiated by the source terminal for establishing service communication with the target terminal, and acquiring communication link information of the current service according to the request, wherein the communication link information comprises: information on an uplink port of the subordinate access switch to which the current-level access switch is connected, information on a downlink port of the current-level access switch to which the target terminal is connected, information on a downlink port of the current-level access switch to which a subordinate access switch is connected, and information on a downlink port of the subordinate access switch to which the source terminal is connected;

sending, by the node server, a port configuration protocol packet to the current-level access switch and the subordinate access switch respectively according to the communication link information;

setting, by the current-level access switch, in its internal data packet address table according to the port configuration protocol packet, a downlink port to which a data packet with a destination address being an address of the target terminal is to be oriented, and a downlink port to which a data packet with a destination address being an address of the source terminal is to be oriented; and setting, by the subordinate access switch, in its internal data packet address table according to the port configuration protocol packet, an uplink port to which a data packet with a destination address being the address of the target terminal is to be oriented, and a downlink port to which a data packet with a destination address being the address of the source terminal is to be oriented;

or wherein the source terminal is connected with the current-level access switch via a first subordinate access switch, the target terminal is connected with the current-level access switch via a second subordinate access switch, and the node server notifying the access switches to set the data packet address tables comprises:

receiving, by the node server, a request initiated by the source terminal for establishing service communication with the target terminal, and acquiring communication link information of the current service according to the request, wherein the communication link information comprises: information on an uplink port of the first subordinate access switch to which the current-level access switch is connected, information on a downlink port of the current-level access switch to which the second subordinate access switch is connected, and information on a downlink port of the second subordinate access switch to which the target terminal is connected;

sending, by the node server, a port configuration protocol packet to the current-level access switch, the first subordinate access switch and the second subordinate access switch respectively according to the communication link information;

setting, by the current-level access switch, in its internal data packet address table according to the port configuration protocol packet, a downlink port to which a data packet with a destination address being an address of the target terminal is to be oriented, and a downlink port to which a data packet with a destination address being an address of the source terminal is to be oriented;

setting, by the first subordinate access switch, in its internal data packet address table according to the port configuration protocol packet, an uplink port to which a data packet with a destination address being the address of the target terminal is to be oriented, and a downlink port to which a data packet with a destination address being the address of the source terminal is to be oriented; and setting, by the second subordinate access switch, in its internal data packet address table according to the port configuration protocol packet, a downlink port to which a data packet with a destination address being the address of the target terminal is to be oriented, and an uplink port to which a data packet with a destination address being the address of the source terminal is to be oriented;

or wherein the source terminal is connected with the current-level access switch via a first subordinate access switch, the target terminal is connected with the current-level access switch via a second subordinate access switch, and the node server notifying the access switches to set the data packet address tables comprises:

receiving, by the node server, a request initiated by the source terminal for establishing service communication with the target terminal, and acquiring communication link information of the current service according to the request, wherein the communication link information comprises: information on an uplink port of the first subordinate access switch to which the current-level access switch is connected, information on a downlink port of the current-level access switch to which the second subordinate access switch is connected, information on a downlink port of the second subordinate access switch to which the target terminal is connected, information on an uplink port of the second subordinate access switch to which the current-level access switch is connected, information on a downlink port of the current-level access switch to which the first access switch is connected, and information on a downlink port of the first access switch to which the source terminal is connected;

sending, by the node server, a port configuration protocol packet to the current-level access switch, the first subordinate access switch and the second subordinate access switch respectively according to the communication link information;

setting, by the current-level access switch, in its internal data packet address table according to the port configuration protocol packet, a downlink port to which a data packet with a destination address being an address of the target terminal is to be oriented;

setting, by the first subordinate access switch, in its internal data packet address table according to the port configuration protocol packet, an uplink port to which a data packet with a destination address being the address of the target terminal is to be oriented; and setting, by the second subordinate access switch, in its internal data packet address table according to the port configuration protocol packet, a downlink port to which a data packet with a destination address being the address of the target terminal is to be oriented.

12. The method of claim 9, wherein when the data packet is a multicast data packet, the data packet address table is a multicast data packet address table, and a destination address of the data packet is a multicast address during multicast service communication;

and wherein the target terminal is connected with the current-level access switch directly, the request for the current service comprises a request initiated by the target terminal for multicast service communication, and the node server notifying the access switches to set the data packet address tables comprises:

acquiring, by the node server, the communication link information of the current service according to the request for the current service, wherein the communication link information comprises information on a downlink port of the current-level access switch to which the target terminal is connected;

sending, by the node server, a port configuration protocol packet to the current-level access switch according to the communication link information; and setting, by the current-level access switch, in its internal data packet address table according to the port configuration protocol packet, a downlink port to which a data packet with a destination address being the multicast address is to be oriented.

13. The method of claim 12, wherein the target terminal is connected with the current-level access switch via the subordinate access switch, the request for the current service comprises a request initiated by the target terminal for multicast service communication, and the node server notifies the access switches to set the data packet address tables comprises:
  acquiring, by the node server, the communication link information of the current service according to the request for the current service, wherein the communication link information comprises information on a downlink port of the current-level access switch to which the subordinate access switch is connected, and information of a downlink port of the subordinate access switch to which the target terminal is connected;
  sending, by the node server, a port configuration protocol packet to the current-level access switch and the subordinate access switch according to the communication link information;
  setting, by the current-level access switch, in its internal data packet address table according to the port configuration protocol packet, a downlink port to which a data packet with a destination address being the multicast address is to be oriented; and
  setting, by the subordinate access switch, in its internal data packet address table according to the port configuration protocol packet, a downlink port to which a data packet with a destination address being the multicast address is to be oriented;
  or
  wherein the request for the current service further comprises a request submitted by the source terminal for initiating multicast service communication, the source terminal is connected with the current-level access switch directly, and the communication link information further comprises information on a downlink port of the current-level access switch to which the source terminal is connected;
  the node server notifying the access switches to set the data packet address tables further comprises:
  sending, by the node server, a port configuration protocol packet to the current-level access switch according to the communication link information; and
  setting, by the current-level access switch, in its internal data packet address table according to the port configuration protocol packet, a downlink port to which a data packet with a destination address being the multicast address is to be oriented;
  or
  wherein the request for the current service further comprises a request submitted by the source terminal for initiating multicast service communication, the source terminal is connected with the current-level access switch via the subordinate access switch, and the communication link information further comprises information on a downlink port of the current-level access switch to which the subordinate access switch is connected, and information on a downlink port of the subordinate access switch to which the source terminal is connected;
  the node server notifying the access switches to set the data packet address tables further comprises:
  sending, by the node server, a port configuration protocol packet to the current-level access switch and the subordinate access switch respectively according to the communication link information;
  setting, by the current-level access switch, in its internal data packet address table according to the port configuration protocol packet, a downlink port to which a data packet with a destination address being the multicast address is to be oriented; and
  setting, by the subordinate access switch, in its internal data packet address table according to the port configuration protocol packet, a downlink port to which a data packet with a destination address being the multicast address is to be oriented;
  or
  wherein the request initiated by the target terminal for multicast service communication comprises service type information, service content information and an access network address of the target terminal, and wherein, the service content information comprises a service number; and
  the node server acquiring the communication link information of the current service comprises:
  extracting an access network address of the source terminal in a preset content-address mapping table according to the service number;
  acquiring a multicast address corresponding to the source terminal, and allocating the multicast address to the target terminal; and
  acquiring a downlink communication link information of a current multicast service according to the service type information, the access network address of the source terminal and the access network address of the target terminal.

14. The method of claim 9, wherein the access network device further comprises an Ethernet protocol conversion gateway and a local area Ethernet that are connected between the access switches, and the source terminal and the target terminal, and the method further comprises:
  the Ethernet protocol conversion gateway accessing the novel network, and obtaining from the node server an MAC address of the Ethernet protocol conversion gateway and MAC addresses of terminals bond to the Ethernet protocol conversion gateway;
  the Ethernet protocol conversion gateway receiving a data packet or a protocol packet sent from the novel network, adding the MAC address of the Ethernet protocol conversion gateway and an MAC address of the target terminal into the data packet or the protocol packet, and then sending the data packet or the protocol packet to the local area Ethernet; and
  the Ethernet protocol conversion gateway receiving a data packet or a protocol packet sent from the local area Ethernet, removing the MAC address of the Ethernet protocol conversion gateway and an MAC address of the source terminal from the data packet or the protocol packet, and then sending the data packet or the protocol packet to the novel network;
  wherein, the target terminal and the source terminal conform to a novel network protocol.

15. A service communication system for an access network device, wherein the access network device comprises a node server, and a source terminal and a target terminal jointly connected to one and the same access switch, and wherein the node server comprises:
  a notifying module configured for notifying, according to a request for a current service, the access switch to which the source terminal and the target terminal are jointly connected to set, in the access switch's internal data packet address table, a downlink port of the access switch to which a data packet of the current service is to be oriented;
  the access switch comprises:
  a port configuring module configured for setting, in its internal data packet address table according to a port configuring notification sent by the node server, the downlink port of the access switch to which the data packet of the current service is to be oriented; and
  a first port orienting module, configured for orienting the data packet of the current service sent by the source terminal to the downlink port according to settings of its internal data packet address table after receiving the data packet, and for transferring the data packet to the target terminal via the downlink port;

wherein when the data packet is a unicast data packet, the data packet address table is a unicast data packet address table, and a destination address of the data packet is a receiving-party address during unicast service communication;

and wherein the request for the current service is a request initiated by the source terminal for establishing unicast service communication with the target terminal, and the notifying module of the node server comprises:

a first communication link acquiring submodule configured for acquiring communication link information of the current service according to the request for the current service, wherein the communication link information comprises information on a downlink port of the access switch to which the target terminal is connected; and a port configuration protocol packet sending submodule configured for sending a port configuration protocol packet to the access switch according to the communication link information; and the port configuring module of the access switch comprises:

a first port configuring submodule configured for setting, in its internal data packet address table according to the port configuration protocol packet, a downlink port to which a data packet with a destination address being an address of the target terminal is to be oriented.

16. The system of claim 15, wherein the access switch further comprises:

a second port orienting module configured for orienting, an uplink data packet of the current service sent by the target terminal, to the downlink port according to the settings of its internal data packet address table after receiving the data packet, and for transferring the data packet to the source terminal via the downlink port.

17. The system of claim 15, wherein when the data packet is a multicast data packet, the data packet address table is a multicast data packet address table, and a destination address of the data packet is a multicast address during multicast service communication;

and wherein the request for the current service comprises a request initiated by the target terminal for multicast service communication, and the notifying module of the node server comprises:

a third communication link acquiring submodule configured for acquiring communication link information of the current service according to the request for the current service, wherein the communication link information comprises information on a downlink port of the access switch to which the target terminal is connected; and a port configuration protocol packet sending submodule configured for sending a port configuration protocol packet to the access switch according to the communication link information; and wherein the port configuring module of the access switch comprises:

a third port configuring submodule configured for setting, in its internal data packet address table according to the port configuration protocol packet, a downlink port to which a data packet with a destination address being the multicast address is to be oriented.

* * * * *